(12) United States Patent
Kokado

(10) Patent No.: US 7,457,293 B2
(45) Date of Patent: Nov. 25, 2008

(54) COMMUNICATION APPARATUS, METHOD AND PROGRAM FOR REALIZING P2P COMMUNICATION

(75) Inventor: Takeshi Kokado, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 652 days.

(21) Appl. No.: 11/098,687

(22) Filed: Apr. 5, 2005

(65) Prior Publication Data

US 2005/0220076 A1    Oct. 6, 2005

(30) Foreign Application Priority Data

Apr. 5, 2004    (JP)    ............... 2004-110778

(51) Int. Cl.
*H04L 12/56* (2006.01)
(52) U.S. Cl. ...................... 370/392; 709/245
(58) Field of Classification Search ................ 370/351, 370/392, 401; 709/227, 228, 245
See application file for complete search history.

(56) References Cited

U.S. PATENT DOCUMENTS

| | | | | |
|---|---|---|---|---|
| 6,128,664 | A * | 10/2000 | Yanagidate et al. ......... | 709/228 |
| 6,765,920 | B1 * | 7/2004 | Tari et al. ................... | 370/401 |
| 6,870,845 | B1 * | 3/2005 | Bellovin et al. ............ | 370/392 |
| 6,944,167 | B1 * | 9/2005 | McPherson ................. | 370/401 |
| 7,154,891 | B1 * | 12/2006 | Callon ........................ | 370/392 |
| 2004/0139225 | A1 | 7/2004 | Takahashi | |

FOREIGN PATENT DOCUMENTS

| | | |
|---|---|---|
| JP | 2003-87288 | 3/2003 |
| JP | 2004-173240 | 6/2004 |

\* cited by examiner

*Primary Examiner*—Chi H Pham
*Assistant Examiner*—Albert T Chou
(74) *Attorney, Agent, or Firm*—Wenderoth, Lind & Ponack, L.L.P.

(57) ABSTRACT

A communication apparatus includes a global address information acquiring section for acquiring first global address information, a WAN-side address information acquiring section for acquiring first WAN-side address information, and a local address information acquiring section for acquiring first local address information. Moreover, the apparatus includes an address information notification section for notifying the first global address information, the first WAN-side address information, and the first local address information to a communication partner apparatus. Furthermore, the apparatus includes an address information acquiring section for acquiring second global address information, a second WAN-side address information, and a second local address information assigned to the communication partner apparatus. The communication apparatus determines a method by which P2P connection can be established based on the first and second global address information, the first and second WAN-side address information, and the first and second local address information.

17 Claims, 34 Drawing Sheets

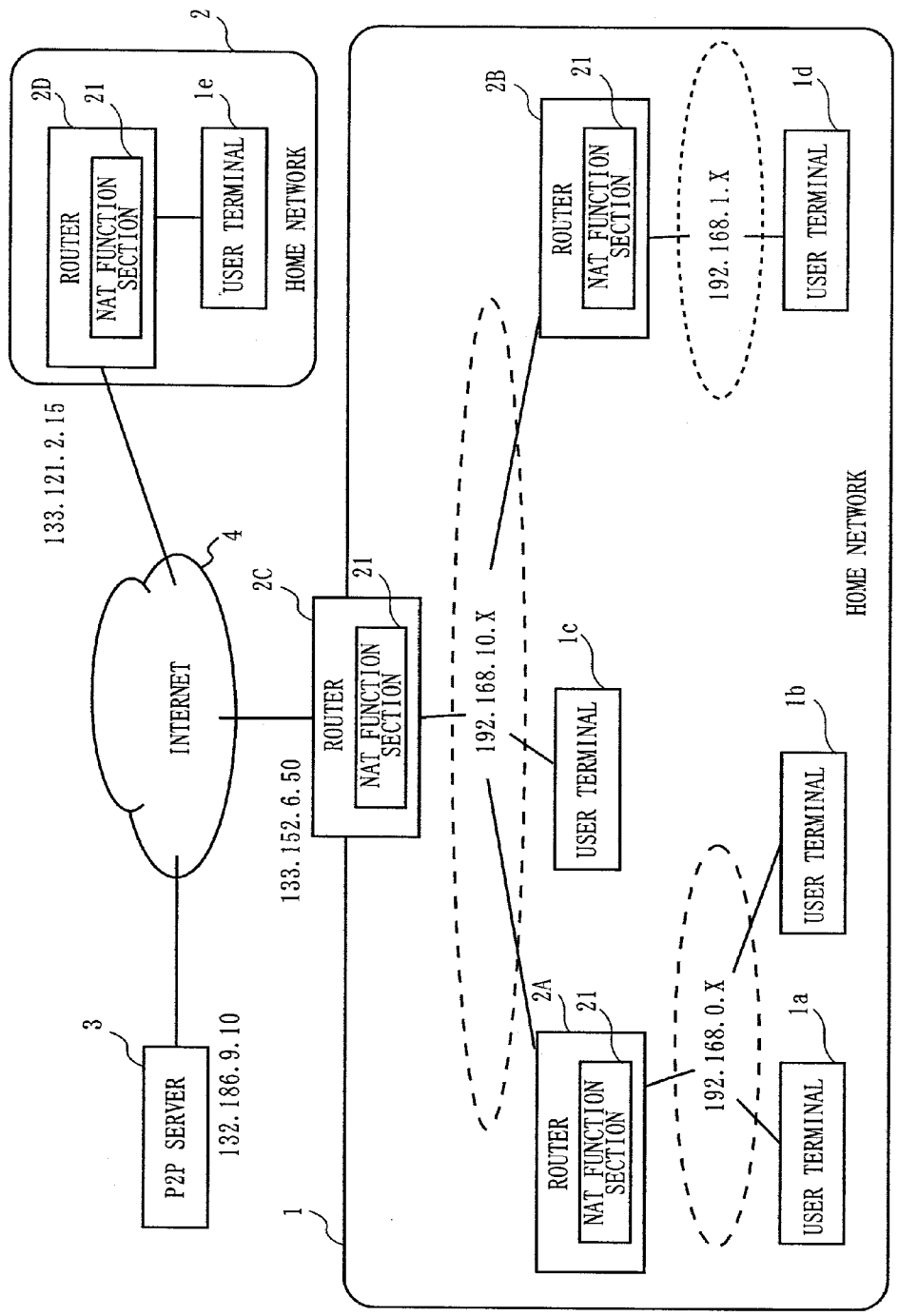

FIG. 3A

| | IP ADDRESS |
|---|---|
| USER TERMINAL 1a | 192.168. 0.100 |
| USER TERMINAL 1b | 192.168. 0.101 |
| USER TERMINAL 1c | 192.168.10. 2 |
| USER TERMINAL 1d | 192.168. 1.10 |
| USER TERMINAL 1e | 192.168. 0.30 |
| P2P SERVER 3 | 132.186. 9.10 |

FIG. 3B

| | WAN-SIDE IP ADDRESS | LAN-SIDE IP ADDRESS |
|---|---|---|
| ROUTER 2A | 192.168.10. 5 | 192.168. 0. 1 |
| ROUTER 2B | 192.168.10. 4 | 192.168. 1.255 |
| ROUTER 2C | 133.152. 6.50 | 192.168.10. 1 |
| ROUTER 2D | 133.121. 2.15 | 192.168. 0. 1 |

FIG. 6

| IDENTIFICATION INFORMATION MANAGEMENT TABLE | | |
|---|---|---|
| IDENTIFICATION INFORMATION | COMMUNICATION PATH INFORMATION | ADDITIONAL INFORMATION |
| TERMINAL 1a@osaka.ne.jp | COMMUNICATION PATH INFORMATION a | ..... |
| TERMINAL 1b@osaka.ne.jp | COMMUNICATION PATH INFORMATION b | ..... |
| TERMINAL 1c@osaka.ne.jp | COMMUNICATION PATH INFORMATION c | ..... |
| TERMINAL 1d@osaka.ne.jp | COMMUNICATION PATH INFORMATION d | ..... |
| TERMINAL 1e@tokyo.ne.jp | COMMUNICATION PATH INFORMATION e | ..... |

FIG. 13A

| COMMUNICATION START REQUEST MESSAGE FROM THE USER TERMINAL 1a |
|---|
| MESSAGE HEADER |
| MESSAGE IDENTIFICATION INFORMATION (COMMUNICATION START REQUEST) |
| USER TERMINAL 1a@osaka.ne.jp |
| USER TERMINAL 1e@osaka.ne.jp |
| global_IP:133.152.6.50 Port:6001 |
| wan_IP:192.168.10.5 Port:5001 |
| local_IP:192.168.0.100 Port:2701 |
| net_mask:255.255.255.0 |
| ADDITIONAL INFORMATION (AUTHENTICATION INFORMATION, ETC.) |

FIG. 14B

| |
|---|
| COMMUNICATION START RESPONSE MESSAGE FROM THE USER TERMINAL 1d |
| MESSAGE HEADER |
| MESSAGE IDENTIFICATION INFORMATION (COMMUNICATION START RESPONSE) |
| USER TERMINAL 1d@osaka.ne.jp |
| USER TERMINAL 1a@osaka.ne.jp |
| global_IP:133.152.6.50 Port:6003 |
| wan_IP:192.168.10.4 Port:4001 |
| local_IP:192.168.1.10 Port:3001 |
| net_mask:255.255.255.0 |
| ADDITIONAL INFORMATION (AUTHENTICATION INFORMATION, ETC.) |

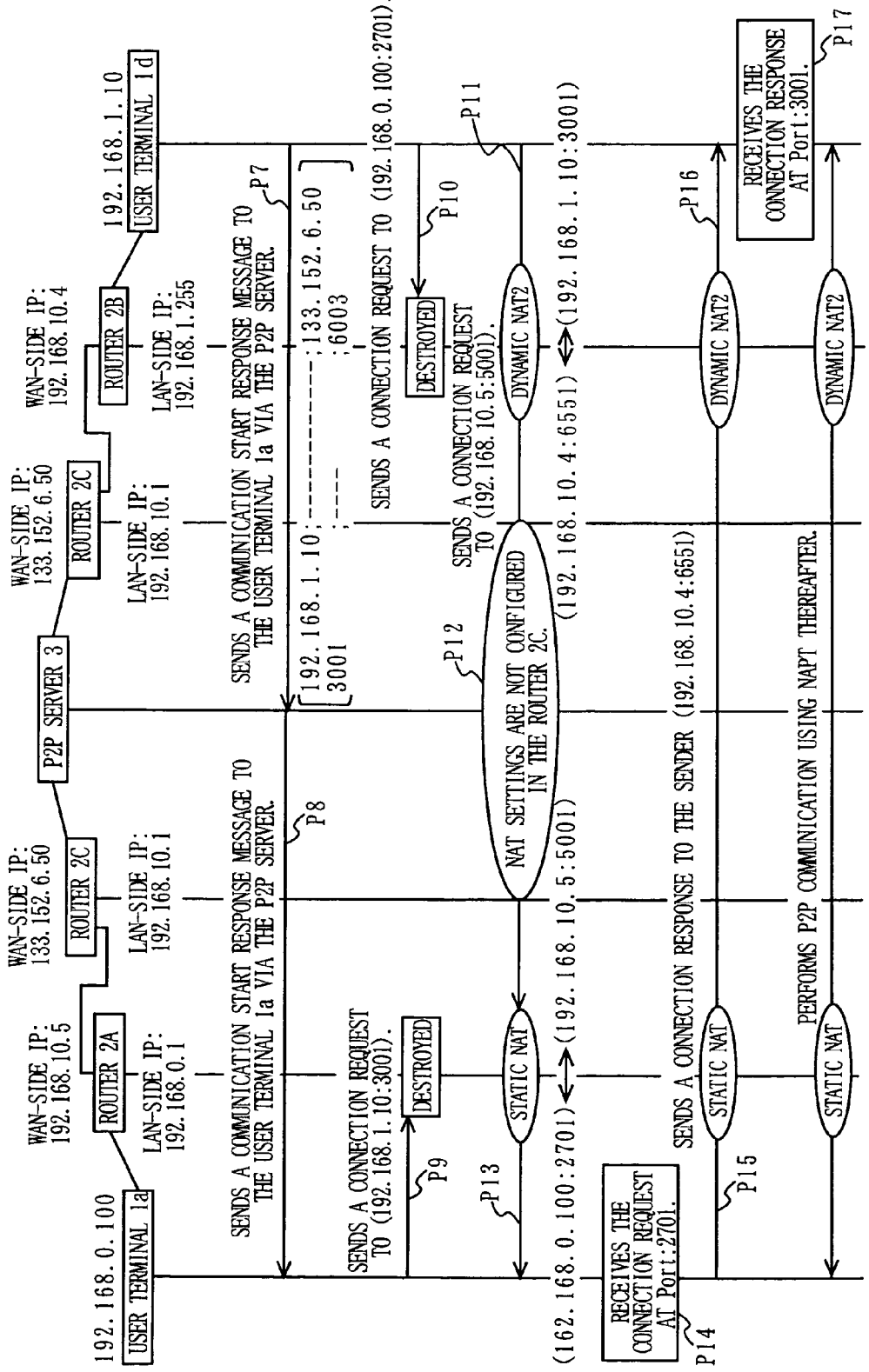

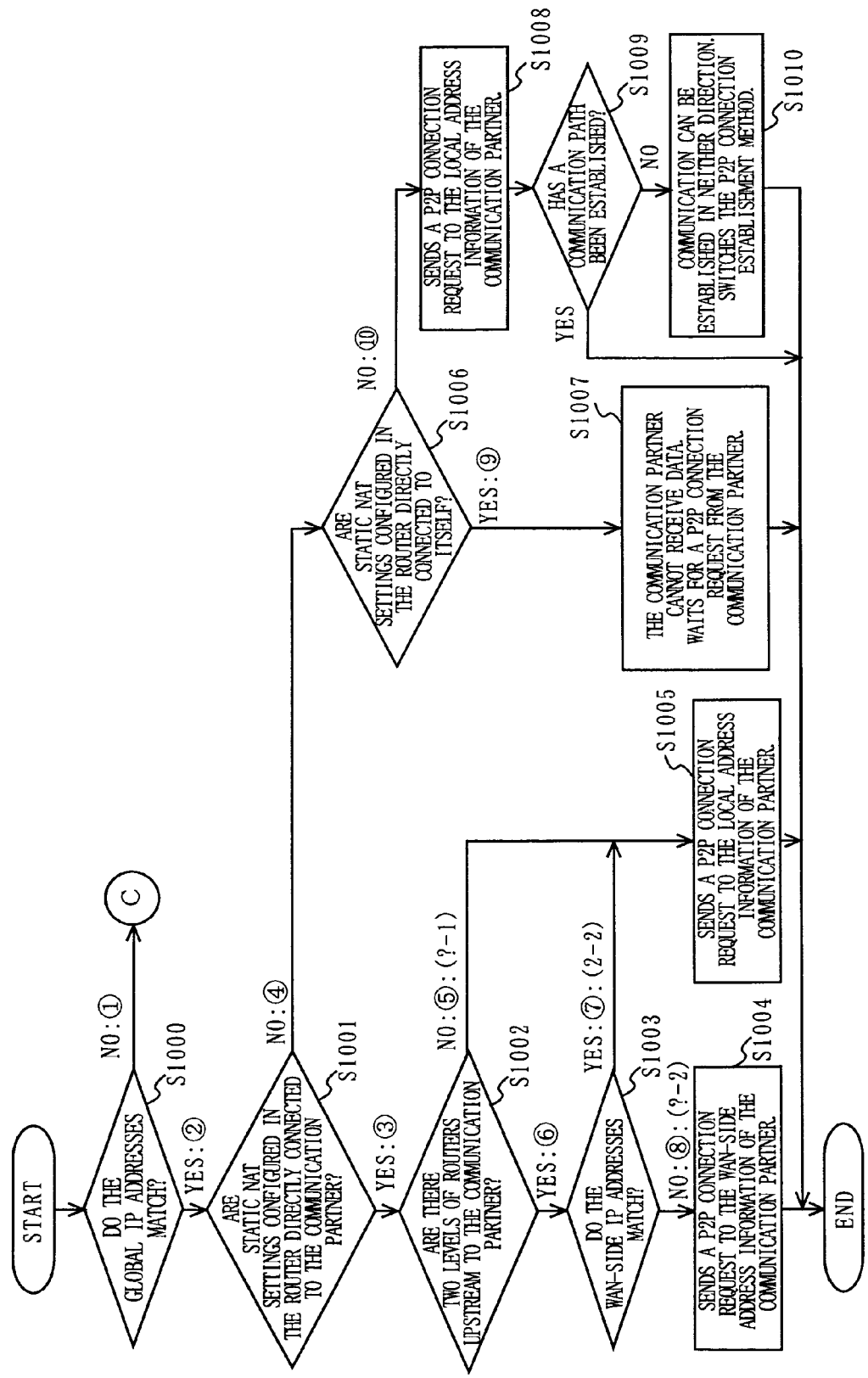

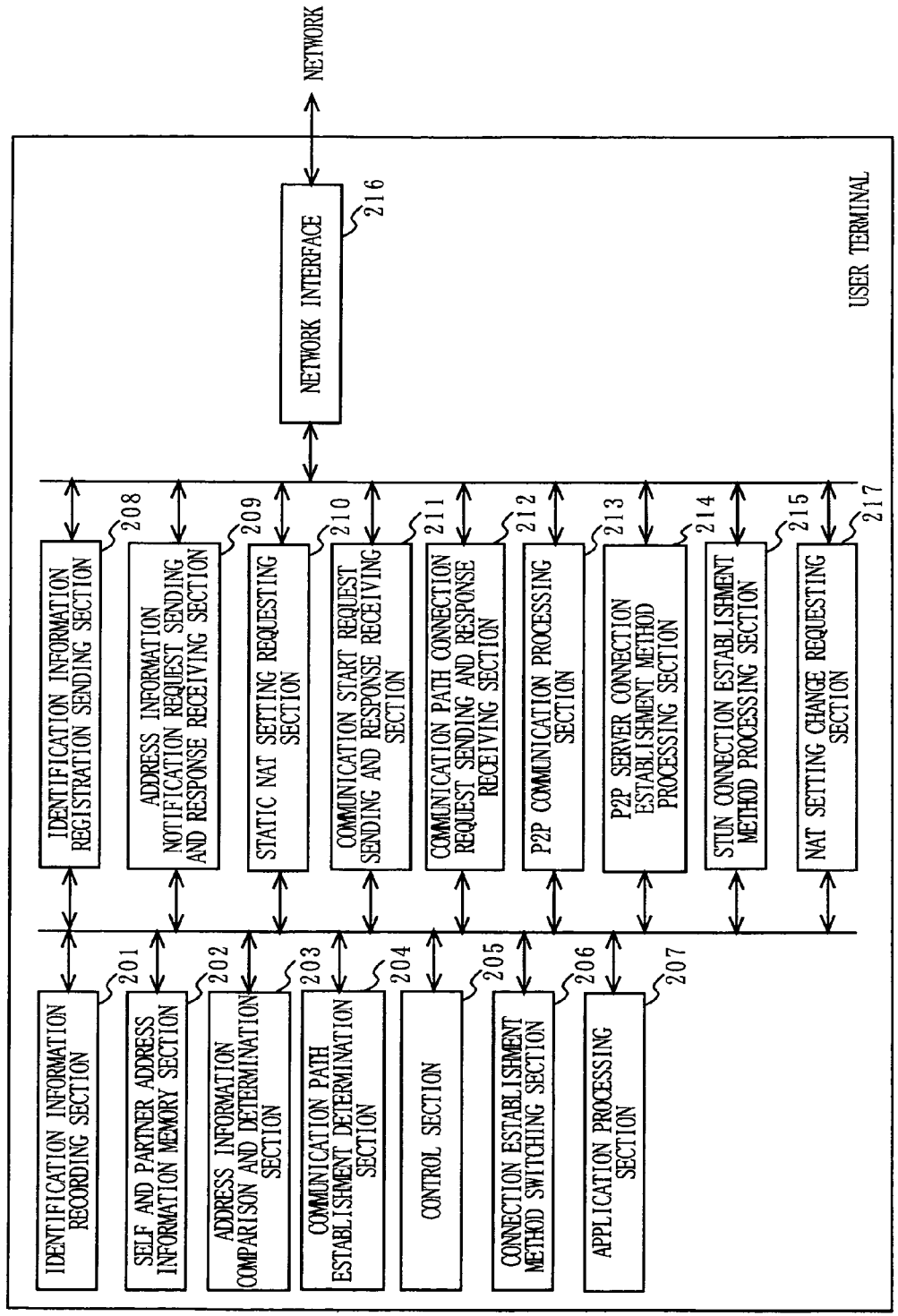

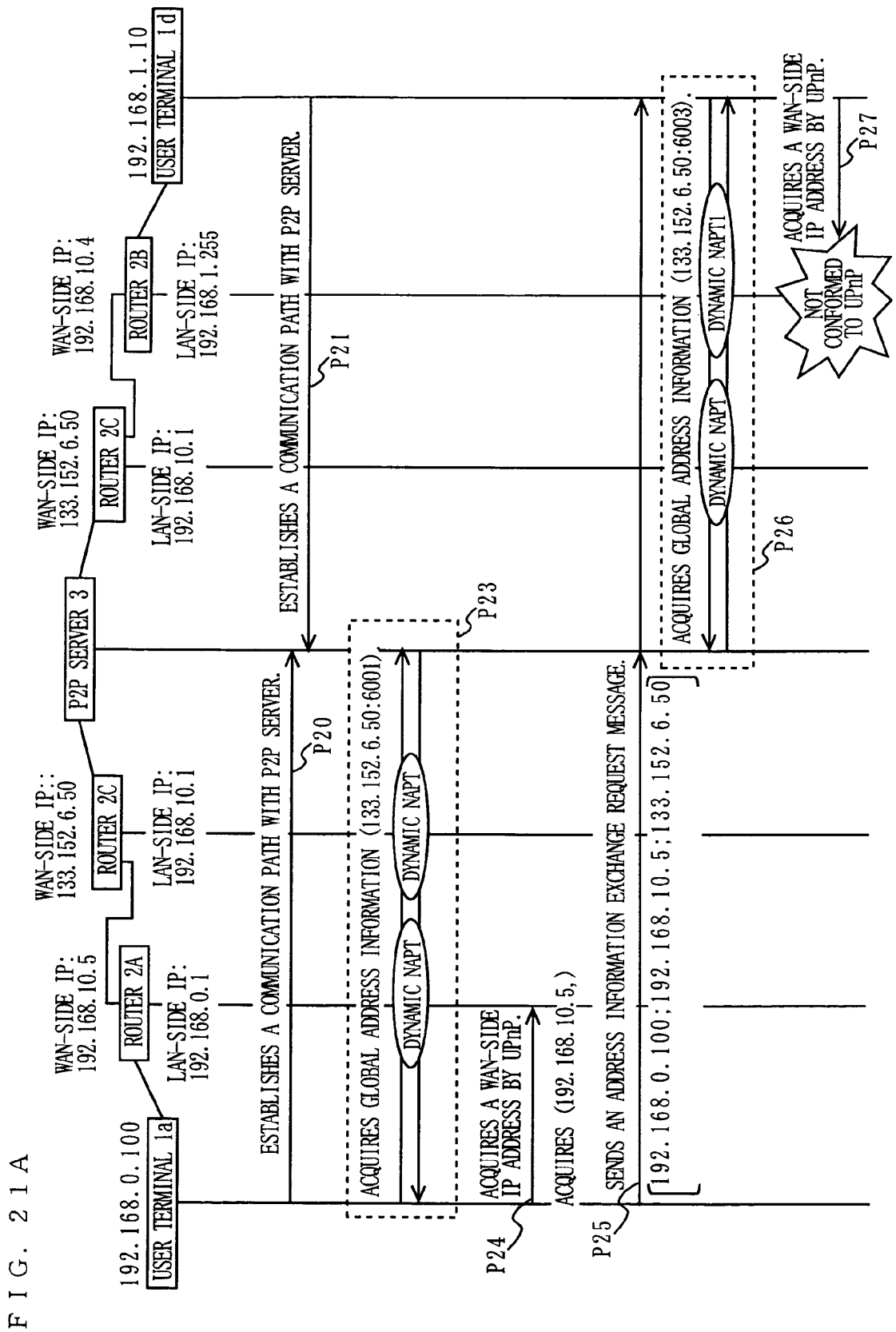

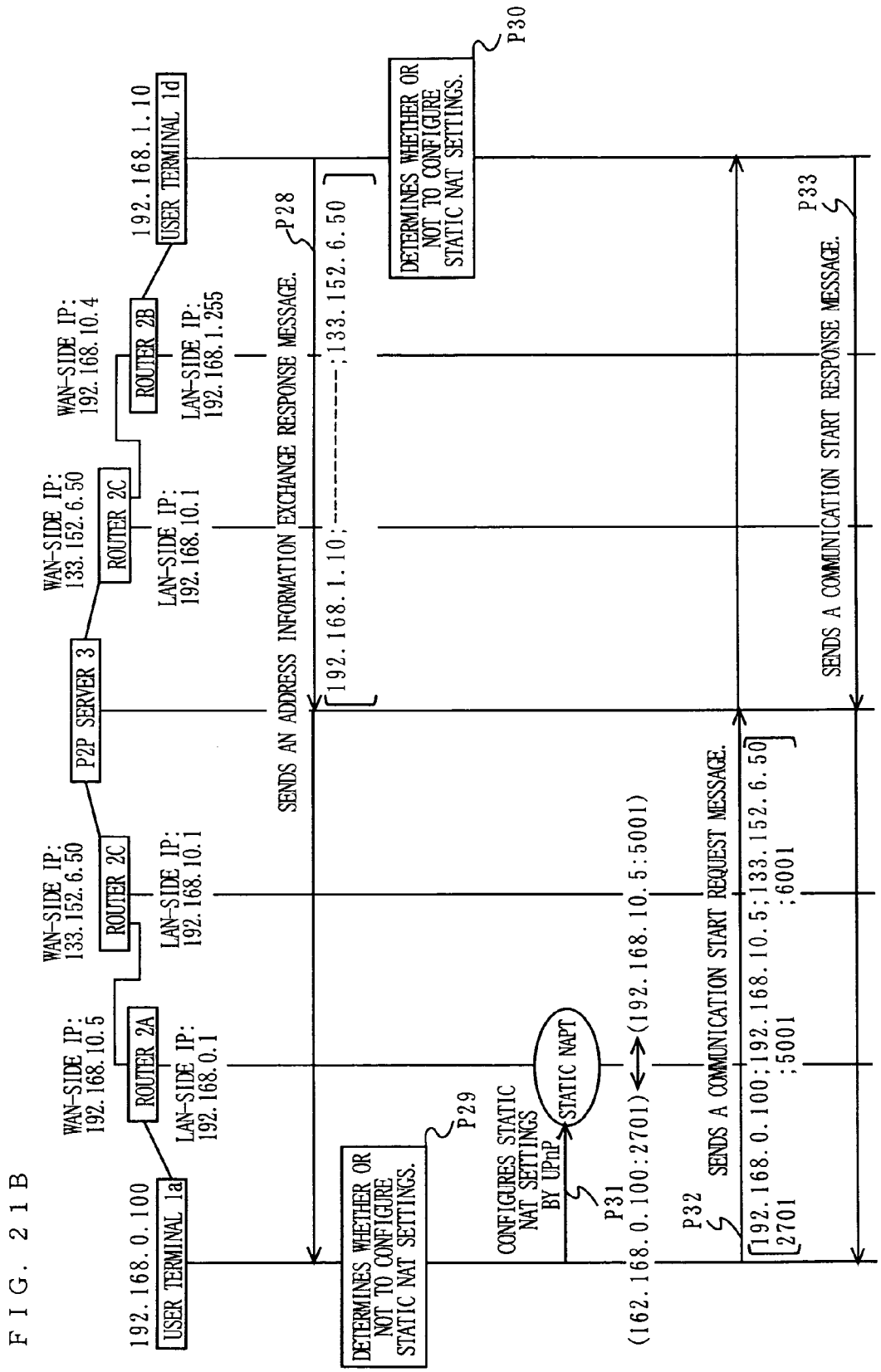

COMMUNICATION APPARATUS, METHOD AND PROGRAM FOR REALIZING P2P COMMUNICATION

BACKGROUND OF THE INVENTION

1. Field of the Invention

The present invention relates to a communication apparatus, method and program used in a communication network, and more specifically to a communication apparatus, method and program for realizing peer-to-peer communication (hereinafter, referred to as "P2P communication").

2. Description of the Relayed Art

As a technology for connecting a plurality of user terminals in a house to the Internet using one global address, the NAT technology (Network Address Translation; conceptually encompasses Network Address Port Translation (NAPT)) using an address translation rule is used. According to the NAT technology, for routing a message from the LAN (Local Area Network) side to the WAN (Wide Area Network) side, a router translates sender address information into WAN-side address information. For routing a message from the WAN side to the LAN side, the router translates destination address information from WAN-side address information to LAN side address information in accordance with an address translation rule, i.e., a NAT translation rule.

In a network environment using the NAT technology, the following conditions (1) and (2) are required for performing P2P communication with a user terminal as a communication partner.

(1) A router address translation rule for a router on a communication path is appropriately set.

(2) Appropriate address information of an access destination of a P2P communication partner is obtained.

When user terminals are connected to each other via a network using a global address, such as the Internet, the appropriate address information of an access destination mentioned in condition (2) is global address information (an IP address and a port number). The global address information is, for example, a WAN-side address and a port number of an address translation rule which is set in a router connected to the Internet, among address translation rule(s) which is/are set in router(s) between the user terminals and the Internet.

On the other hand, when user terminals are connected to each other via router(s) in a private network, the appropriate address information of an access destination needs to be address information of a segment to which the user terminals are commonly connected. For example, for a user terminal 1a and a user terminal 1b in FIG. 1A, the LAN-side segment of a router 2A is the common segment. For a user terminal 1a and a user terminal 1c or id in FIG. 1A, the LAN-side segment of a router 2C is the common segment.

In this manner, when user terminals are connected to each other via router(s) in a private network, the appropriate address information of an access destination varies in accordance with the user terminal as the communication partner. Specific address information is, for example, address information of the communication partner, or a WAN-side address and a port number of an address translation rule set in a router connected to the communication partner.

It is not guaranteed that these conditions are always fulfilled. Accordingly, it is generally very difficult to perform P2P communication.

As a technology for fulfilling the above-mentioned conditions (1) and (2) in a limited situation where user terminals are connected to each other via the Internet and only one router is present between the user terminals and the Internet, it is known to use the UPnP Internet Gateway Device (IGD) Device Control Protocol (hereinafter, referred to as "UPnP•IGD") for dynamically setting a NAT translation table in an upstream router by a user terminal is known.

Also, a method by which a communicator which is set for NAT traversal is installed in each network and each user terminal communicates via the communicator has been proposed (see, for example, Japanese Patent Publication No. 2003-87288, pages 2 through 4 and FIG. 1A).

Conventionally, the following methods have been proposed as methods of using UPnP•IGD: a method by which a user terminal sets a NAT translation table in an upstream router; and a method by which a user terminal acquires a WAN-side address of an upstream router. However, P2P communication can not be realized in complicated networks only with UPnP•IGD.

With the method proposed by Japanese Patent Publication No. 2003-87288, P2P communication cannot be realized in an environment in which the network between the user terminals is dynamically changed.

SUMMARY OF THE INVENTION

Therefore, an object of the present invention is to provide a communication apparatus, method and program for realizing P2P communication even in a communication environment in which a network is constructed in a complicated manner. Another object of the present invention is to provide a communication apparatus, method and program for realizing P2P communication even when the network structure is dynamically changed.

The present invention has the following features to attain the object mentioned above. A first aspect of the present invention is directed to a communication apparatus connectable to a network including the Internet. The communication apparatus comprises a global address information acquiring section for communicating with a server in the network and acquiring information on an address in the Internet assigned to the communication apparatus as first global address information; a WAN-side address information acquiring section for acquiring information on a WAN-side address assigned to a router directly connected to the communication apparatus as first WAN-side address information; a local address information acquiring section for acquiring information on an address in a local area network assigned to the communication apparatus as first local address information; an address information notification section for notifying the first global address information, the first WAN-side address information, and the first local address information to a communication partner apparatus wishing to perform P2P communication via a server in the network; and an address information acquiring section for acquiring, via a server in the network, second global address information which is information on an address in the Internet assigned to the communication partner apparatus, second WAN-side address information which is information on a WAN-side address assigned to a router directly connected to the communication partner apparatus, and second local address information which is information on an address in a local area network assigned to the communication partner apparatus. The communication apparatus determines a method by which P2P connection can be established based on the first and second global address information, the first and second WAN-side address information, and the first and second local address information.

According to the first aspect of the present invention, even when the network is structured in a complicated manner, the communication apparatuses wishing to perform P2P communication can acquire the global address information, the WAN-side address information, and the local address information. The communication apparatus determines a method by which P2P connection can be established based on the first and second global address information, the first and second WAN-side address information, and the first and second local address information. Accordingly, a communication apparatus, capable of realizing P2P communication even in a communication environment where the network is structured in a complicated manner, is provided. Even if the network structure is dynamically changed, the global address information, the WAN-side address information, and the local address information can be newly acquired in accordance with the change. Therefore, a communication apparatus, capable of realizing P2P communication even when the network structure is dynamically changed, is provided.

Preferably, the communication apparatus may further comprise a NAT setting requesting section for setting an address translation rule in the router directly connected to the communication apparatus. The WAN-side address information acquiring section may acquire the first WAN-side address information based on the address translation rule which is set in the router.

Preferably, the communication apparatus may further comprise a NAT setting determination section for determining whether or not the NAT setting requesting section should set an address translation rule. When the NAT setting determination section determines that the address translation rule should not be set, the communication apparatus may determine a method by which P2P connection can be established without causing the NAT setting requesting section to set the address translation rule.

Thus, unnecessary NAT settings are not configured, which improves the security level and increases the processing speed.

Preferably, the communication apparatus may further comprise a destination address information determination section for determining whether or not to start P2P communication with the communication partner apparatus using one address information among the second global address information, the second WAN-side address information and the second local address information which are acquired by the address information acquiring section; and a P2P communication processing section for, when the destination address information determination section determines to start P2P communication with the communication partner apparatus using the one address information, starting P2P communication with the communication partner apparatus using the one address information.

Thus, the communication apparatus can start P2P communication using one address information among the global address information, the WAN-side address information and the local address information.

Preferably, the destination address information determination section may send a P2P connection request, using one address information among the second global address information, the second WAN-side address information and the second local address information as a destination; and when receiving a response from the communication partner apparatus may determine to start P2P communication using the address information used as the destination.

Thus, a P2P connection request using the global address information, the WAN-side address information, and the local address information is attempted to be sent. When a response is made from the communication partner as a result of the P2P connection request being attempted, it means that P2P connection can be established using the address information used when P2P connection request was attempted to be sent. In such a case, P2P communication can be started using the address information.

Preferably, when receiving a P2P connection request from the communication partner apparatus, the destination address information determination section may determine to start P2P communication using sender address information of the P2P connection request; and when the destination address information determination section determines to start P2P communication using the sender address information, the P2P communication processing section may start P2P communication with the communication partner apparatus using the sender address information.

Thus, the communication apparatus can perform P2P communication with the communication partner by tracing back the sender address of the P2P connection request from the communication partner. Accordingly, even if P2P communication cannot be performed using the address information of the communication partner, the communication apparatus can perform P2P communication using the sender address information of the P2P connection request from the communication partner.

Preferably, when the destination address information determination section determines not to start P2P communication using the one address information and determines not to start P2P communication using the sender address information, the P2P communication processing section may determine to start P2P communication using a P2P server connection establishment method which performs communication via P2P server or a STUN connection establishment method.

P2P connection can be established by switching the P2P connection establishment method in this manner. Accordingly, it is expected that P2P communication is realized regardless of how complicated the network structure is.

Preferably, the destination address information determination section may determine whether or not a first global address included in the first global address information is equal to a second global address included in the second global address information. When the first global address is not equal to the second global address, the destination address information determination section may send a P2P connection request, using address information corresponding to the second global IP address as a destination; and when receiving a response from the communication partner apparatus, may determine to start P2P communication using the address information used as the destination. When the first global address is equal to the second global address, the destination address information determination section may send a P2P connection request, using one address information among the second WAN-side address information and the second local address information as a destination; and when receiving a response from the communication partner apparatus, may determine to start P2P communication using the address information used as the destination.

Thus, the communication apparatus first determines whether the communication with the communication partner is communication via the Internet or the communication in an home network, and then attempts to perform P2P communication using appropriate information. Accordingly, wasteful processing is omitted.

Preferably, the destination address information determination section may determine to which of predetermined types the first and second global address information and the first and second WAN-side address information belong; may predetermine the address information to be used as the destination, among the second global address information, the second WAN-side address information and the second local address information in accordance with the type to which the first and second global address information and the first and second WAN-side address information belong; and may determine to start P2P communication using the address information corresponding to the type to which the first and second global address information and the first and second WAN-side address information belong.

Appropriate address information to be used is defined depending on the network structure. Accordingly, P2P connection can be established also by determining to which type the first and second global address information and the first and second WAN-side address information belong and predefining the address information to be used in accordance with the type. By this, the number of times that the communication apparatus attempts to send a P2P connection request can be reduced, which shortens the time period for establishing a P2P communication path.

Preferably, the predetermined types are type 1 indicating that the communication apparatus is connected to the communication partner apparatus via the Internet; type 2 indicating that the communication apparatus is not connected to the communication partner apparatus via the Internet; type 3 indicating that the router directly connected to the communication partner apparatus has static NAT settings configured therein; type 4 indicating that the router directly connected to the communication partner apparatus does not have static NAT settings configured therein; type 5 indicating that there is only one router from the communication partner apparatus to the Internet; type 6 indicating that there are at least two routers from the communication partner apparatus to the Internet; type 7 indicating that a first WAN-side IP address included in the first WAN-side address information matches a second WAN-side IP address included in the second WAN-side address information; type 8 indicating that the first WAN-side IP address included in the first WAN-side address information does not match the second WAN-side IP address included in the second WAN-side address information; type 9 indicating that the router directly connected to the communication apparatus has static NAT settings configured therein; type 10 indicating that the router directly connected to the communication apparatus does not have static NAT settings configured therein; type 11 indicating that there is only one router from the communication apparatus to the Internet; and type 12 indicating that there are at least two routers from the communication apparatus to the Internet. The destination address information determination section may determine whether to start P2P communication using one address information among the second WAN-side address information, the second local address information, and sender address information included in a communication path connection request sent from the communication partner apparatus, in accordance with the type to which the first and second global address information and the first and second WAN-side address information belong, or to start P2P communication by switching a P2P connection establishment method.

Thus, in the case where there are two or less routers between the Internet and the user terminal, it is expected that P2P communication is realized substantially with no exception.

Preferably, when a communication path with the communication partner apparatus has not been established, the P2P communication processing section may determine to start P2P communication using a P2P server connection establishment method or a STUN connection establishment method.

Thus, in the case where there are three or more routers between the Internet and the user terminal, it is expected that P2P communication is realized substantially with no exception.

Preferably, based on the first and second global address information, the first and second WAN-side address information and the first and second local address information, the destination address information determination section may determine whether or not P2P connection with the communication partner apparatus can be established using one of the address information; and when the destination address information determination section determines that P2P connection with the communication partner apparatus can be established, the P2P communication processing section may determine to start P2P communication using P2P server connection establishment method or a STUN connection establishment method.

Thus, it is determined whether or not P2P connection can be established using the exchanged address information. When P2P connection cannot be established, the P2P connection establishment method is switched. Accordingly, wasteful trials and processing are omitted, and P2P communication can be realized more rapidly.

Preferably, the communication apparatus may further comprise a NAT setting change requesting section for deleting an unnecessary address translation rule configured in the router.

Thus, wasteful unnecessary address translation rule setting is deleted, which can alleviate the processing load of the router.

Preferably, the communication apparatus may further comprise a NAT setting change requesting section for changing the address translation rule configured in the router to a full-cone type address translation rule which restricts a communication partner, after P2P communication is started.

Thus, the security level can be improved.

A second aspect of the present invention is directed to a method for a communication apparatus connectable to a network including the Internet to perform P2P communication with another communication apparatus. The method comprises the steps of communicating with a server in the network and acquiring information on an address in the Internet assigned to the communication apparatus as first global address information; acquiring information on a WAN-side address assigned to a router directly connected to the communication apparatus as first WAN-side address information; acquiring information on an address in a local area network assigned to the communication apparatus as first local address information; notifying the first global address information, the first WAN-side address information, and the first local address information to the another communication apparatus wishing to perform P2P communication via a server in the network; and acquiring, via a server in the network, second global address information which is information on an address in the Internet assigned to the another communication apparatus, second WAN-side address information which is information on a WAN-side address assigned to a router directly connected to the another communication apparatus, and second local address information which is information on an address in a local area network assigned to the another communication apparatus; and determining a method by which P2P connection can be established based on the first and second global address information, the first and second WAN-side address information, and the first and second local address information.

A third aspect of the present invention is directed to a program for operating a computer apparatus connectable to a network including the Internet, such that the computer apparatus performs P2P communication with another computer apparatus. The program causes the computer apparatus to execute the steps of communicating with a server in the network and acquiring information on an address in the Internet assigned to the communication apparatus as first global address information; acquiring information on a WAN-side address assigned to a router directly connected to the communication apparatus as first WAN-side address information; acquiring information on an address in a local area network assigned to the communication apparatus as first local address information; notifying the first global address information, the first WAN-side address information, and the first local address information to the another computer apparatus wishing to perform P2P communication, via a server in the network; and acquiring, via a server in the network, second global address information which is information on an address in the Internet assigned to the another computer apparatus, second WAN-side address information which is information on a WAN-side address assigned to a router directly connected to the another computer apparatus, and second local address information which is information on an address in a local area network assigned to the another computer apparatus; and determining a method by which P2P connection can be established based on the first and second global address information, the first and second WAN-side address information, and the first and second local address information.

A fourth aspect of the present invention is directed to a system formed on a network including the Internet. The system comprises a first communication apparatus and a second communication apparatus which are connectable to the network. The first and second communication apparatuses each comprise a global address information acquiring section for communicating with a server in the network and acquiring information on an address in the Internet assigned to the communication apparatus as first global address information; a WAN-side address information acquiring section for acquiring information on a WAN-side address assigned to a router directly connected to the communication apparatus as first WAN-side address information; a local address information acquiring section for acquiring information on an address in a local area network assigned to the communication apparatus as first local address information; an address information notification section for notifying the first global address information, the first WAN-side address information, and the first local address information to a communication partner apparatus wishing to perform P2P communication via a server in the network; and an address information acquiring section for acquiring, via a server in the network, second global address information which is information on an address in the Internet assigned to the communication partner apparatus, second WAN-side address information which is information on a WAN-side address assigned to a router directly connected to the communication partner apparatus, and second local address information which is information on an address in a local area network assigned to the communication partner apparatus. The first and second communication apparatuses each determine a method by which P2P connection can be established based on the first and second global address information, the first and second WAN-side address information, and the first and second local address information.

A fifth aspect of the present invention is directed to an integrated circuit built in a communication apparatus connectable to a network including the Internet. The integrated circuit comprises a global address information acquiring section for communicating with a server in the network and acquiring information on an address in the Internet assigned to the communication apparatus as first global address information; a WAN-side address information acquiring section for acquiring information on a WAN-side address assigned to a router directly connected to the communication apparatus as first WAN-side address information; a local address information acquiring section for acquiring information on an address in a local area network assigned to the communication apparatus as first local address information; an address information notification section for notifying the first global address information, the first WAN-side address information, and the first local address information to a communication partner apparatus wishing to perform P2P communication via a server in the network; and an address information acquiring section for acquiring, via a server in the network, second global address information which is information on an address in the Internet assigned to the communication partner apparatus, second WAN-side address information which is information on a WAN-side address assigned to a router directly connected to the communication partner apparatus, and second local address information which is information on an address in a local area network assigned to the communication partner apparatus. The first and second communication apparatuses each determine a method by which P2P connection can be established based on the first and second global address information, the first and second WAN-side address information, and the first and second local address information.

A sixth aspect of the present invention is directed to a computer readable recording medium storing a program for operating a computer apparatus connectable to a network including the Internet, such that the computer apparatus performs P2P communication with another computer apparatus. The program causes the computer apparatus to execute the steps of communicating with a server in the network and acquiring information on an address in the Internet assigned to the communication apparatus as first global address information; acquiring information on a WAN-side address assigned to a router directly connected to the communication apparatus as first WAN-side address information; acquiring information on an address in a local area network assigned to the communication apparatus as first local address information; notifying the first global address information, the first WAN-side address information, and the first local address information to the another computer apparatus wishing to perform P2P communication, via a server in the network; and acquiring, via a server in the network, second global address information which is information on an address in the Internet assigned to the another computer apparatus, second WAN-side address information which is information on a WAN-side address assigned to a router directly connected to the another computer apparatus, and second local address information which is information on an address in a local area network assigned to the another computer apparatus; and determining a method by which P2P connection can be established based on the first and second global address information, the first and second WAN-side address information, and the first and second local address information.

A seventh aspect of the present invention is directed to a communication apparatus connectable to a network. The communication apparatus comprises a global address information acquiring section for communicating with a server in the network and acquiring information on an address, in a sub network including the server, assigned to the communication apparatus as first global address information; a WAN-side address information acquiring section for acquiring information on a WAN-side address assigned to a router directly connected to the communication apparatus as first WAN-side address information; a local address information acquiring section for acquiring information on an address in a local area network assigned to the communication apparatus as first local address information; an address information notification section for notifying the first global address information, the first WAN-side address information, and the first local address information to a communication partner apparatus wishing to perform P2P communication via a server in the network; and an address information acquiring section for acquiring, via a server in the network, second global address information which is information on an address in the sub network assigned to the communication partner apparatus, second WAN-side address information which is information on a WAN-side address assigned to a router directly connected to the communication partner apparatus, and second local address information which is information on an address in a local area network assigned to the communication partner apparatus. The communication apparatus determines a method by which P2P connection can be established based on the first and second global address information, the first and second WAN-side address information, and the first and second local address information.

According to the present invention, a communication apparatus, method and program for realizing P2P communication even in a communication environment in which a network is constructed in a complicated manner are provided. Furthermore, a communication apparatus, method and program for realizing P2P communication even when the network structure is dynamically changed are provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1A shows an example of a network structure in which P2P communication control according to a first embodiment is performed;

FIG. 3A shows examples of IP addresses assigned to the user terminals and a P2P server;

FIG. 3B shows examples of WAN-side IP addresses and LAN-side IP addresses assigned to routers;

FIG. 6 shows an exemplary identification information management table;

FIG. 13A shows another exemplary format of a communication start request message in the case where a communication path for P2P communication cannot be secured;

FIG. 14B shows an exemplary format of a communication start response message which is sent from one user terminal to another user terminal;

FIG. 18B shows a specific sequence for performing P2P communication between the two terminals;

FIG. 19A is a flowchart showing an operation of a user terminal in a second embodiment;

FIG. 20 is a block diagram showing a detailed functional structure of a communication apparatus, which is a user terminal for performing a P2P connection establishment method according to the present invention;

FIG. 21A shows a sequence of operation of a user terminal for exchanging address information without configuring static NAT settings;

FIG. 21B shows a sequence of operation of a user terminal for exchanging address information without configuring static NAT settings.

DESCRIPTION OF THE PREFERRED EMBODIMENTS

Hereinafter, embodiments of the present invention will be described with reference to the drawings. In the following description, the term "address" refers to an IP address. Address information includes an IP address and a port number. Address information is classified into global address information, WAN-side address information, and local address information. IP address is classified into global IP address, WAN-side IP address, and local IP address. Accordingly, global address information includes a global IP address and a port number. WAN-side address information includes a WAN-side IP address and a port number. Local address information includes a local IP address and a port number.

First Embodiment

Figure 1B:
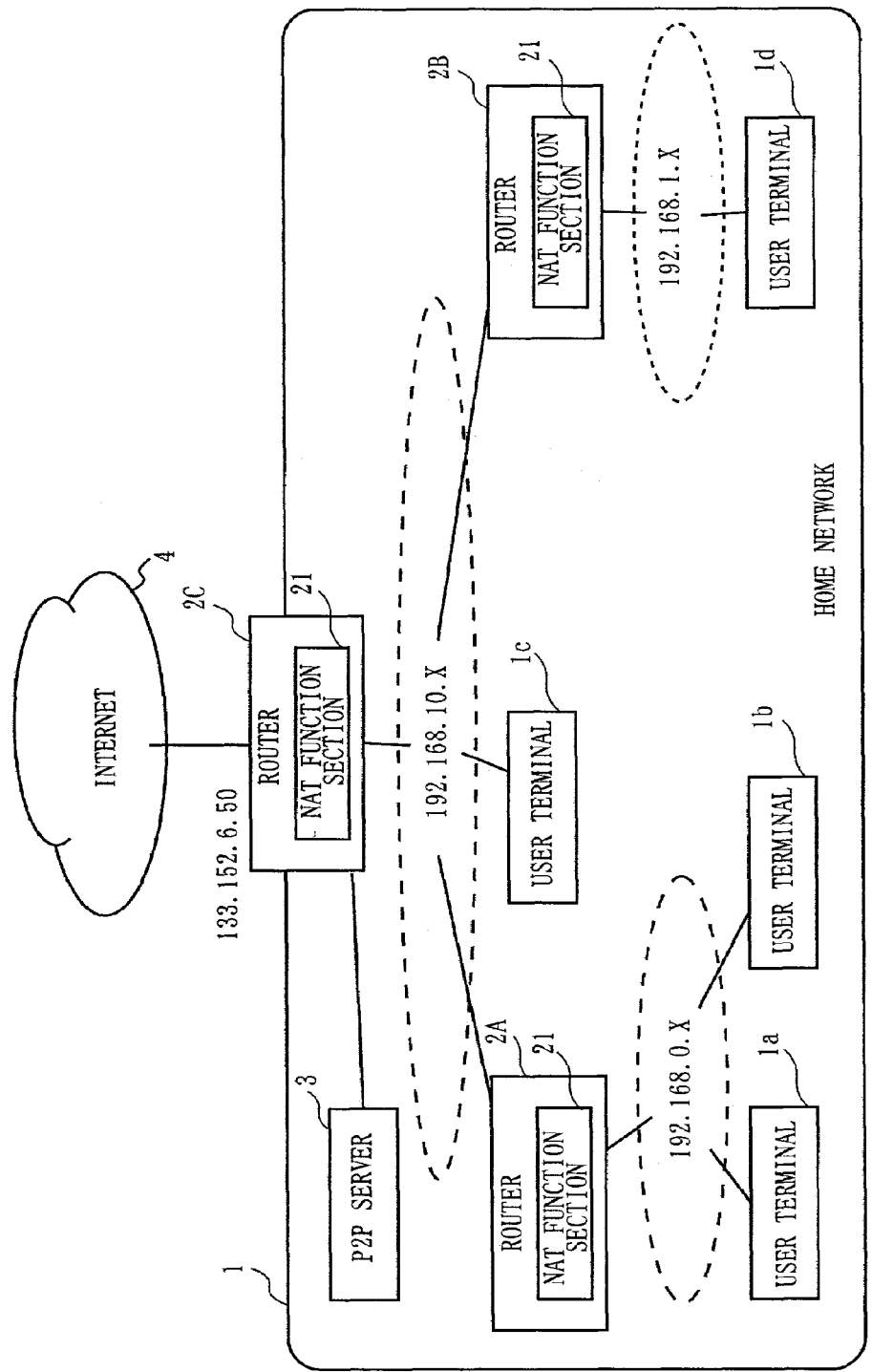
FIG. 1B shows another example of a network structure in which P2P communication control according to the first embodiment is performed.

FIG. 1A is a diagram showing an exemplary structure of a network in which P2P communication control according to a first embodiment of the present invention is performed. In FIG. 1A, the entire network includes a home network 1, a home network 2, a P2P server 3, and the Internet 4. The number of home networks and the number of P2P servers are not limited to those shown in FIG. 1A.

The home network 1 includes a plurality of routers 2A, 2B and 2C, and a plurality of user terminals 1a, 1b, 1c and 1d. The number of routers and the number of user terminals in the home network 1 are not limited to those shown in FIG. 1A. The routers 2A, 2B and 2C each include a NAT function section 21 for setting an address translation rule for translating address information of an internal network into address information of an external network. The router 2A, 2B and 2C connect the Internet 4 and the home networks (hereinafter, referred to as "subnets") to each other, or connect a plurality of subnets in the house to each other.

According to the present invention, "NAT" conceptually encompasses NAT in a narrow meaning for translating one address into another address, and also NAPT (Network Address Port Translation) for one address into N number of addresses using port numbers.

The home network 2 includes a router 2D and a user terminal 1e. The router 2D includes a NAT function section 21. The router 2D connects the user terminal 1e and the Internet 4 to each other. The number of routers and the number of user terminals in the home network 2 are not limited to those shown in FIG. 1A.

The P2P server 3 has a communication path between the user terminals 1a through 1e. The P2P server 3 is a server having a function of managing identification information of the user terminals 1a through 1e so as to relay communication between the user terminals, and a function of notifying each user terminal of global address information assigned to the user terminal itself by the router 2C for performing communication via the Internet 4. The P2P server 3 only needs to have the above functions, and thus any server having the above functions can act as a P2P server. Herein, the P2P server 3 is connected to the Internet 4, but the P2P server 3 may alternatively be present in a home network as long as the above functions can be provided. In the case where a P2P server is present in a home network, the functions of the P2P server may be incorporated into a router.

The Internet 4 performs communication using global address information.

Figure 2:
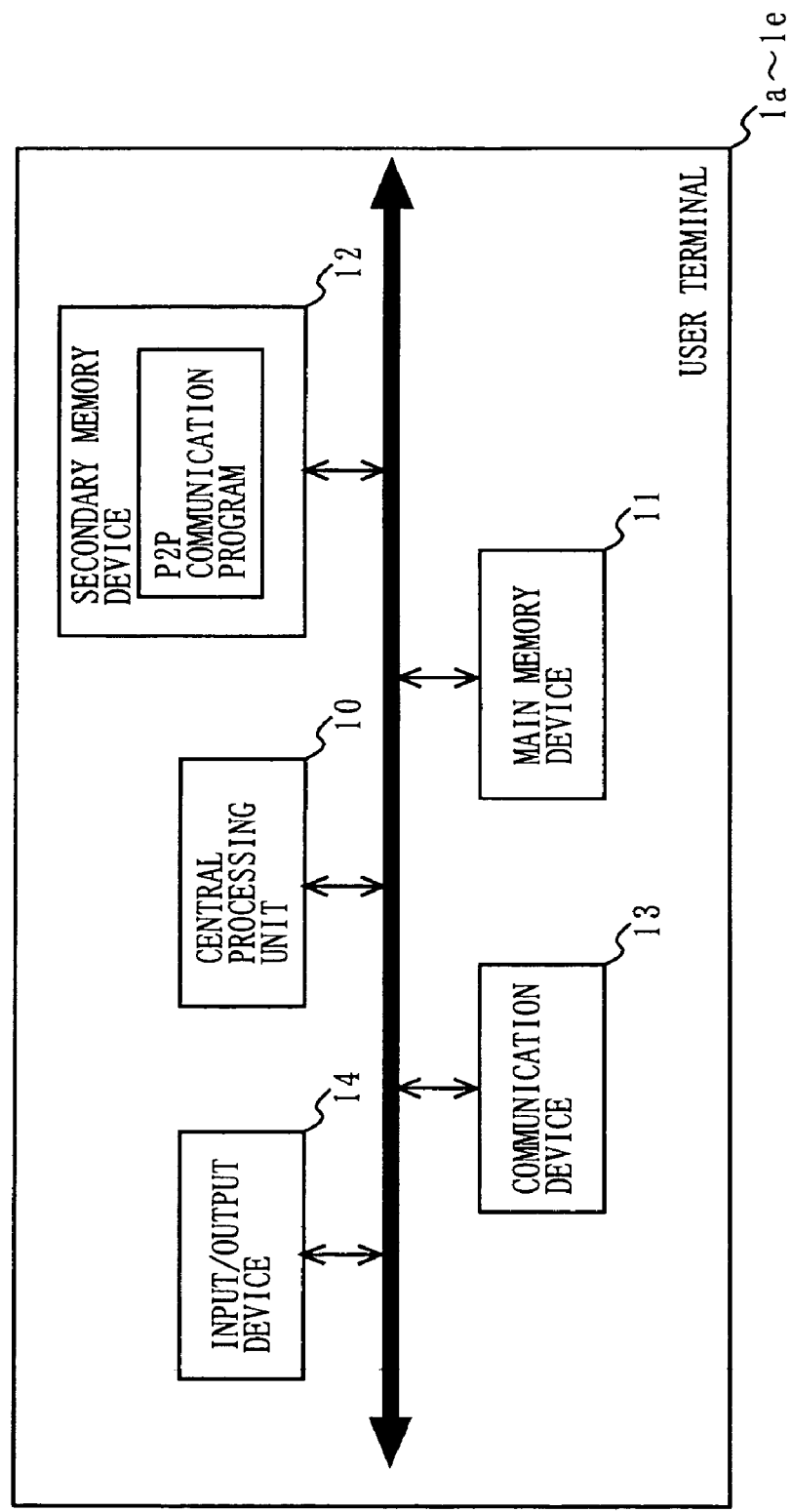
FIG. 2 is a block diagram showing a hardware structure of user terminals each as a communication apparatus.

FIG. 2 is a block diagram showing a hardware structure of the user terminals 1a through 1e, which are communication apparatuses. The user terminals 1a through 1e have substantially the same hardware structures as one another, and thus the hardware structure of the user terminal 1a will be described hereinafter.

In FIG. 2, the user terminal 1a includes a central processing unit 10, a main memory device 11, a secondary memory device 12, a communication device 13, and an input/output device 14. The central processing unit 10 causes the main memory device 11 to read a program stored in the secondary memory device 12 or the main memory device 11 so as to execute the program and thus to control the entire operation of the user terminal 1a. The main memory device 11 stores information necessary for the operation of the central processing unit 10. The secondary memory device 12 stores information necessary for the operation of the central processing unit 10 and also has a program to be executed by the central processing unit 10 stored therein. Herein, a program for realizing P2P communication (hereinafter, referred to as a "P2P communication program") is stored in the secondary memory device 12. The communication device 13 is a device for realizing communication with an external device. The input/output device 14 is a device for receiving inputs from the user and for outputting results of processing performed by the central processing unit 10. The user terminal 1a executes the P2P communication program and thus realizes P2P communication with other user terminals.

FIG. 3A shows examples of IP addresses assigned to the user terminals 1a through 1e and the P2P server 3. As shown in FIG. 3A, the user terminals 1a and 1b downstream with respect to the router 2A are respectively assigned "192.168.0.100" and "192.168.0.101", which are both "192.168.0.X"-system IP addresses. The user terminal 1c downstream with respect to the router 2C is assigned "192.168.10.2", which is a "192.168.10.X"-system IP address. The user terminal 1d downstream with respect to the router 2B is assigned "192.168.1.10", which is a "192.168.1.X"-system IP address. The user terminal 1e downstream with respect to the router 2D is assigned "192.168.0.30", which is a "192.168.0.X"-system IP address. The P2P server 3 is assigned "132.186.9.10". Since the P2P server 3 is directly connected to the Internet 4, the IP address assigned to the P2P server 3 is a global IP address.

FIG. 3B shows examples of WAN-side IP addresses and LAN-side IP addresses assigned to the routers. As shown in FIG. 3B, the router 2A is assigned a WAN-side IP address of "192.168.10.5" and a LAN-side IP address of "192.168.0.1". Since the IP addresses assigned to the user terminals downstream with respect to the router 2A are of the "192.168.0.X" system, the LAN-side IP address of the router 2A is "192.168.0.1". The router 2B is assigned a WAN-side IP address of "192.168.10.4" and a LAN-side IP address of "192.168.1.255". Since the IP address assigned to the user terminal downstream with respect to the router 2B is of the "192.168.1.X" system, the LAN-side IP address of the router 2B is "192.168.1.255". The router 2C is assigned a WAN-side IP address of "133.152.6.50" and a LAN-side IP address of "192.168.10.1". Since the IP address assigned to the user terminal downstream with respect to the router 2C is of the "192.168.10.X" system, the LAN-side IP address of the router 2C is "192.168.10.1". Since the router 2A is downstream with respect to the router 2C, the WAN-side IP address of the router 2A is "192.168.10.5", which is of the "192.168.10.X" system. Similarly, since the router 2B is downstream with respect to the router 2C, the WAN-side IP address of the router 2B is "192.168.10.4", which is of the "192.168.10.X" system. Since the router 2C is directly connected to the Internet 4, the WAN-side IP address of the router 2C is a global IP address. The router 2D is assigned a WAN-side IP address of "133.121.2.15" and a LAN-side IP address of "192.168.0.1". Since the router 2D is directly connected to the Internet 4, the WAN-side IP address of the router 2D is a global IP address. Although the routers 2A and 2D are assigned the same LAN-side IP address, no problem arises because the routers 2A and 2D are in different home networks.

Figure 4:
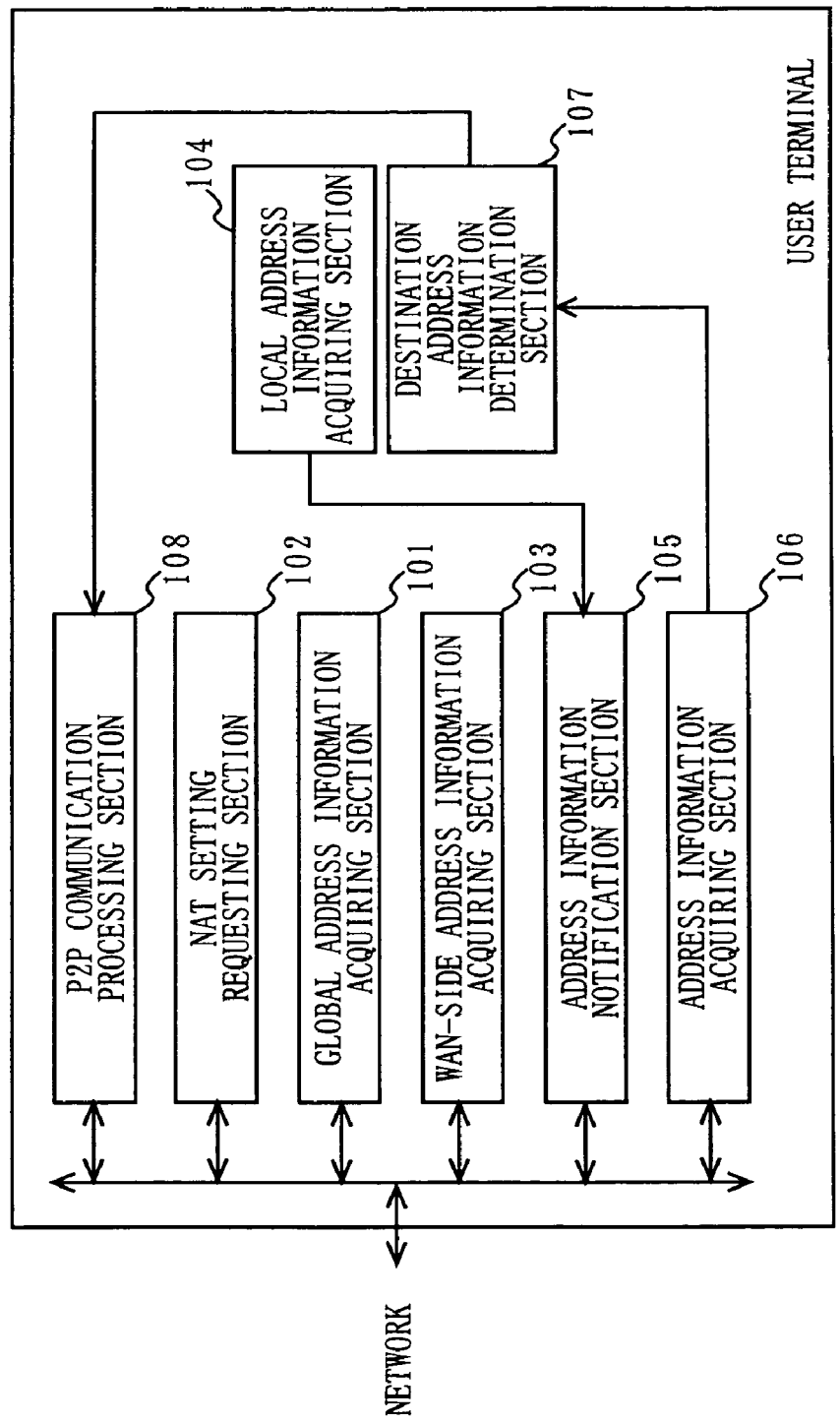
FIG. 4 is a block diagram showing a functional structure of a user terminal, which is a communication device for performing a P2P communication program.

FIG. 4 is a block diagram showing a functional structure of a user terminal, which is a communication device for performing the P2P communication program. In FIG. 4, the user terminal includes a global address information acquiring section 101, a NAT setting requesting section 102, a WAN-side address information acquiring section 103, a local address information acquiring section 104, an address information notification section 105, an address information acquiring section 106, a destination address information determination section 107, and a P2P communication processing section 108.

The global address information acquiring section 101 communicates with the P2P server 3 and thus acquires global address information assigned to its own user terminal. The global address information acquiring section 101 stores the acquired global address information in a memory device (not shown).

The NAT setting requesting section 102 requests and sets an address translation rule in a router which is directly connected to its own user terminal.

The WAN-side address information acquiring section 103 communicates with the directly connected router and acquires WAN-side address information assigned to its own user terminal based on the set address translation rule which is set in the router. The WAN-side address information acquiring section 103 stores the acquired WAN-side address information in a memory device (not shown)

The local address information acquiring section 104 acquires local address information assigned to its own user terminal. For example, the local address information acquiring section 104 acquires local address information assigned to its own user terminal and stored in a memory device (not shown). Hereinafter, global address information, WAN-side address information, and local address information which are assigned to the user terminal which includes the sections mentioned above will be referred to as "first global address information", "first WAN-side address information", and "first local address information", respectively.

The address information notification section 105 notifies the first global address information acquired by the global address information acquiring section 101, the first WAN-side address information acquired by the WAN-side address information acquiring section 103, and the first local address information acquired by the local address information acquiring section 104 to a communication apparatus as a communication partner which wishes to perform P2P communication via the P2P server 3. The user terminal may notify such address information via a server other than the P2P server 3. (In this specification, a communication apparatus as a communication partner is also referred to as a "communication partner apparatus").

The address information acquiring section 106 acquires global address information, WAN-side address information, and local address information assigned to the communication apparatus of the communication partner via the P2P server 3. Hereinafter, global address information, WAN-side address information, and local address information which are assigned to the communication apparatus of the communication partner will be referred to as "second global address information", "second WAN-side address information", and "second local address information", respectively. The address information acquiring section 106 may acquire such address information assigned to the communication apparatus of the communication partner via a server other than the P2P server 3.

The destination address information determination section 107 determines whether or not to start P2P communication with the communication apparatus of the communication partner using one of the second global address information, the second WAN-side address information, and the second local address information acquired by the address information acquiring section 106. When the destination address information determination section 107 determines to start P2P communication using one of the address information, the destination address information determination section 107 sends the address information to be used to the P2P communication processing section 108. When the destination address information determination section 107 determines to start P2P communication without using any of the address information, the destination address information determination section 107 instructs the P2P communication processing section 108 to wait for a P2P communication request from the communication apparatus of the communication partner, or to switch the P2P connection establishment method.

When instructed to start P2P communication using one of the address information by the destination address information determination section 107, the P2P communication processing section 108 starts P2P communication with the communication apparatus of the communication partner using the instructed address information. When instructed to wait for a P2P communication request from the communication apparatus of the communication partner by the destination address information determination section 107, the P2P communication processing section 108, upon receipt of a P2P communication request from the communication apparatus of the communication partner, uses sender address information of the request to respond to the communication apparatus of the communication partner, and thus starts P2P communication. When instructed to switch the P2P connection establishment method to start P2P communication, the P2P communication processing section 108 switches the P2P connection establishment method to a P2P server connection establishment method or a STUN connection establishment method and thus starts P2P communication. The STUN connection establishment method is a connection establishment method disclosed in RFC 3489—STUN —Simple Traversal Of User Datagram Protocol (UDP) Through Network Address Translators (NATs).

Hereinafter, an operation of the user terminals and the P2P server 3 for performing P2P communication will be described. Although the operation will be described referring to the exemplary user terminals in the network shown in FIG. 1A when necessary, the P2P communication method according to the present invention is not limited to being applied only to the network shown in FIG. 1A. Although the operation will be described referring to exemplary IP addresses for easier understanding, the P2P communication method according to the present invention is not limited to being applied only to the exemplary IP addresses described here. The operation of the user terminals is realized by execution of a P2P communication program.

Before starting P2P communication, each user terminal executes processing of registering identification information (identification information registration processing) in the P2P server 3. The following description will be given with the assumption that the user terminal 1a executes identification information registration processing, but the other user terminals operate in substantially the same manner.

Figure 5:
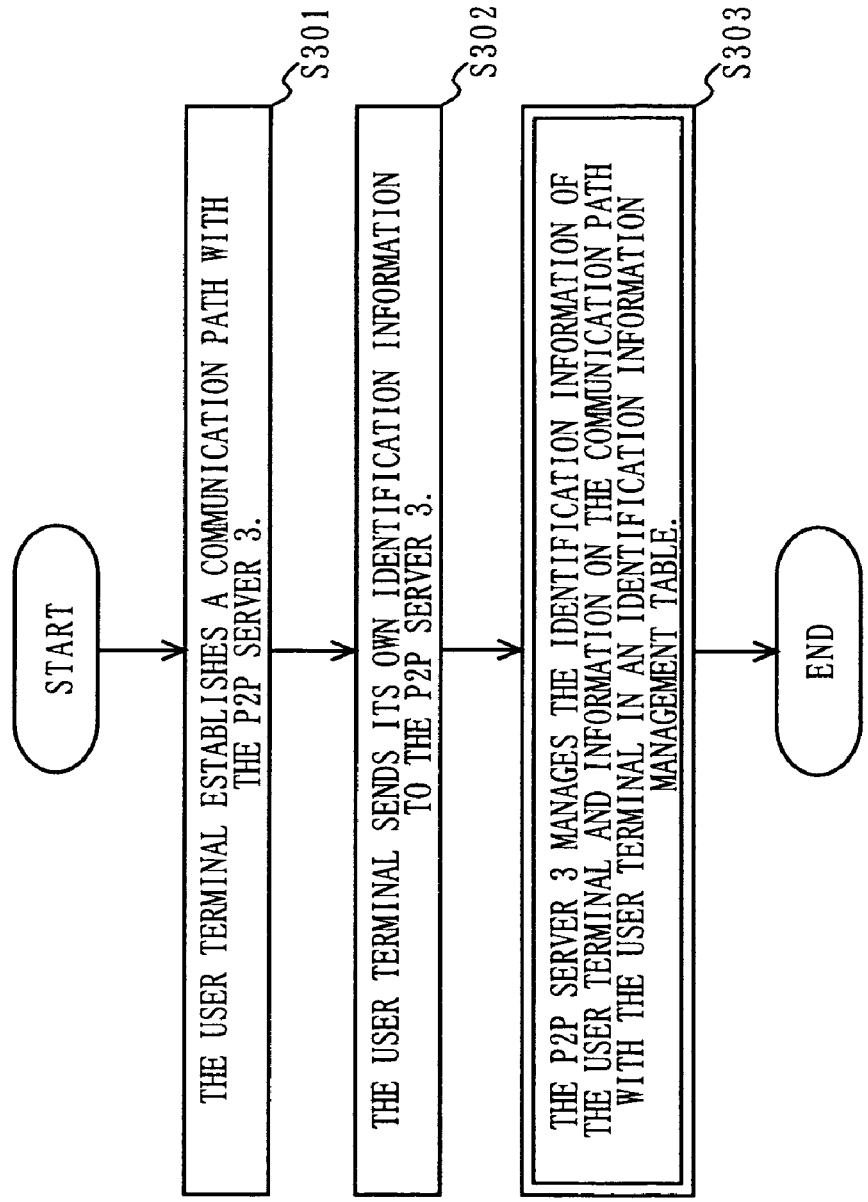
FIG. 5 is a flowchart showing an operation of one of the user terminals and the P2P server for executing identification information registration processing.

FIG. 5 is a flowchart showing an operation of the user terminal 1a and the P2P server 3 for executing identification information registration processing. Hereinafter, the operation of the user terminal 1a and the P2P server 3 for executing identification information registration processing will be described with reference to FIG. 5. In FIG. 5, the operation of the user terminal 1a is described in the single-line boxes, and the operation of the P2P server 3 is described in the double-line box.

First, the user terminal 1a establishes a communication path between the user terminal 1a and the P2P server 3 (step S301). The communication path can be established by a well-known method. Communication from the user terminal 1a to the P2P server 3 is communication from the LAN side of the routers to the WAN side of the routers, like the usual Web access. Accordingly, the communication path is automatically secured by a well-known dynamic NAT. By the dynamic NAT, a return communication path from the P2P server to the user terminal 1a including paths in between is automatically secured, in correspondence with a path to the turning point from the user terminal 1a to the P2P server 3. Namely, by using the dynamic NAT, a NAT translation table in accordance with an address translation rule is created by the dynamic NAT settings in a router on the communication path. The dynamic NAT is a type of NAT, by which the address translation rule is changed each time the NAT settings are configured.

Next, the user terminal 1a sends its own identification information to the P2P server 3 (step S302). The identification information is information for identifying the user terminal, for example, the mail address of the user terminal 1a.

Next, the P2P server 3 associates information on the communication path between the P2P server 3 and the user terminal 1a (hereinafter, referred to as "communication path information") and the identification information of the user terminal 1a with each other, and manages the resultant correspondence in an identification information management table (step S303). The "communication path information" conceptually encompasses information on a destination address used for sending a message to the user terminal 1a and a port number.

FIG. 6 shows an exemplary identification information management table. As shown in FIG. 6, an identification information management table includes, for example, communication path information and additional information which are associated with identification information of each user terminal.

As described above, identification information of each user terminal is registered together with the communication path information in the P2P server 3 by execution of the identification information registration processing.

For starting P2P communication between a first user terminal and a second user terminal, the first and second user terminals perform processing of exchanging necessary information. Processing performed by a sending-side user terminal (for example, the first user terminal) for exchanging necessary information is referred to as sending-side information exchange processing. Processing performed by a receiving-side user terminal (for example, the second user terminal) for exchanging necessary information is referred to as receiving-side information exchange processing.

Figure 7:
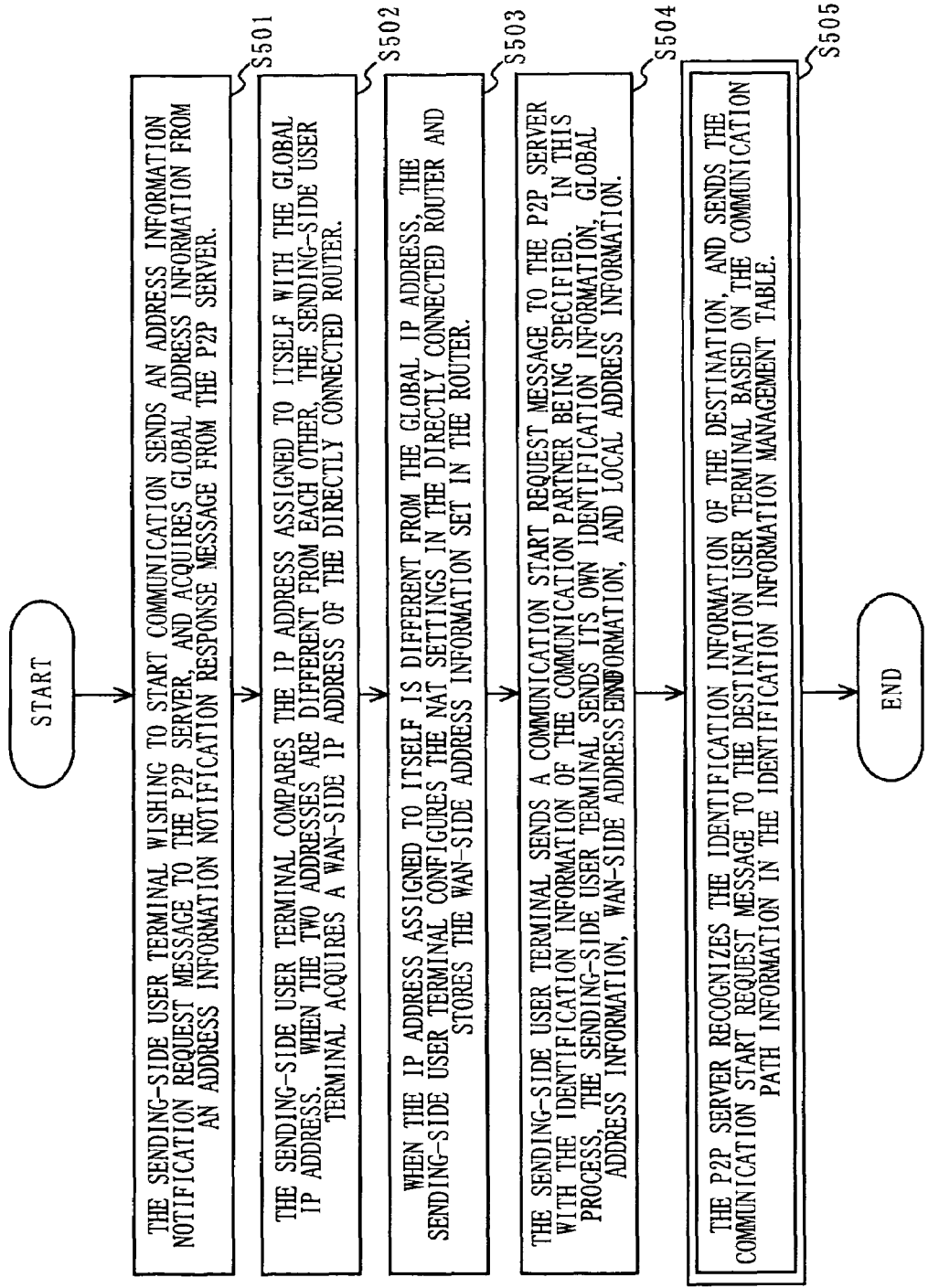
FIG. 7 is a flowchart showing an operation of a sending-side user terminal and the P2P server for performing sending-side information exchange processing.

FIG. 7 is a flowchart showing an operation of the sending-side user terminal and the P2P server 3 for performing the sending-side information exchange processing. Hereinafter, with reference to FIG. 7, the operation of the sending-side user terminal and the P2P server 3 for performing the sending-side information exchange processing will be described. In FIG. 7, the operation of the sending-side user terminal is described in the single-line boxes, and the operation of the P2P server 3 is described in the double-line box.

First, the sending-side user terminal wishing to start P2P communication sends an address information notification request message to the P2P server 3, receives an address information notification response message from the P2P server 3, and acquires global address information from the address information notification response message (step S501). The operation in step S501 is realized by the global address information acquiring section 101. In step S501, the sending-side user terminal may acquire only a global IP address as the global address information.

Figure 8A:
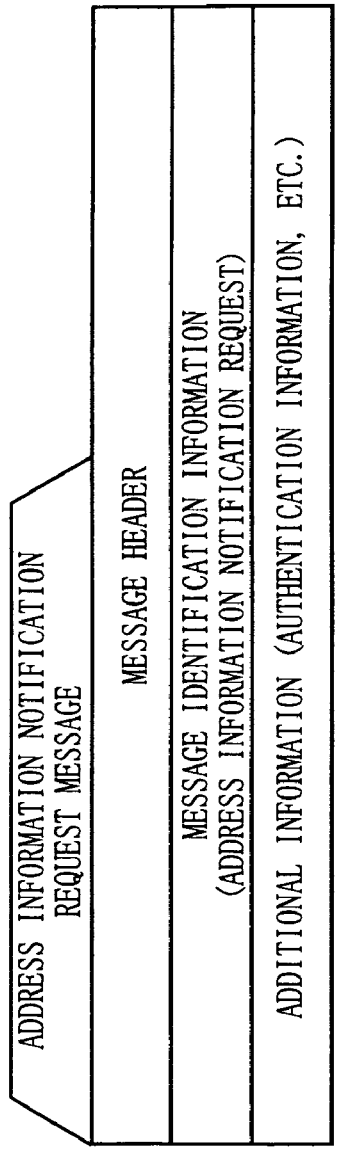
FIG. 8A shows an exemplary format of an address information notification request message.
Figure 8B:
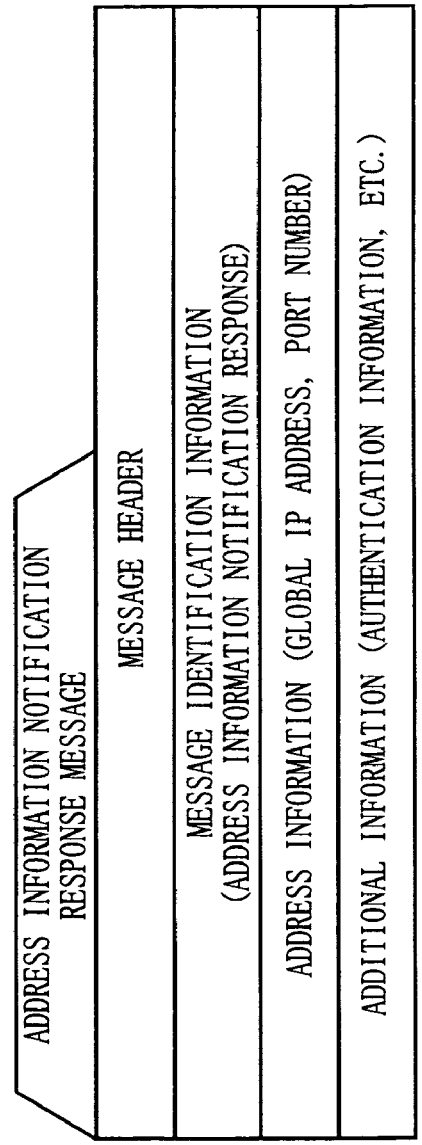
FIG. 8B shows an exemplary format of an address information notification response message.

FIG. 8A shows an exemplary format of an address information notification request message. FIG. 8B shows an exemplary format of an address information notification response message.

As shown in FIG. 8A, an address information notification request message includes a message header, message identification information, and additional information. In the message header, the sending-side user terminal describes the address information of the sending-side user terminal as the sender address information, and describes the global address information of the P2P server 3 as the destination address information. Each time the address information notification request message passes through a router, the sender address information in the message header is replaced with WAN-side address information, i.e., a set of a WAN-side IP address and a port number, of the router which the message has passed through. Accordingly, when the address information notification request message reaches the P2P server 3, the sender address information in the message header has been replaced with a set of a WAN-side IP address (global address) and a port number of the last router which the message passed through. As the message identification information, information indicating that the message is an address information notification request is described. As the additional information, authentication information or the like is described.

In the above, the P2P server 3 is connected to the Internet 4. Alternatively, in the case where user terminals performing P2P communication are connected to the same private network, the P2P server 3 may be present in the private network instead of the Internet 4. In this case, the P2P server 3 needs to be connected to a router (having a NAT function) connected to both of the user terminals performing P2P communication or to a router (having a NAT function) upstream (on the WAN side) with respect to such user terminals (see FIG. 1B).

In this case, the global address information is information on an address space of the LAN-side segment of the router connected to the P2P server 3. Namely, the global address information is information on an address, in a sub network including the P2P server 3, assigned to the user terminal itself. Accordingly, the global address information is, actually, information of a private address space. The procedure used for connection is, however, substantially the same as the procedure in the case where the P2P server 3 is connected to the Internet 4.

Namely, the user terminal communicates with the P2P server 3 on the network, and acquires information on an address, in the sub network including the P2P server 3 (for example, 192.168.10.X system), assigned to the user terminal itself as first global address information. The user terminal also acquires information on a WAN-side address assigned to a router directly connected to the user terminal itself as first WAN-side address information. Furthermore, the user terminal acquires information on an address in a local area network assigned to the user terminal itself as first local address information. Then, the user terminal notifies a communication partner apparatus wishing to perform P2P communication of the first global address information, the first WAN-side address information, and the first local address information via the P2P server 3. After that, the user terminal acquires second global address information which is information on an address, in the sub network including the P2P server 3, assigned to the communication partner apparatus, second WAN-side address information which is information on a WAN-side address assigned to a router directly connected to the communication partner apparatus, and second local address information which is information on an address in a local area network assigned to the communication partner apparatus via the P2P server 3. The user terminal determines a method by which P2P connection can be established based on the first and second global address information, the first and second WAN-side address information, and the first and second local address information which have been acquired.

As shown in FIG. 8B, an address information notification response message includes a message header, message identification information, address information, and additional information. In the message header, the P2P server 3 describes the sender address information and the destination address information. As the message identification information, information indicating that the message is a response to the address information notification request is described. As the additional information, authentication information or the like is described. Upon receipt of the address information notification request message, the P2P server 3 retrieves the sender address information described in the message header of the address information notification request message. As described above, the sender address information is a set of a WAN-side IP address (global IP address) and a port number of the last router which the message passed through. The P2P server 3 describes the retrieved sender address information (the global IP address and the port number) in the section of address information. The P2P server sends the created address information notification response message in accordance with the communication path information (FIG. 6). The address information notification response message sent from the P2P server 3 passes through the routers in the opposite direction from the address information notification request message and reaches the sending-side user terminal. In this process, a NAT translation table in accordance with the address translation rule provided by the dynamic NAT settings is used.

As described above, the sender address information in the message header of the address information notification request message retrieved by the P2P server 3 indicates the address information translated by the last router which the message passed through using the dynamic NAT, i.e., the address information assigned a port number exclusive for the sending-side user terminal, which is also the global address information assigned to the sending-side user terminal. For example, when the user terminal 1a sends an address information notification request message, the sender address information includes the global IP address of the router 2C and the port number which is set for the user terminal 1a by the router 2C. It should be noted that since the dynamic NAT settings are used, the global address information generally accepts only the communication from the P2P server 3.

Next, the sending-side user terminal compares the IP address assigned to itself with the global IP address included in the address information notification response message. When the two addresses are different from each other, the sending-side user terminal acquires a WAN-side IP address of a router directly connected to the sending-side user terminal using the UPnP•IGD protocol or the like (step S502). In this specification, the term "upstream router" refers to a router which is present on the Internet side with respect to a user terminal. When the IP address assigned to the sending-side user terminal and the global IP address included in the address information notification response message are different from each other, it means that the sending-side user terminal is connected to the Internet 4 via a router. Accordingly, the IP address assigned to the sending-side user terminal is a local IP address. When using, for example, the UPnP•IGD protocol, the sending-side user terminal can acquire the WAN-side IP address of an upstream router by sending a GetExternalIPAddress action message to the upstream router. At this time, the IP address can be acquired but the port number cannot be acquired.

When the IP address assigned to the sending-side user terminal and the global IP address are different from each other, the sending-side user terminal uses the UPnP•IGD protocol or the like to configure NAT settings in the upstream router and stores the WAN-side address information set in the upstream router (step S503). The operation in step S503 is realized by the NAT setting requesting section 102 and the WAN-side address information acquiring section 103.

When using, for example, the UPnP•IGD protocol or the like, the sending-side user terminal can configure NAT settings in the upstream router by sending an AddPortMapping action message to the upstream router. By sending the AddPortMapping action message, the sending-side user terminal informs the upstream router of the port number to be set and requests the NAT settings with that port number. The NAT settings in step S503 need to be maintained regardless of start or termination of communication. NAT settings which are maintained regardless of start or termination of communication is referred to as "static NAT settings". Dynamic NAT settings are automatically provided when the communication is started and canceled when the communication is terminated. By contrast, static NAT settings can be set regardless of start or termination of the communication. Static NAT settings can be provided even before the communication is started. Static NAT settings are maintained until being cancelled.

When storing the WAN-side address information, the sending-side user terminal does not need to acquire the WAN-side address information in step S503 because the WAN-side address information has already been acquired in step S502. In response to the operation of the sending-side user terminal in step S502, static NAT settings are configured in the upstream router and a NAT translation table is created in accordance with the address translation rule of the static NAT settings.

Needless to say, the sending-side user terminal knows, or is given in advance, the identification information of the partner wishing to communicate. The sending-side user terminal sends a communication start request message to the P2P server 3 with the identification information of the communication partner being specified. In this process, the sending-side user terminal sends its own identification information, its own global address information (the first global address information), its own local address information (the first local address information), and the WAN-side address information of the upstream router (the first WAN-side address information) (step S504). The operation in step S504 is realized by the address information notification section 105.

Figure 9A:
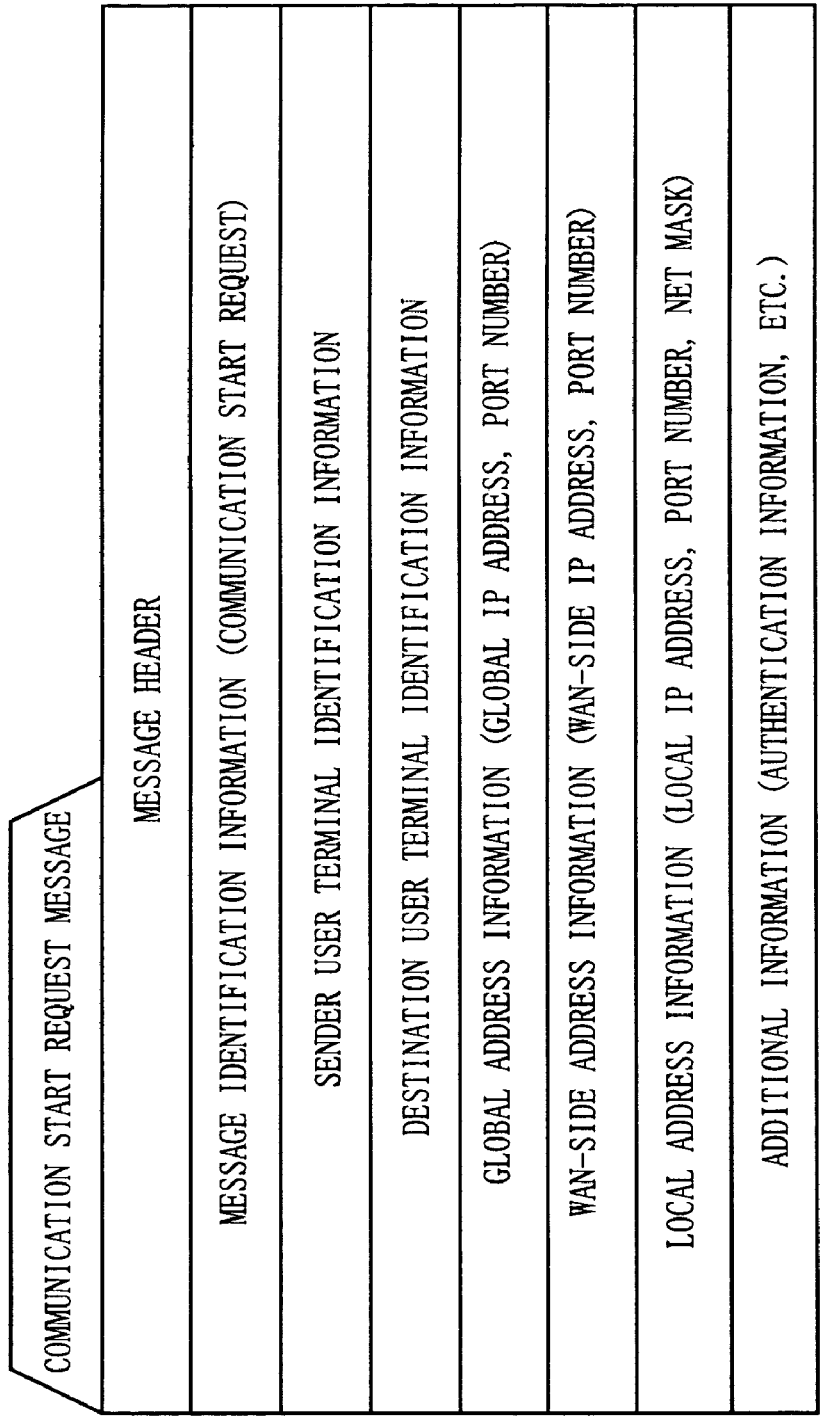
FIG. 9A shows an exemplary format of a communication start request message.

FIG. 9A shows an exemplary format of a communication start request message. As shown in FIG. 9A, a communication start request message includes a message header, message identification information, sender user terminal identification information, destination user terminal identification information, global address information of the sending-side user terminal (first global address information), WAN-side address information of the upstream router (first WAN-side address information), local address information of the sending-side user terminal (first local address information), and additional information.

The message identification information is information indicating that the message is a communication start request. The sender user terminal identification information is identification information of the sending-side user terminal. The destination user terminal identification information is identification information of the user terminal as the communication partner. The global address information is the global address information (the global IP address and the port number) acquired in step S501. The WAN-side address information of the upstream router is the WAN-side address information (the WAN-side IP address and the port number) stored in step S503. The local address information is the local IP address assigned to, and the port number used by, the sending-side user terminal. The local address information of the sending-side user terminal includes a net mask. The net mask does not need to be included if a variable portion of the IP address can be recognized without the net mask. The additional information is authentication information or the like.

When, in step S502, the IP address assigned to the sending-side user terminal and the global IP address included in the address information notification response message match each other, it means that the sending-side user terminal is directly connected to the Internet 4 via no router. Namely, the local IP address of the sending-side user terminal is a global IP address. In such a case, the sending-side user terminal sends a communication start request message to the P2P server 3, using the global IP address and the port number assigned to the sending-side user terminal as the global address information, using the WAN-side IP address and the port number assigned to the sending-side user terminal as the WAN-side address information, and using the local IP address and the port number assigned to the sending-side user terminal as the local address information.

The P2P server 3 receives the message from the user terminal and refers to the message identification information to recognize that the message is a communication start request. The P2P server 3 then refers to the destination user terminal identification information to recognize the identification information of the destination user terminal. Then, the P2P server refers to the identification information management table to determine the communication path to the destination user terminal based on the communication path information corresponding to the recognized identification information. The P2P server 3 sends the communication start request message received from the sending-side user terminal such that the message passes through the determined communication path to the destination user terminal (step S505). By this operation, the communication start request message from the sending-side user terminal is transferred to the receiving-side user terminal, which is the communication partner.

It is preferable that the address information notification request message and the communication start request message each include information for authentication. It is preferable that the P2P server 3 confirms that the communication is communication from an authentic user terminal to enhance the security level by using the authentication information of each user terminal which is managed by the identification information management table. The P2P server 3 may enhance the security level by attaching authentication information, which indicates the authenticity of the P2P server 3, to the address information notification response message or the communication start request message to be transferred by the P2P server 3.

Figure 10:
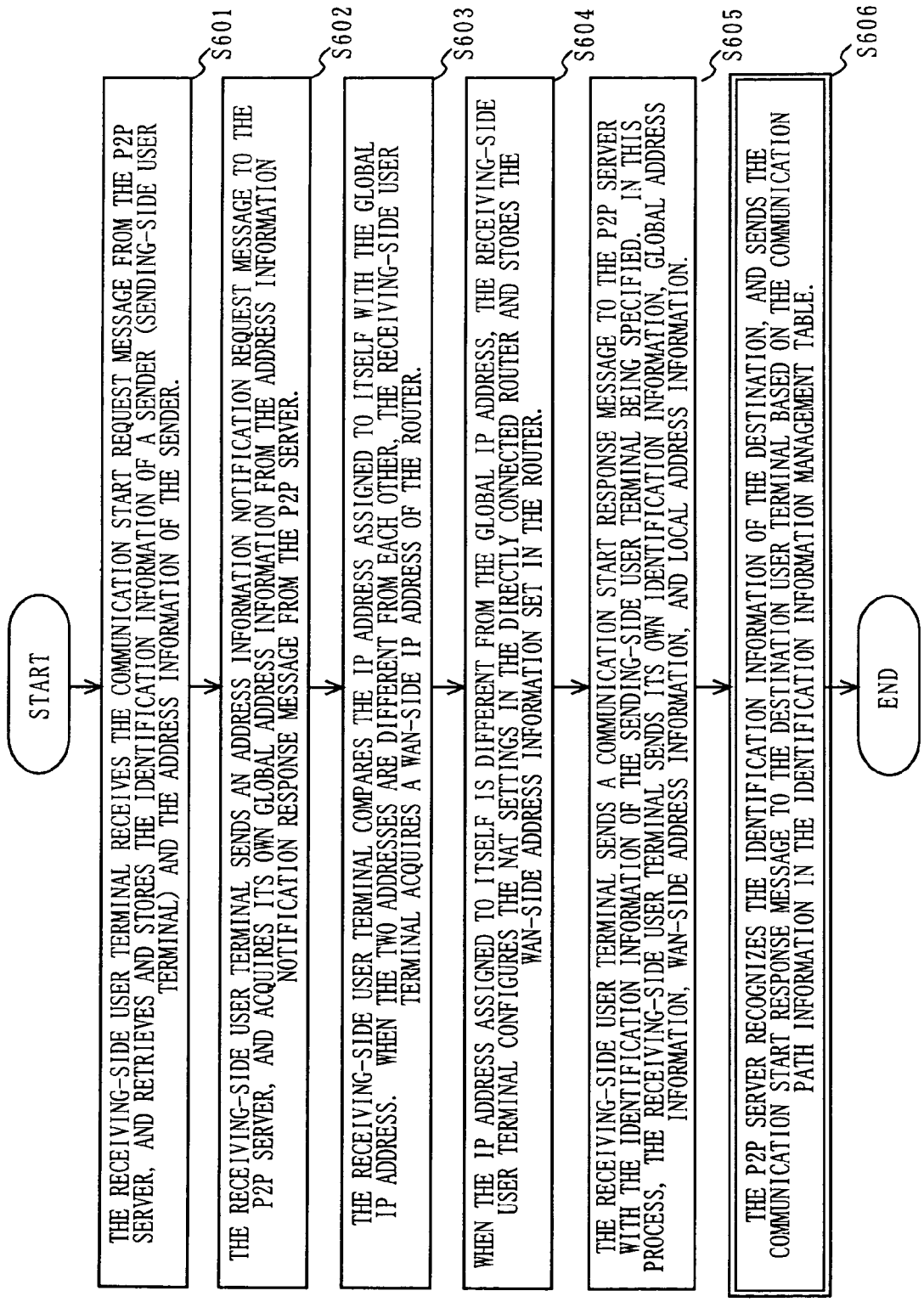
FIG. 10 is a flowchart showing an operation of a destination user terminal and the P2P server for executing receiving-side information exchange processing.

FIG. 10 is a flowchart showing an operation of the receiving-side user terminal and the P2P server 3 for executing the receiving-side information exchange processing. Hereinafter, with reference to FIG. 10, the operation of the receiving-side user terminal and the P2P server 3 for performing the receiving-side information exchange processing will be described. In FIG. 10, the operation of the receiving-side user terminal is described in the single-line boxes, and the operation of the P2P server 3 is described in the double-line box.

First, the receiving-side user terminal receives the communication start request message transferred from the P2P server 3. The receiving-side user terminal retrieves the identification information of sender user terminal (sending-side user terminal), and also retrieves the global address information (the first global address information), the WAN-side address information (the first WAN-side address information), and the local address information (the first local address information) which are described in the communication start request message as the address information of the sender user terminal. The receiving-side user terminal stores the retrieved identification information and address information of the sender user terminal in the state where the two types of information are associated with each other (step S601). The operation in step S601 is realized by the address information acquiring section 106.

Next, the receiving-side user terminal sends an address information notification request message to the P2P server 3, and acquires the global address information of the receiving-side user terminal (the second global address information) from the address information notification response message sent from the P2P server 3 (step S602). The processing in step S602 is basically the same as the processing of the sending-side user terminal for acquiring the global address information (step S501). The operation in step S602 is realized by the global address information acquiring section 101. In step S602, the receiving-side user terminal may acquire only the global IP address as the global address information.

Next, the receiving-side user terminal compares the IP address assigned to itself with the global IP address included in the address information notification response message. When the two addresses are different from each other, the receiving-side user terminal acquires a WAN-side IP address of an upstream router using the UPnP•IGD protocol or the like (step S603). When the IP address assigned to the receiving-side user terminal and the global IP address included in the address information notification response message are different from each other, it means that the receiving-side user terminal is connected to the Internet 4 via a router. Accordingly, the IP address assigned to the receiving-side user terminal is a local IP address. When using, for example, the UPnP•IGD protocol, the receiving-side user terminal can acquire the WAN-side IP address of the upstream router by sending a GetExternalIPAddress action message to the upstream router. At this time, the IP address can be acquired but the port number cannot be acquired.

When the IP address assigned to the receiving-side user terminal and the global IP address are different from each other, the receiving-side user terminal uses the UPnP•IGD protocol or the like to configure static NAT settings in the upstream router and stores the WAN-side address information set in the upstream router (step S604). When using, for example, the UPnP•IGD protocol or the like, the receiving-side user terminal can configure NAT settings in the upstream router by sending an AddPortMapping action message to the upstream router. The operation in steps S603 and S604 is realized by the NAT setting requesting section 102 and the WAN-side address information acquiring section 103.

Next, the receiving-side user terminal sends a communication start response message to the P2P server 3 with the identification information of the sending-side user terminal being specified. In this process, the receiving-side user terminal sends its own identification information, its own global address information (the second global address information), the WAN-side address information of the upstream router (the second WAN-side address information), and its own local address information (the second local address information) (step S605). The operation in step S605 is realized by the address information notification section 105.

Figure 9B:
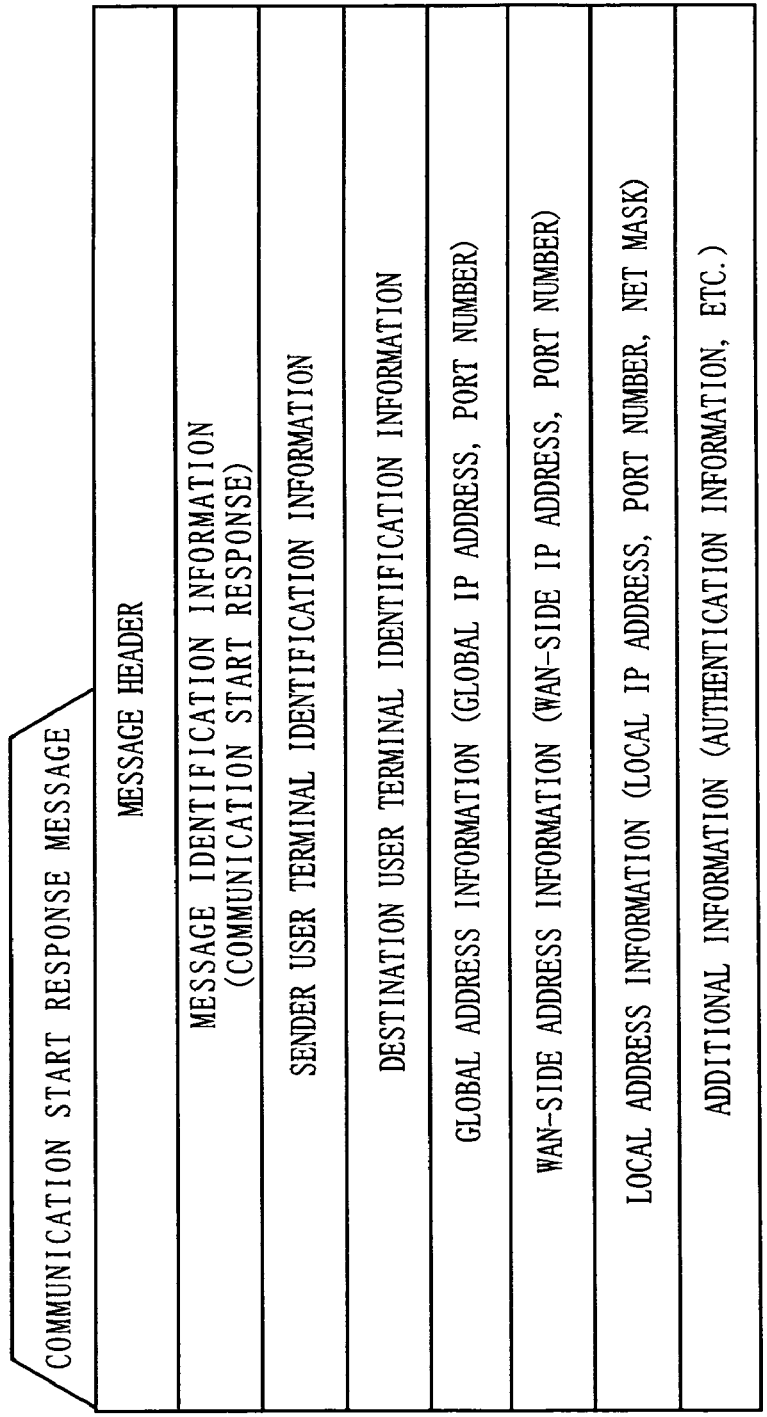
FIG. 9B shows an exemplary format of a communication start response message.

FIG. 9B shows an exemplary format of a communication start response message. As shown in FIG. 9B, a communication start response message includes a message header, message identification information, sender user terminal identification information, destination user terminal identification information, global address information of the receiving-side user terminal (second global address information), WAN-side address information of the upstream router (second WAN-side address information), local address information of the receiving-side user terminal (second local address information), and additional information.

The message identification information is information indicating that the message is a response to the communication start request. The sender user terminal identification information is identification information of the receiving-side user terminal. The destination user terminal identification information is identification of the sending-side user terminal, which is the communication partner. The global address information is the global address information (the global IP address and the port number) acquired in step S602. The WAN-side address information of the upstream router is the WAN-side address information (the WAN-side IP address and the port number) stored in step S604. The local address information of the receiving-side user terminal is the local IP address assigned to, and the port number used by, the receiving-side user terminal. The local address information of the receiving-side user terminal includes a net mask. The net mask does not need to be included if a variable portion of the IP address can be recognized without the net mask. The additional information is authentication information or the like.

When, in step S603, the IP address assigned to the receiving-side user terminal and the global IP address included in the address information notification response message match each other, it means that the receiving-side user terminal is directly connected to the Internet 4 via no router. Namely, the local IP address of the receiving-side user terminal is a global IP address. In such a case, the receiving-side user terminal sends the communication start response message to the P2P server 3, using the global IP address and the port number assigned to the receiving-side user terminal as the global address information, using the WAN-side IP address and the port number assigned to the receiving-side user terminal as the WAN-side address information, and using the local IP address and the port number assigned to the receiving-side user terminal as the local address information.

The P2P server 3 receives the message from the user terminal and refers to the message identification information to recognize that the message is a communication start response. The P2P server, which has recognized that the message is a communication start response, refers to the destination user terminal identification information to recognize the identification information of the destination user terminal. Then, the P2P server refers to the identification management table to determine the communication path to the destination user terminal based on the communication path information corresponding to the recognized destination user terminal identification information. The P2P server 3 sends the communication start response message received from the receiving-side user terminal such that the message passes through the determined communication path to the destination user terminal (step S606). By this operation, the communication start response message from the receiving-side user terminal is transferred to the sending-side user terminal, which is the communication partner.

The sending-side user terminal, which has received the communication start response message from the receiving-side user terminal, acquires the global address information (the second global address information), the WAN-side address information (the second WAN-side address information), and the local address information (the second local address information), which are assigned to the receiving-side user terminal, from the communication start response message. This operation is realized by the address information acquiring section 106.

The communication start request message and the communication start response message may be sent or received via a server other than the P2P server 3.

By the sending-side information exchange processing and receiving-side information exchange processing as described above, an event that P2P communication is desired to be performed is notified from one user terminal to another user terminal via the P2P server, and global address information, WAN-side address information, and local address information are exchanged as address information of each other. The user terminals start P2P communication based on the acquired global address information, WAN-side address information and local address information.

Next, a procedure of actually starting P2P communication between the user terminals which have exchanged the address information will be described.

Figure 11A:
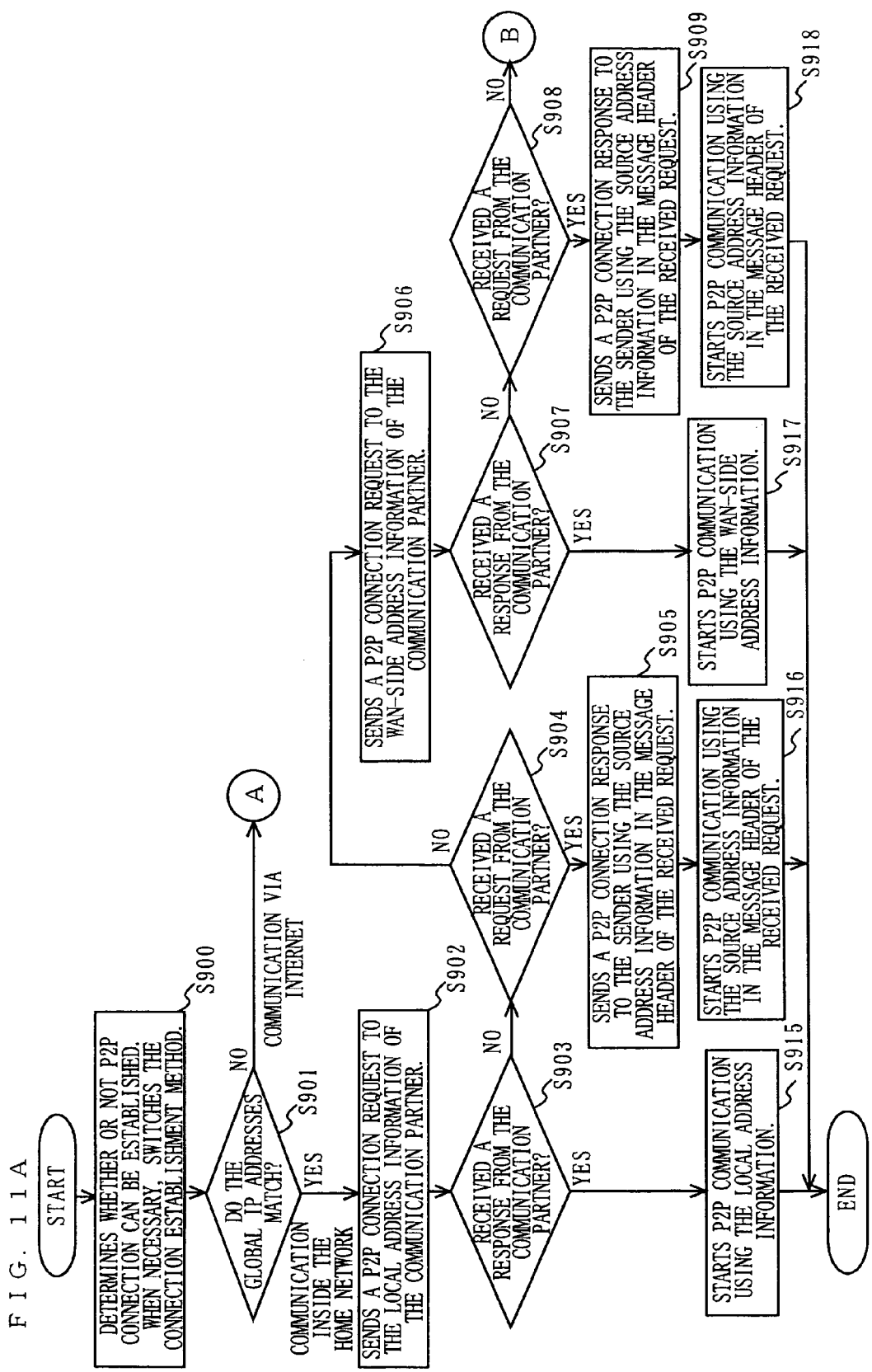
FIG. 11A is a flowchart showing an operation of a user terminal, which has exchanged address information, for actually performing P2P communication.
Figure 11B:
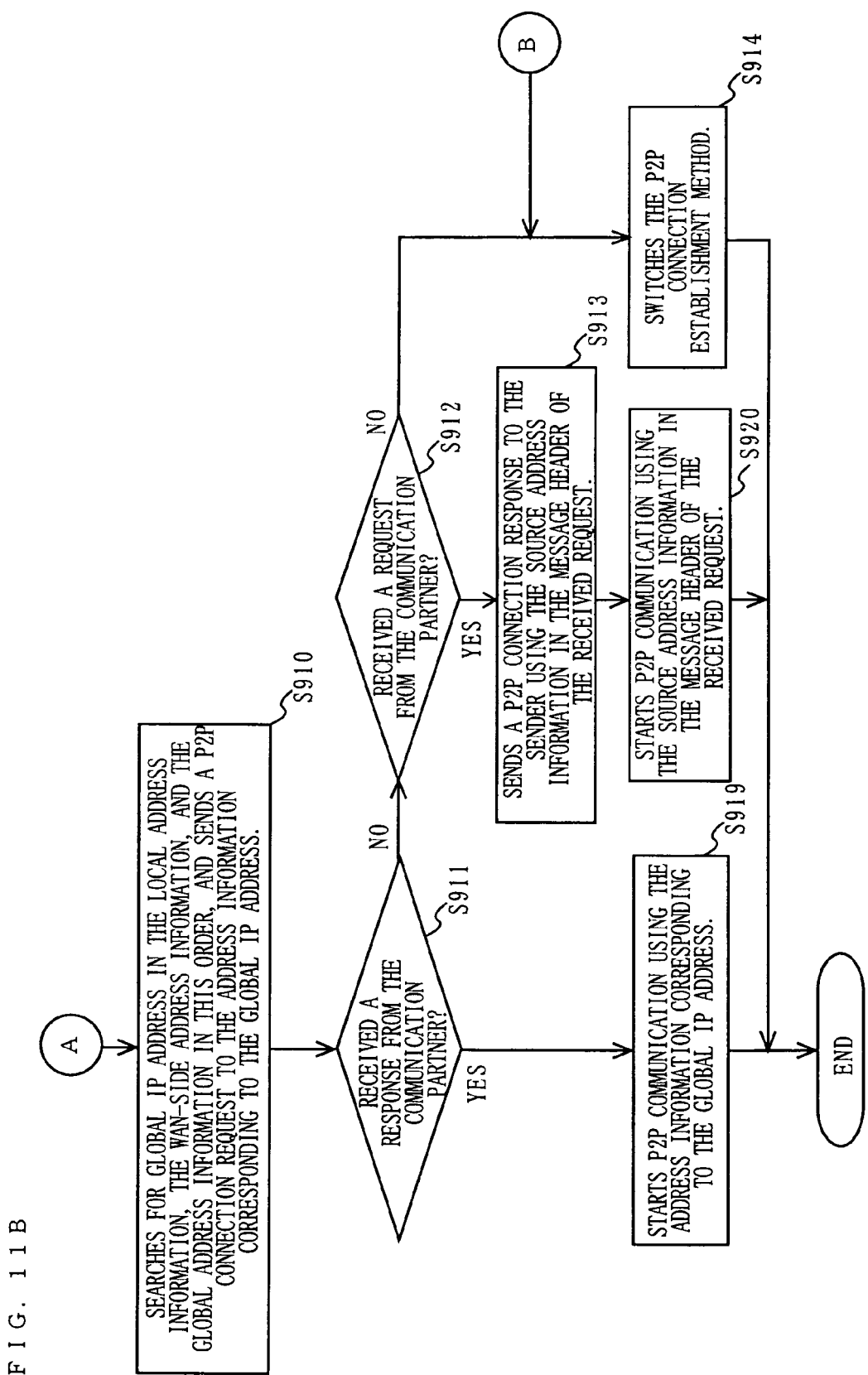
FIG. 11B is a flowchart showing an operation of a user terminal, which has exchanged address information, for actually performing P2P communication.

FIG. 11A and FIG. 11B are flowcharts showing an operation of user terminals for actually performing P2P communication after exchanging the address information. The operation shown in FIG. 11A and FIG. 11B may be performed by the sending-side user terminal, the receiving-side user terminal, or the sending-side user terminal and the receiving-side user terminal. Which user terminal is to perform the operation shown in FIG. 11A and FIG. 11B may be determined in advance or may be determined by the communication start request message or the communication start response message. The operation shown in FIG. 11A and FIG. 11B is realized by the destination address information determination section 107 and the P2P communication processing section 108.

First, the user terminal, which has acquired the address information of the user terminal which will become a communication partner by the sending-side information exchange processing and the receiving-side information exchange processing, determines whether or not P2P connection with the user terminal as the communication partner can be established, i.e., whether a communication path for P2P communication can be secured or not, based on the address information of the communication partner and its own address information (step S900). When it is determined that a communication path for P2P communication can be secured, the user terminal advances to step S901. When it is determined that a communication path for P2P communication cannot be secured, the user terminal switches the connection establishment method to, for example, a system of exchanging user data via the P2P server 3 as in the case of sending and receiving the communication start request message or the communication start response message. The user terminal performs the determination in step S900 only when its own global IP address is different from the global IP address of the communication partner.

Figure 12A:
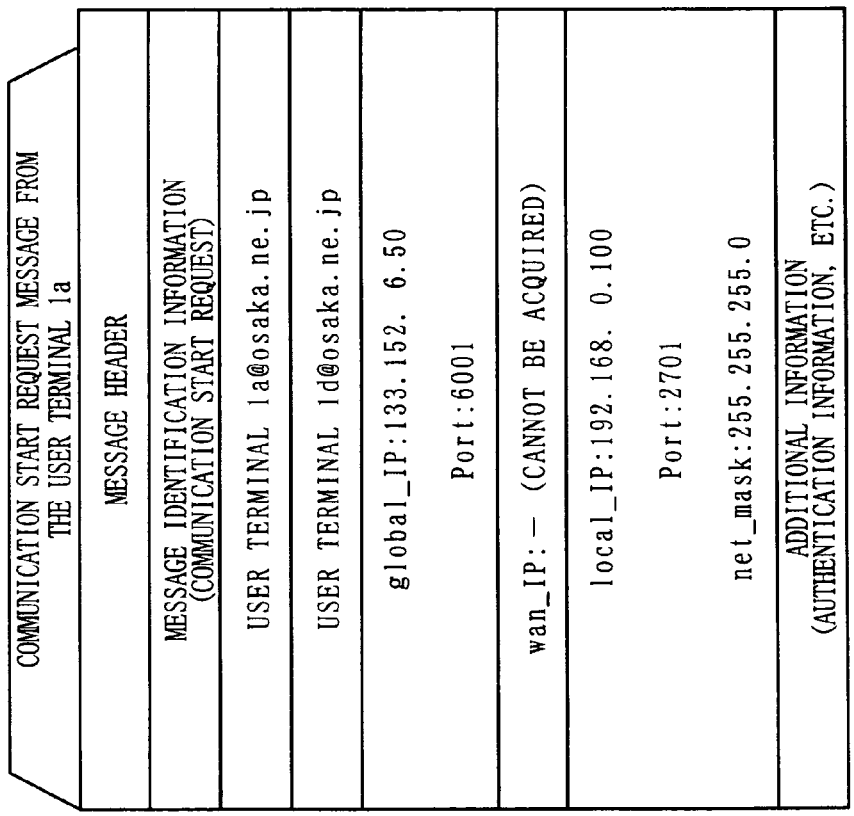
FIG. 12A shows an exemplary format of a communication start request message in the case where a communication path for P2P communication cannot be secured.
Figure 12B:
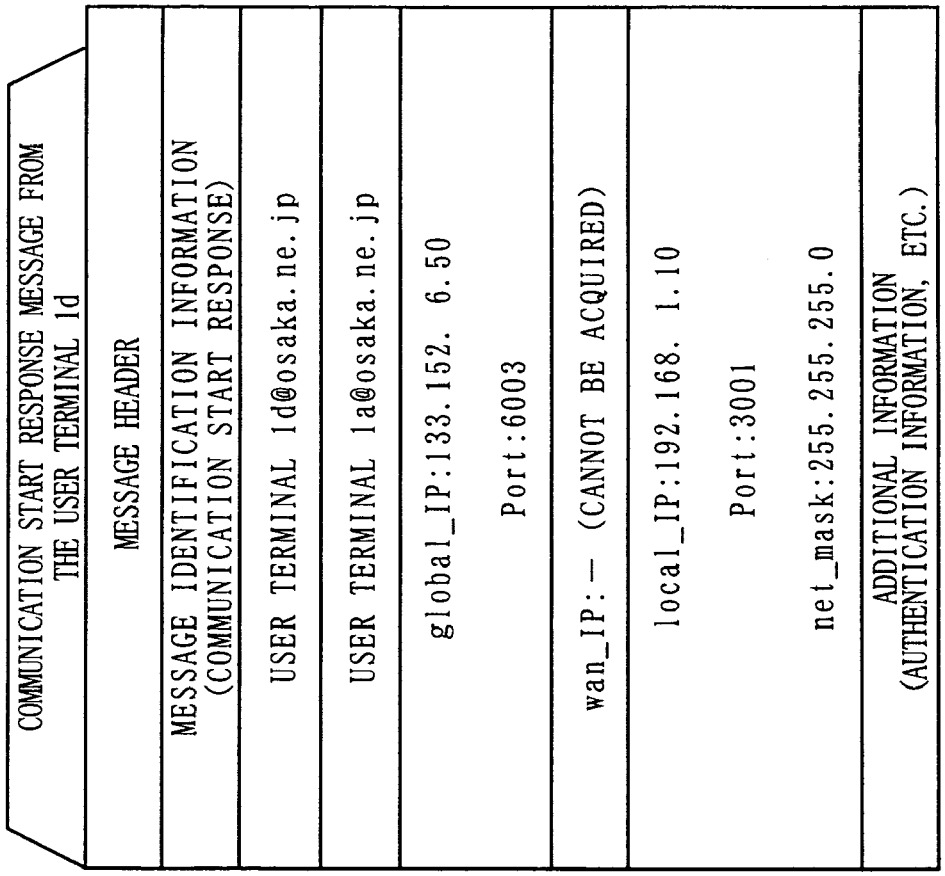
FIG. 12B shows an exemplary format of a communication start response message in the case where a communication path for P2P communication cannot be secured.

FIG. 12A and FIG. 12B show exemplary formats of address information in the case where a communication path for P2P communication cannot be secured. FIG. 12A shows an exemplary format of a communication start request message from the user terminal 1a. FIG. 12B shows an exemplary format of a communication start response message from the user terminal 1d. Regarding both the user terminals 1a and 1d, the WAN-side address information is "WAN_IP:—(cannot be acquired)". Namely, neither the user terminal 1a nor the user terminal 1d has acquired the address information of the upstream router. In general, this occurs because, for example, the upstream router is not conformed to the UPnP•IGD protocol. The global IP address and the local IP address of the user terminal 1a are different from each other, and the global IP address and the local IP address of the user terminal 1d are also different from each other. From this, it is understood that the user terminals 1a and 1d are both downstream with respect to an upstream router. Moreover, the user terminals 1a and 1d have the same global IP address and different port numbers. From this, it is understood that the user terminals 1a and 1d are both downstream with respect to the same router. Accordingly, it is understood that the user terminals 1a and 1d do not need to communicate by a route via the Internet 4. In the case where a router is present on a communication path, the communication from the WAN-side to the LAN-side of the router cannot be realized unless the router has NAT settings configured therein. In the example of FIG. 12A and FIG. 12B, neither the router 2A directly connected to the user terminal 1a nor the router 2B directly connected to the user terminal 1d has NAT settings configured therein. These routers do not allow NAT settings to be newly configured therein. As a result, in the example shown in FIG. 12A and FIG. 12B, the user terminals 1a and 1d are determined not to be able to communicate with each other in step S908. In other words, when two user terminals have the same global IP address as in this example, it cannot be determined whether or not P2P connection can be established using only the information obtained by the sending-side information exchange processing and the receiving-side information exchange processing. Therefore, the user terminal attempts to perform P2P communication using the local address information and the WAN-side address information, confirms that P2P connection is impossible, and then determines that P2P communication is impossible. Therefore, in the case where the address information shown in FIG. 12A and FIG. 12B is the address information exchanged between the user terminals 1a and 1d, it is determined that P2P connection cannot be established. The reason is that since at least one router upstream with respect to the communication partner does not have NAT settings configured therein, neither a message sent from the user terminal 1a nor a message sent from the user terminal id can be transferred to the correct communication partner by the router and thus is not received by the correct communication partner. A "message" refers to the entirety of a control packet for connection of a P2P communication path, for example, a request message or a response message. In the case where the address information shown in FIG. 12A and FIG. 12B is the address information exchanged between the user terminals 1a and 1c, the WAN-side address cannot be acquired because neither the router 2A nor the router 2C is conformed to the UPnP•IGD protocol. In this case, however, P2P connection can be established by dynamic NAT once the user terminal 1a requests a communication start.

Figure 13B:
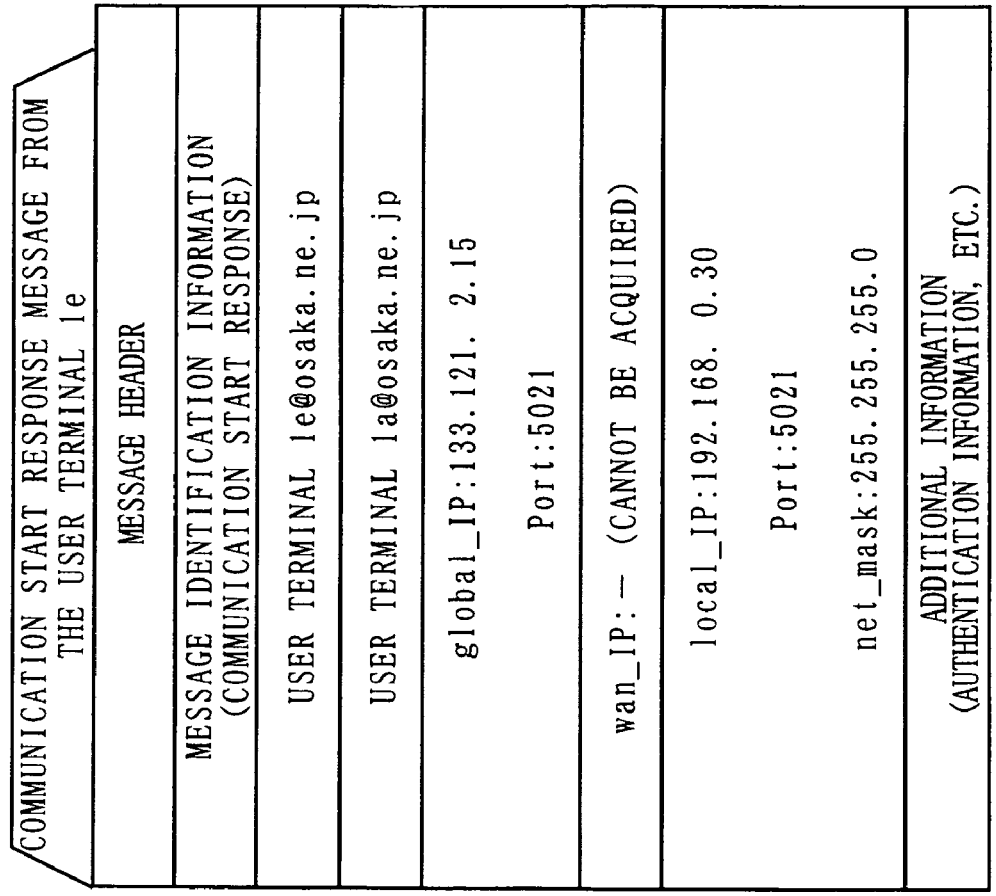
FIG. 13B shows another exemplary format of a communication start response message in the case where a communication path for P2P communication cannot be secured.

FIG. 13A and FIG. 13B show other exemplary formats of address information in the case where a communication path for P2P communication cannot be secured. FIG. 13A shows an exemplary format of a communication start request message from the user terminal 1a. FIG. 13B shows an exemplary format of the communication start response message from the user terminal 1e. In the example shown in FIG. 13B, it is shown that the user terminal 1e is connected to the upstream router 2D but the upstream router 2D directed connected to the user terminal 1e does not have NAT settings configured therein. In the example shown in FIG. 13A, the upstream router 2A directly connected to the user terminal 1a has NAT settings configured therein. In the example shown in FIG. 13A, however, the global IP address and the WAN-side IP address are different from each other. From this, it is understood that there is an upstream router with respect to the router directly connected to the user terminal 1a. The uppermost router does not have NAT settings which would allow the uppermost router to be conformed to the communication between the user terminals 1a and 1e. The reason is that a user terminal generally cannot configure static NAT settings in a router which is upstream with respect to the router directly connected to the user terminal. Since the global IP address of the user terminal 1a and the global IP address of the user terminal 1e are different from each other, the user terminals 1a and 1e need to communicate by a route via the Internet 4, i.e., by a communication path having a router thereon. However, the router 2D directly connected to the user terminal 1e does not have static NAT settings configured therein, and therefore it is determined that P2P connection between the user terminals 1a and 1e can be established. This determination can be provided only with the information obtained by the sending-side information exchange processing and the receiving-side information exchange processing. Accordingly, the user terminal can determine that P2P connection cannot be established in step S900.

As described above, in the case where there is a router which does not have NAT settings configured therein, the user terminal determines that P2P connection cannot be established.

In the above example, when determining that a communication path cannot be secured in step S900, the user terminal switches the connection establishment method to a method of exchanging user data via the P2P server 3. Alternatively, when determining that a communication path for P2P communication cannot be secured, the user terminal may attempt to communicate by sending a UDP packet to the global address information of the communication partner using the global address information and a STUN connection establishment method. In other words, when determining that a communication path for P2P communication cannot be secured, the user terminal may attempt to perform P2P communication by the STUN connection establishment method. The connection establishment method is switched by the P2P communication processing section 108.

In step S901, the user terminal refers to the global address information of the communication partner to determine whether or not the global IP address of the communication partner matches the global IP address of its own.

When the two global IP addresses match each other, the two user terminals attempting to perform P2P communication are located downstream with respect to the same router. Accordingly, these two user terminals can communicate with each other without using the Internet 4. When the global IP addresses match each other, the user terminal advances to step S902.

When the two global IP addresses do not match each other, the two user terminals attempting to perform P2P communication are not located downstream with respect to the same router. Accordingly, these two user terminals communicate with each other via the Internet 4. When the global IP addresses do not match each other, the user terminal advances to step S910.

In step S902, the user terminal sends a P2P connection request to the local address information of the communication partner.

After step S902, the user terminal determines whether or not a response was received from the communication partner, which is the destination of the P2P connection request (step S903). When a response was received from the communication partner, it means that a mutual communication path has been established. Accordingly, the user terminal then sends data for P2P communication to the local address information of the communication partner (step S915).

When a response was not received from the communication partner, the user terminal determines whether or not a request was received from the communication partner (step S904). When a request was received from the communication partner, the user terminal sends a response that P2P connection has been made to the sender using the source address information described in the message header included in the received request (step S905). This means that a mutual communication path has been established. Accordingly, the user terminal then sends data for P2P communication to the sender using the source address information described in the message header (step S916).

When a request was not received from the communication partner in step S904, the user terminal sends a P2P connection request to the WAN-side address information of the communication partner (i.e., the router directly connected to the communication partner) (step S906). Then, the user terminal determines whether or not a response was received from the communication partner (step S907). When a response was received from the communication partner, it means that a mutual communication path has been established. Accordingly, the user terminal then sends data for P2P communication to the WAN-side address information of the communication partner (step S917).

When a response was not received from the communication partner, the user terminal determines whether or not a request was received from the communication partner (step S908). When a request was received from the communication partner, the user terminal sends a response that P2P connection has been made to the sender using the source address information described in the message header included in the received request (step S909). This means that a mutual communication path has been established. Accordingly, the user terminal then sends data for P2P communication to the sender using the source address information described in the message header (step S918).

When a request was not received from the communication partner in step S908, the user terminal advances to step S914.

In step S914, the user terminal switches the P2P connection establishment method to a P2P server connection establishment method or a STUN connection establishment method.

In the operation in and after step S910, a global IP address is necessary. In step S910, the user terminal searches for a global IP address in the local address information, the WAN-side address information, and the global address information in this order. When a global IP address is found, the user terminal sends a P2P connection request to the address information corresponding to the global IP address (the global IP address and the port number).

When the local IP address matches the global IP address, it means that the user terminal is directly connected to the Internet 4 via no router.

After step S910, the user terminal determines whether or not a response was received from the communication partner, which is the destination of the P2P connection request (step S911). When a response was received from the communication partner, it means that a mutual communication path has been established. Accordingly, the user terminal then sends data for P2P communication to the address information corresponding to the global IP address (step S919).

When a response was not received from the communication partner, the user terminal determines whether or not a request was received from the communication partner (step S912). When a request was received from the communication partner, the user terminal sends a response that P2P connection has been made to the sender using the source address information described in the message header included in the received request (step S913). This means that a mutual communication path has been established. Accordingly, the user terminal then sends data for P2P communication to the sender using the source address information described in the message header (step S920).

When a request was not received from the communication partner in step S912, the user terminal advances to step S914. In step S914, the user terminal switches the P2P connection establishment method.

In the procedure shown in FIG. 11A and FIG. 11B, a communication path connection request is sent to the local address information and the WAN-side address information of the communication partner in this order in an attempt to establish a mutual communication path (see steps S902 and S906). In general, sub network identification address information and the local address information of user terminals are assigned by individual routers. Accordingly, there is a possibility that a plurality of user terminals have local address information including the same IP address and also the same port number in different sub networks. When the local address information is the destination of a communication path connection request in step S902, there is a possibility that the communication path connection request is delivered to a user terminal other than the desired communication partner. However, the user terminal other than the desired communication partner has not exchanged address information in advance. Therefore, the user terminal other than the desired communication partner can recognize that the message has been delivered by mistake. Thus, the user terminal other than the desired communication partner does not return a message responding to the communication path connection request. As a result, a wrong communication path connection does not occur.

As described above, in the operation shown in FIG. 11A and FIG. 11B, the user terminal sends a P2P connection request to one of the global address information, the WAN-side address information and the local address information of the communication partner as the destination in an attempt to perform communication (see steps S902, S906 and S910), and determines whether or not P2P communication should be started using such address information. When a response is received from the user terminal as the communication partner ("YES" in steps S903, S907 and S910), the user terminal determines that P2P communication should be started using the address information used as the destination (see steps S915, S917 and S919).

Characteristically, the user terminal determines whether or not the global IP addresses match each other (see step S901). When the global IP addresses match each other, the user terminal sends a P2P connection request to the address information corresponding to the global IP address (see step S910). When a response is received from the communication partner ("YES" in step S911), the user terminal determines that P2P communication should be started using the address used as the destination. When the global IP addresses do not match each other, the user terminal sends a P2P connection request to one of the WAN-side address information and the local address information of the communication partner as the destination (see steps S902 and 906). When a response is received from the communication partner ("YES" in steps S903 and S907), the user terminal determines that P2P communication should be started using the address used as the destination.

When a P2P connection request is received from the communication partner ("YES" in steps S904, S908 and S912), the user terminal determines that P2P communication should be started using the sender address information of the P2P connection request. Then, the user terminal starts P2P communication using the sender address information (see steps S905, S909, S913, S916, S918 and S920).

When the user determines that P2P communication should not be started in the above cases using either one address information or either one sender address information, the user switches the P2P connection establishment method.

Next, a flow of P2P communication performed between the user terminals $1a$ and $1d$ shown in FIG. 1A will be described with reference to exemplary address information.

Figure 14A:
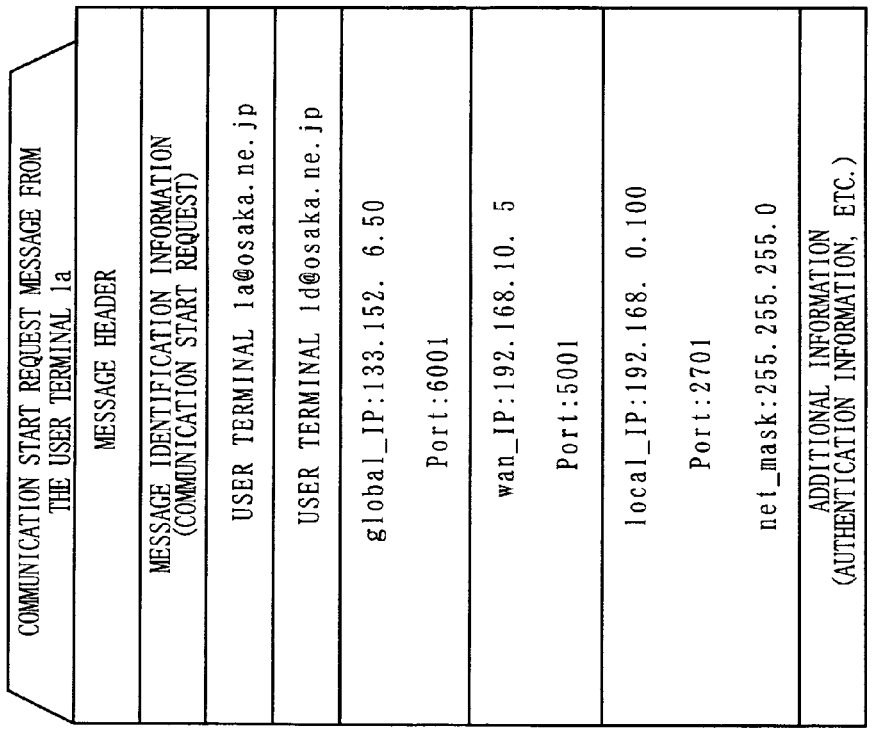
FIG. 14A shows an exemplary format of a communication start request message which is sent from one user terminal to another user terminal.

FIG. 14A shows an exemplary format of a communication start request message which is sent from the user terminal $1a$ to the user terminal $1d$. FIG. 14B shows an exemplary format of a communication start response message which is sent from the user terminal $1d$ to the user terminal $1a$.

The user terminals $1a$ and $1d$ are both downstream with respect to the router $2C$ and thus have the same global IP address. Accordingly, in step S902, the user terminal $1a$ sends a P2P connection request to the local address information of the user terminal $1d$ (the local IP address is "192.168.1.10" and the port number is "3001"). As shown in FIG. 1A, the user terminal $1d$ is not located downstream with respect to the router $2A$. Accordingly, the request from the user $1a$ using the local address information does not reach the user terminal $1d$. Therefore, the user terminal $1a$ does not receive a response from the user terminal $1d$ ("NO" in step S903). Thus, the user terminal advances to step S904.

It is assumed here that a request from the user terminal $1d$ is not sent to the user terminal $1a$ ("NO" in step S904). In this case, the user terminal $1a$ sends a P2P connection request to the WAN-side address information of the user terminal $1d$ (the WAN-side IP address is "192.168.10.4" and the port number is "4001") (see step S906). The request passes through the router $2A$ and reaches the router $2B$. The router $2B$ sends the request to the user terminal $1d$ in accordance with the static NAT settings configured therein. Thus, the user terminal $1d$ can send a response to the request to the user terminal $1a$. Then, the user terminal $1a$ receives the response from the user terminal $1d$ ("YES" in step S907). Therefore, the user terminal $1a$ starts P2P communication with the user terminal $1d$ using the WAN-side address information (see step S917).

In this case, the user terminal $1d$ starts P2P communication with the user terminal $1a$ using the sender address information described in the message header of the P2P connection request from the user terminal $1a$. Even when the user terminal $1d$ is on the sending side, the user terminals $1d$ and $1a$ can communicate with each other in substantially the same manner.

Figure 15A:
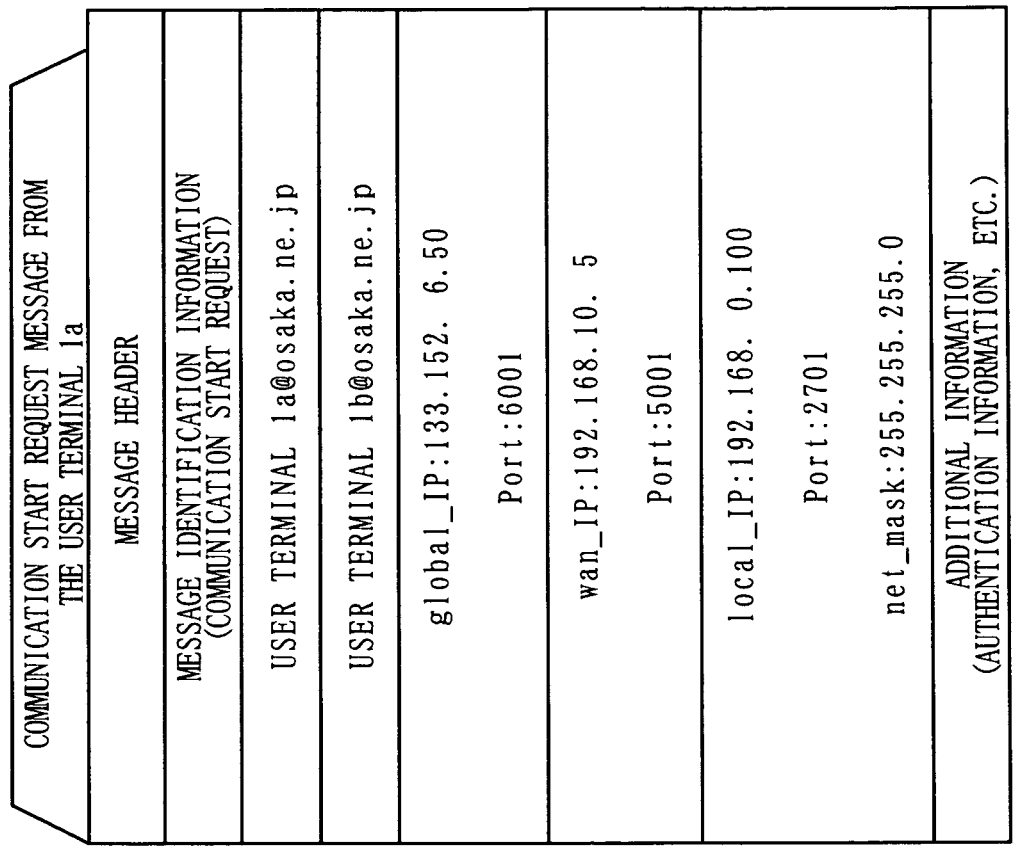
FIG. 15A shows an exemplary format of a communication start request message which is sent from one user terminal to another user terminal.
Figure 15B:
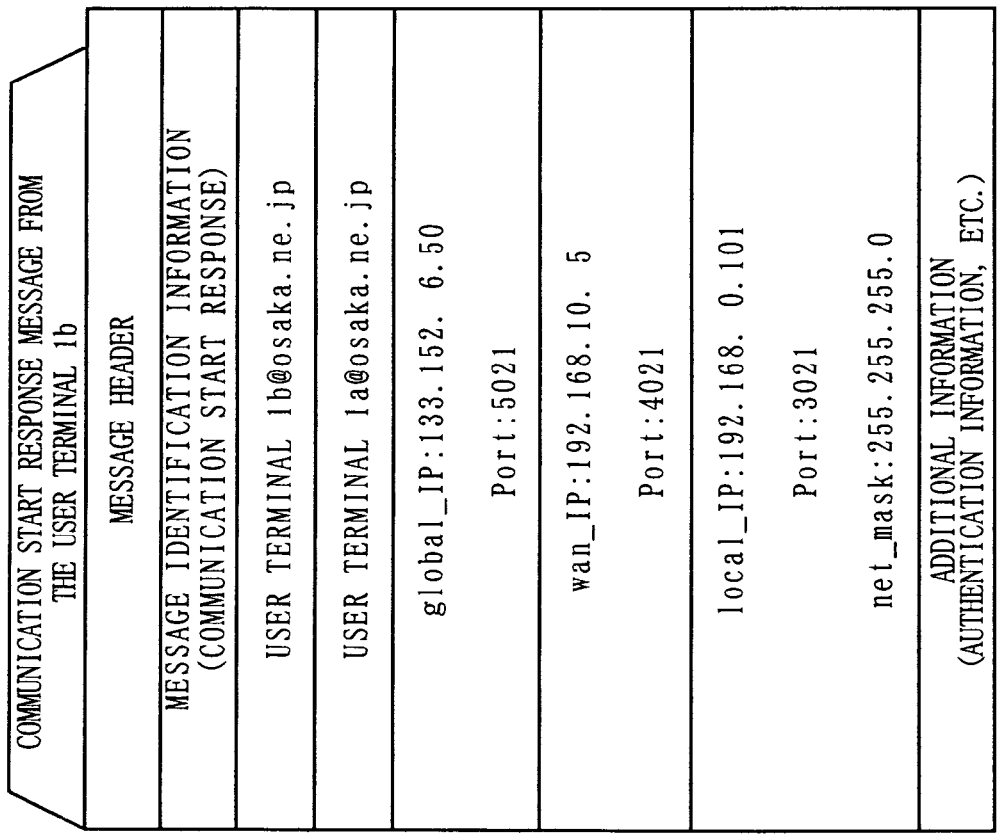
FIG. 15B shows an exemplary format of a communication start response message which is sent from one user terminal to another user terminal.

FIG. 15A shows an exemplary format of a communication start request message which is sent from the user terminal $1a$ to the user terminal $1b$. FIG. 15B shows an exemplary format of a communication start response message which is sent from the user terminal $1b$ to the user terminal $1a$.

The user terminals $1a$ and $1b$ are both downstream with respect to the router $2C$ and thus have the same global IP address. Accordingly, in step S902, the user terminal $1a$ sends a P2P connection request to the local address information of the user terminal $1b$ (the local IP address is "192.168.0.101" and the port number is "3021"). As shown in FIG. 1A, the user terminal $1b$ is located downstream with respect to the router $2A$. Accordingly, the request from the user $1a$ using the local address information reaches the user terminal $1b$. Therefore, the user terminal $1a$ performs P2P communication with the user terminal $1b$ using the local address information (see S915). In this case, the user terminal $1b$ starts P2P communication with the user terminal $1a$ using the sender address information described in the message header of the request. Even when the user terminal $1b$ is on the sending side, the user terminals $1b$ and $1a$ can communicate with each other in substantially the same manner.

Figure 16A:
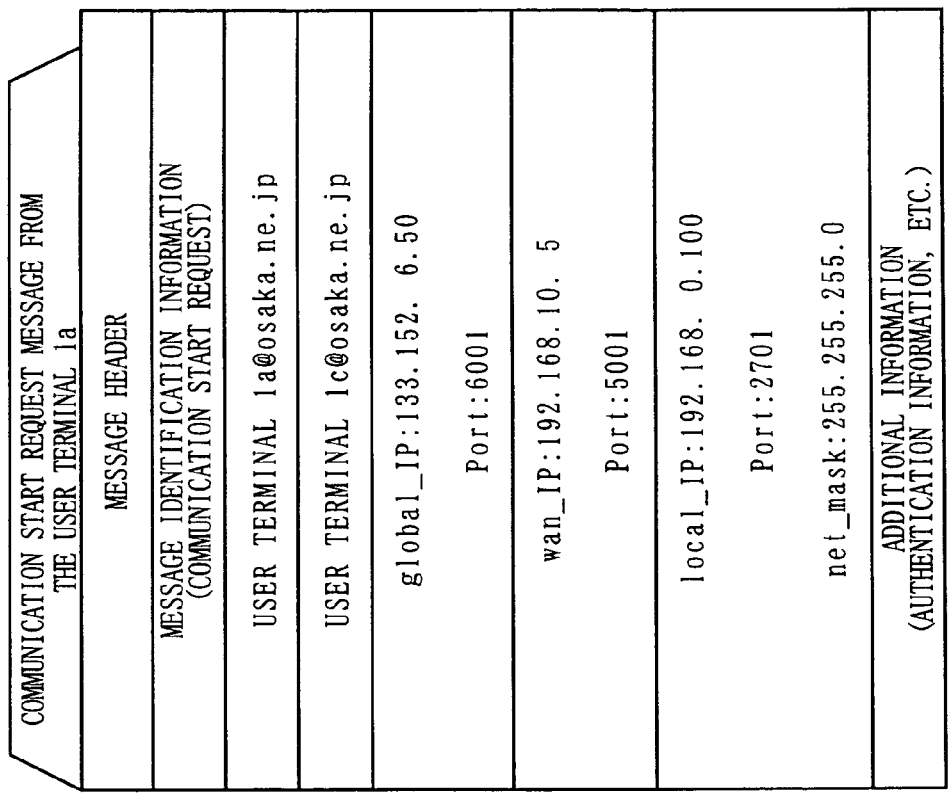
FIG. 16A shows an exemplary format of a communication start request message which is sent from one user terminal to another user terminal.
Figure 16B:
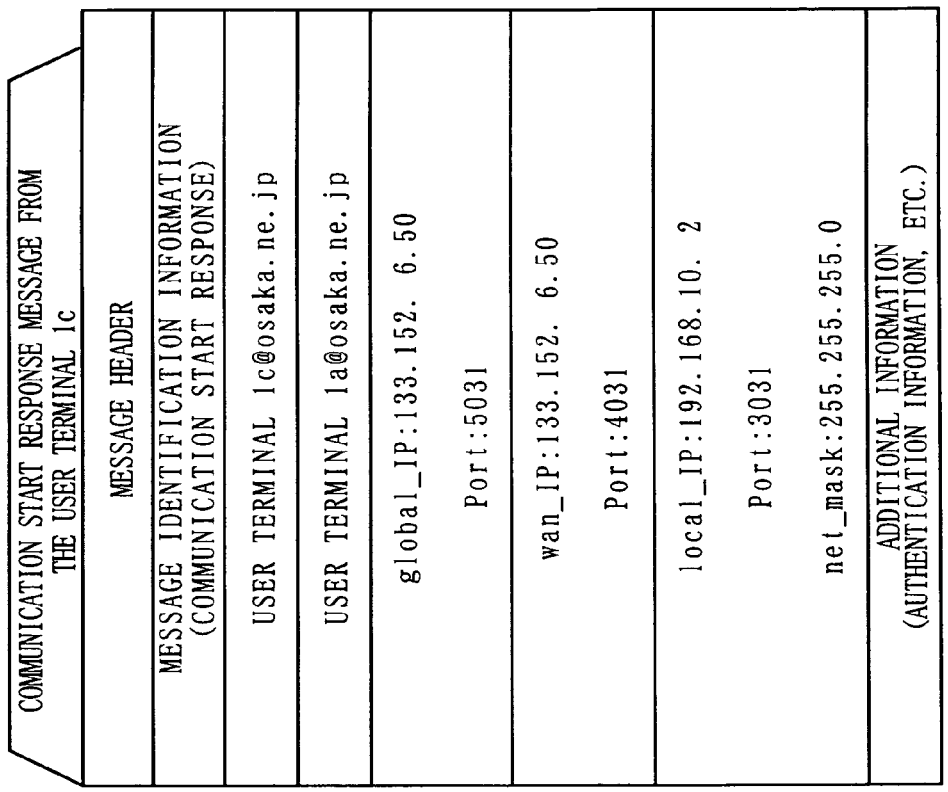
FIG. 16B shows an exemplary format of a communication start response message which is sent from one user terminal to another user terminal.

FIG. 16A shows an exemplary format of a communication start request message which is sent from the user terminal $1a$ to the user terminal $1c$. FIG. 16B shows an exemplary format of a communication start response message which is sent from the user terminal $1c$ to the user terminal $1a$.

The user terminals $1a$ and $1c$ are both downstream with respect to the router $2C$ and thus have the same global IP address. Accordingly, in step S902, the user terminal $1a$ sends a P2P connection request to the local address information of the user terminal $1c$ (the local IP address is "192.168.10.2" and the port number is "3031"). As shown in FIG. 1A, the user terminal $1c$ is connected to the router $2C$, which is upstream (on the WAN-side) with respect to the router $2A$, to which the user terminal $1a$ is connected. Accordingly, the request from the user $1a$ using the local address information reaches the user terminal $1c$. Therefore, the user terminal $1c$ can receive the request and start P2P communication.

In this example, the router upstream with respect to the user terminal $1a$ has NAT settings configured therein. Therefore, even when the user terminal $1c$ sends a P2P connection request using the WAN-side address information of the user terminal $1a$, the P2P connection request reaches the user terminal $1a$. Thus, the user terminal $1c$ also can send a P2P connection request for performing P2P communication.

Figure 17A:
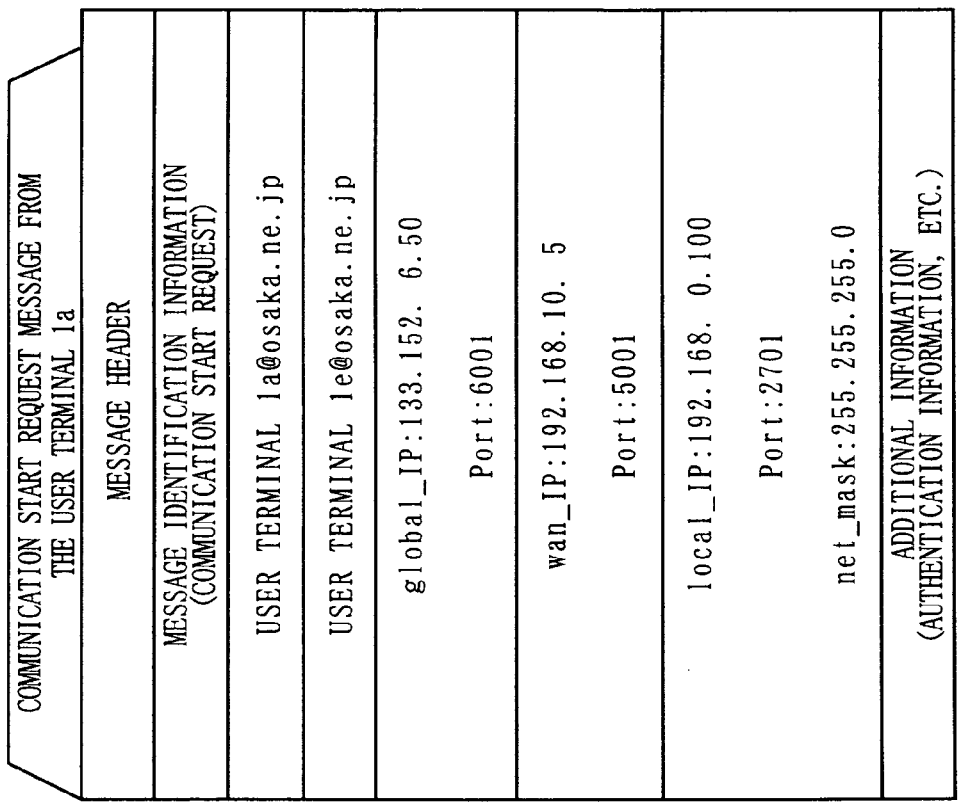
FIG. 17A shows an exemplary format of a communication start request message which is sent from one user terminal to another user terminal
Figure 17B:
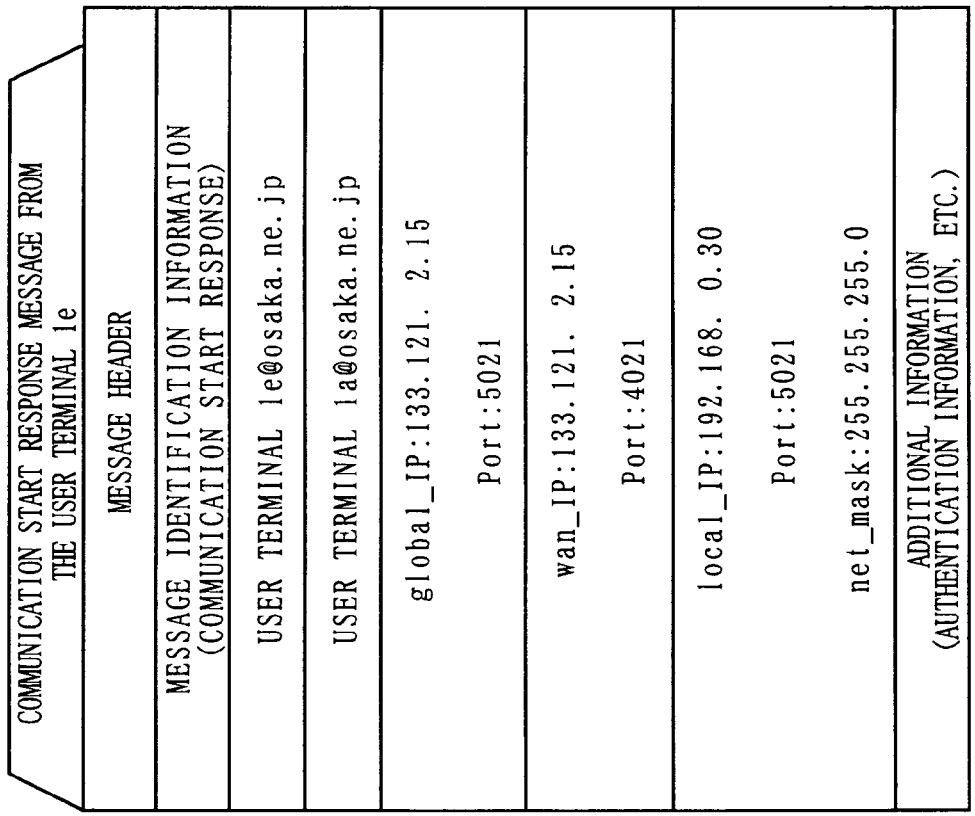
FIG. 17B shows an exemplary format of a communication start response message which is sent from one user terminal to another user terminal.

FIG. 17A shows an exemplary format of a communication start request message which is sent from the user terminal $1a$ to the user terminal $1e$. FIG. 17B shows an exemplary format of a communication start response message which is sent from the user terminal $1e$ to the user terminal $1a$.

The user terminal $1a$ is located downstream with respect to the router $2C$, and the user terminal $1e$ is located downstream with respect to the router $2D$. Accordingly, the user terminals $1a$ and $1e$ have different global IP addresses. Therefore, in step S910, the user terminal $1a$ sends a P2P connection request to the address information corresponding to the global IP address. Here, the user terminal 1*a* sends the request to the WAN-side address information of the user terminal 1*e* (the WAN-side IP address is "133.121.2.15" and the port number is "4021"). When a response is received from the user terminal 1*e* ("YES" in step S911), the user terminal 1*a* starts P2P communication with the user terminal 1*e* using the address information (see step S919). The user terminal 1*e* performs P2P communication with the user terminal 1*a* using the sender address information described in the message header of the request. When the user terminal 1*e* is on the sending side, the user terminal 1*e* performs P2P communication with the user terminal 1*a*, using the global address information of the user terminal 1*a* as the address information corresponding to the global address information of the user terminal 1*a*.

The user terminal 1*e* may examine the address information received from the user terminal 1*a* to determine whether or not the WAN-side IP address matches the global IP address. When the two addresses do not match each other, the user terminal 1*e* determines that a P2P connection request, even if sent to the user terminal 1*a*, will not be responded for the reason that there is a router having no NAT settings configured therein. In this case, the user terminal 1*e* may wait for a P2P connection request from the user terminal 1*a* for a certain period of time without sending a P2P connection request. In the example shown in FIG. 17A and FIG. 17B, a P2P connection request can be sent from the user terminal 1*a* to the user terminal 1*e* even with such control. Thus, a communication path is established between the user terminals 1*a* and 1*e*.

Hereinafter, a specific processing flow for realizing P2P communication between two user terminals will be described.

Figure 18A:
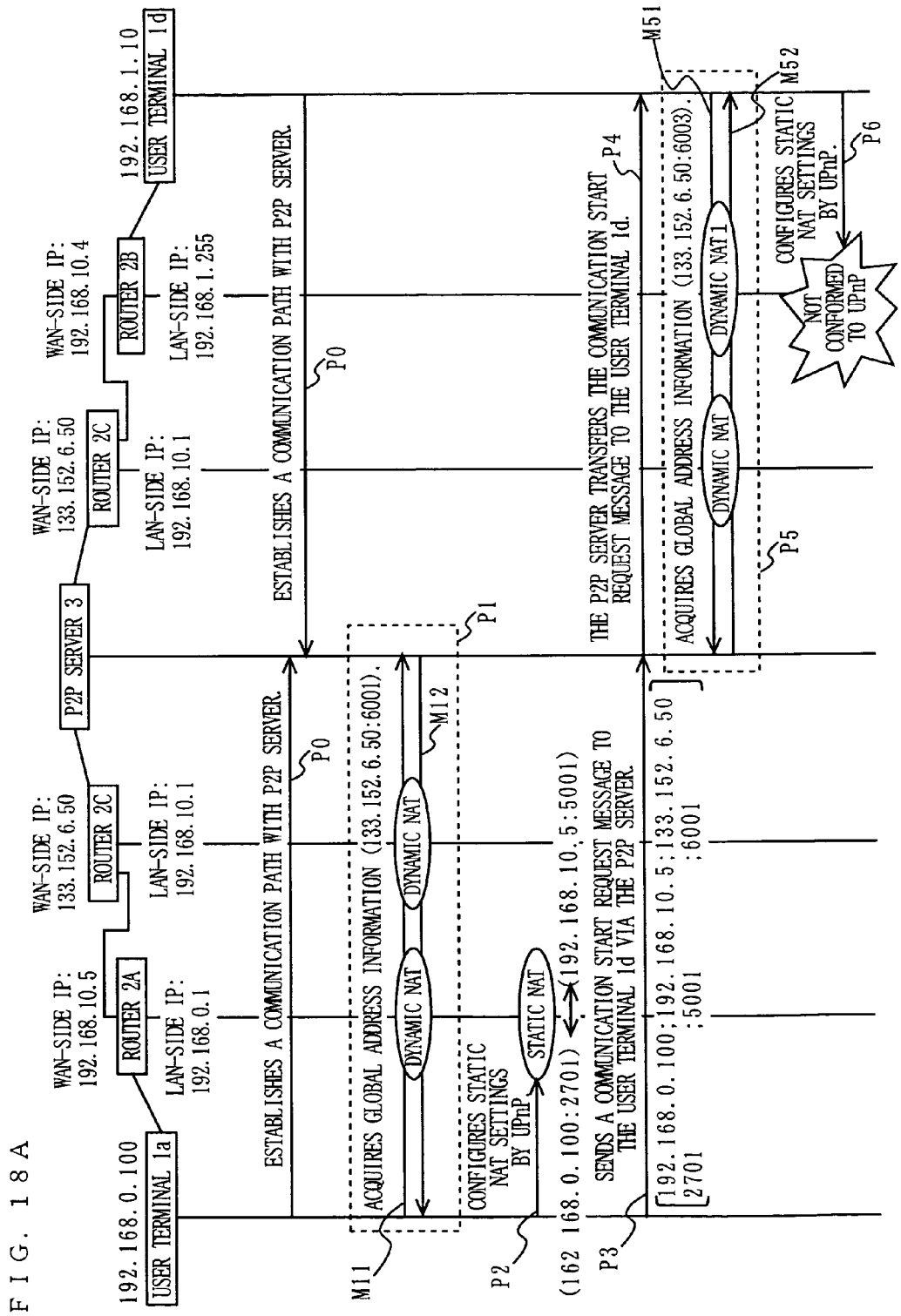
FIG. 18A shows a specific sequence for performing P2P communication between two user terminals.

FIG. 18A and FIG. 18B show a specific sequence for performing P2P communication between the user terminals 1*a* and 1*d*. In this example, the router 2B is not conformed to the UPnP•IGD protocol and the router 2B does not allow static NAT settings to be configured therein. The IP addresses set for the user terminal 1*a*, the router 2A, the router 2C, the router 2B, and the user terminal 1*d* are the same as those shown in FIG. 3A and FIG. 3B.

First, the user terminals 1*a* and 1*d* each communicate with the P2P server 3 to register identification information (P0, see FIG. 5). For performing this, for example, the user terminals 1*a* and 1*d* execute a TCP session with the P2P server 3.

The user terminal 1*a* sends and receives an address information notification request message M11 (see FIG. 8A) and an address information notification response message M12 (see FIG. 8B), and thus acquires global address information of its own (132.152.6.50:6001) from the P2P server 3 (P1, see step S501 in FIG. 7). In this process, dynamic NAT is set in the router 2A and the router 2C between the P2P server 3 and the user terminal 1*a*.

Next, the user terminal 1*a* configures static NAT settings in the router 2A directly connected thereto (P2, see step S502 in FIG. 7). Here, the router 2A has static NAT settings by which (162.168.0.100:2701) is translated into (192.168.10.5:5001) and (192.168.10.5:5001) is translated into (162.168.0.100:2701).

Next, the user terminal 1*a* sends a communication start request message (see FIG. 9A) to the user terminal 1*d* via the P2P server 3 (P3, see step S504 in FIG. 7). In this process, the user terminal 1*a* notifies the global address information, the WAN-side address information and the local address information of its own in the state of being included in the communication start request message.

Next, the P2P server 3 transfers the communication start request message from the user terminal 1*a* to the user terminal 1*d* (P4, see step S505 in FIG. 7).

Next, upon receipt of the communication start request message, the user terminal 1*d* sends and receives an address information notification request message M51 (see FIG. 8A) and an address information notification response message M52 (see FIG. 8B), and thus acquires global address information of its own (133.152.6.50:6003) from the P2P server 3 (P5, see step S603 in FIG. 10).

Then, the user terminal 1*d* attempts to configure static NAT settings by the UPnP•IGD protocol in the router 2B directly connected thereto (P6, step S604 in FIG. 10). However, the router 2B is not conformed to the UPnP•IGD protocol and thus does not allow static NAT settings to be configured therein. Accordingly, the user terminal 1*d* cannot appropriately execute the processing in steps S603 and S604 in FIG. 10, and thus cannot acquire the WAN-side address information.

With reference to FIG. 18B, the user terminal 1*d* sends a communication start response message (see FIG. 9B) to the user terminal 1*a* via the P2P server 3 (P7, see step S605 in FIG. 10). In this process, the user terminal 1*d* notifies the global address information, the WAN-side address information and the local address information of its own in the state of being included in the communication start response message. Since static NAT settings are not provided, the section for the WAN-side address information is empty.

Next, the P2P server 3 transfers the communication start response message from the user terminal 1*d* to the user terminal 1*a* (P8, see step S606 in FIG. 10).

By the processing up to P8, the user terminals 1*a* and 1*d* acquire the address information of each other.

Next, the user terminal 1*a* sends a P2P connection request to the local address information of the user terminal 1*d* (192.168.1.10:3001) (P9, see step S902 in FIG. 11A). However, the packet is destroyed for the reason that, for example, information on the route to the destination is unavailable or that the destination is unavailable.

The user terminal 1*d* also sends a P2P connection request to the local address information of the user terminal 1*a* (192.168.0.100:2701) (P10, see step S902 in FIG. 11A). However, the packet is also destroyed for the reason that, for example, information on the route to the destination is unavailable or that the destination is unavailable.

Thus, the user terminal 1*d* sends a P2P connection request to the WAN-side address information of the user terminal 1*a* (192.168.10.5:5001) (P11, see step S906 in FIG. 11A). In this process, the router 2B executes translation from (192.168.10.4:6551) to (192.168.1.10:3001) and from (192.168.1.10:3001) to (192.168.10.4:6551). Dynamic NAT2 used for such translation is different from dynamic NAT1 in P5.

The P2P connection request from the user terminal 1*d* is not output to the WAN side of the router 2C, and therefore the router 2C does not perform NAT. Thus, the P2P connection request from the user terminal 1*d* reaches the router 2A (P12).

The router 2A transfers a P2P connection request message from the user terminal 1*d* to the user terminal 1*a* using the route by the static NAT configured in P2 (P13). Thus, the user terminal 1*a* receives the P2P connection request from the user terminal 1*d* at the port number 2701 (P14, see step S904 in FIG. 11A).

Next, the user terminal 1*a* sends a P2P connection response message to the sender address information of the received P2P connection request (192.168.10.4:6551) (P15, see step S905 in FIG. 11A). The message passes through the static NAT of the router 2A and the dynamic NAT2 of the router 2B, along which the P2P connection request message arrived, and reaches the user terminal 1*d* (P16). The user terminal 1*d* receives the P2P connection response at the port number 3001 (P17). After this, the user terminals 1*a* and 1*d* mutually perform P2P communication via the above-mentioned static NAT and dynamic NAT2.

As described above, according to the first embodiment, global address information, WAN-side address information and local address information are exchanged between user terminals. P2P communication is started using one address information appropriately. When a request is made from the communication partner, P2P communication is started using the sender address information described in the request. Accordingly, a communication apparatus, method and program for realizing P2P communication even in an environment in which a network is constructed in a complicated manner are provided. Even when the structure of the network is dynamically changed, P2P communication is performed based on the newly exchanged global address information, WAN-side address information and local address information. Thus, a communication apparatus, method and program for realizing P2P communication even where the structure of the network is dynamically changed are provided. When P2P connection cannot be established using any of the address information, the user terminal switches the connection establishment method to the P2P communication using a P2P server or a STUN connection establishment method.

A user terminal according to the present invention determines a method by which P2P connection can be established, using the first and second global address information, WAN-side address information, and local address information which are exchanged between two user terminals. Usable methods include, for example, a method of starting P2P communication using local address information (see S915 in FIG. 11A), a method of starting P2P communication using WAN-side address information (see S917 in FIG. 11A), a method of starting P2P communication using sender address information (see S916 and S918 in FIG. 11A and S920 in FIG. 11B), a method of starting P2P communication using address information corresponding to the global IP address (see S919 in FIG. 11B), a method of starting P2P communication using a P2P server (see S914 in FIG. 11B), and a STUN connection establishment method (see S914 in FIG. 11B).

The user terminal may perform the operation in step S910 after step S908, without making a determination in step S901. Namely, the determination on whether the global IP addresses match each other or not is not indispensable. According to the present invention, the order of determinations on whether the P2P connection can be established or not is not limited to the order shown in FIG. 11A and FIG. 11B, as long as P2P communication is attempted to be performed using the global address information, WAN-side address information and local address information.

The global address information may include only an IP address. In the case where the global address information includes only an IP address, the user terminal can be prevented from performing P2P connection with the global address information being specified.

The global address information is not limited to including a global IP address and a port number, and may be any information on an address in the Internet.

The WAN-side address information is not limited to including a WAN-side IP address and a port number, and may be any information on a WAN-side address assigned to a router directly connected to a user terminal.

The local address information is not limited to including a local IP address and a port number, and may be any information on an address in a LAN which is assigned to a user terminal.

Second Embodiment

Figure 19B:
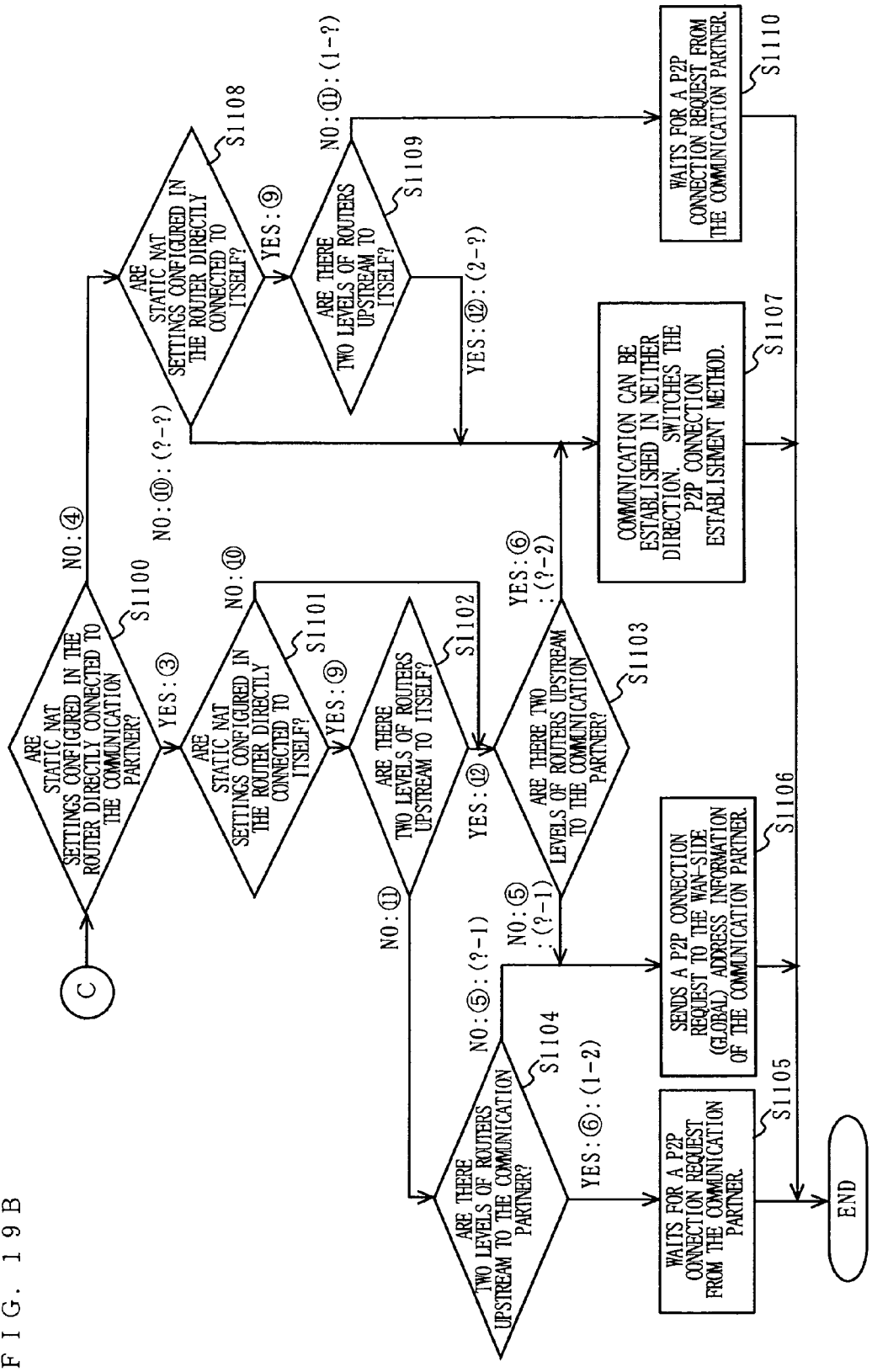
FIG. 19B is a flowchart showing an operation of a user terminal in the second embodiment.

In a second embodiment, a user terminal first determines by which network structure the user terminal itself is connected to a communication partner, or by which route communication is possible, based on its own address information and address information of a communication partner, and then performs P2P communication. In the second embodiment, in the case where there are two or less routers from the user terminal to the Internet, it can be mostly determined with which destination address P2P connection can be established. The network structure, the identification information registration processing, and the communication information exchange processing are substantially the same as those in the first embodiment, and thus will not be described. FIG. 19A and FIG. 19B use representation (x–y). "x" represents the number of routers (the number of levels of routers) upstream with respect to the user terminal, and "y" represents the number of routers (the number of levels of routers) upstream with respect to a user terminal as a communication partner. Symbol "?" indicates that the number of levels of routers cannot be determined to be one or two, or that the number of levels of routers is not known. In the second embodiment also, the user terminal executes a P2P communication program to realize the operation described below.

FIG. 19A and FIG. 19B are flowcharts showing an operation of a user terminal in the second embodiment. Hereinafter, with reference to FIG. 19A and FIG. 19B, the operation of the user terminal in the second embodiment will be described. The operation shown in FIG. 19A and FIG. 19B is realized by the destination address information determination section 107 and the P2P communication processing section 108. In the following description of the operation of the user terminal with reference to FIG. 19A and FIG. 19B, it is assumed that there are two or less routers from the user terminal to the Internet. As described below, the second embodiment is applicable to cases where there are three or more routers from the user terminal to the Internet.

The user terminal compares a communication start request message sent from the user terminal to the communication partner with a communication start response message obtained from the communication partner via the P2P server, and performs the following procedure.

First, the user terminal determines whether or not its own global IP address and the global IP address of the communication partner match each other (step S1000). When the global IP addresses do not match each other, it means that the user terminal and the communication partner should communicate via the Internet. Thus, the user terminal advances to the processing shown in FIG. 19B. When the global IP addresses match each other, it means that the user terminal and the communication partner are downstream with respect to the same router. Thus, the user terminal advances to step S1001. In the case where the global IP addresses do not match each other, the user terminal and the communication partner are connected to each other via the Internet. Thus, the user terminal performs the processing described in FIG. 19B. In this case, the address information is of "type 1". In the case where the global IP addresses match each other, the address information is of "type 2". In FIG. 19A and FIG. 19B, the numbers indicating the types are shown in circles.

In step S1001, the user terminal determines whether or not static NAT settings are configured in a router directly connected to the communication partner. Specifically, the user terminal refers to the address information of the communication partner. When the address information includes WAN-side address information, the user terminal determines that the router has static NAT settings configured therein. In this case, the user terminal advances to step S1002. When the router does not have static NAT settings configured therein, the user terminal cannot determine how many routers are present upstream with respect to the communication partner. In this case, the user terminal advances to step S1006. In the case where the router directly connected to the user terminal as the communication partner can have static NAT settings configured therein, the address information is of "type 3". In the case where the router directly connected to the user terminal as the communication partner cannot have static NAT settings configured therein, the address information is of "type 4".

In step S1002, the user terminal determines whether or not there are two levels of routers upstream with respect to the communication partner. Specifically, the user terminal refers to the address information of the communication partner to compare the global IP address and the WAN-side IP address. When the global IP address and the WAN-side IP address match each other, the user terminal determines that there is one level of router upstream with respect to the communication partner. When the global IP address and the WAN-side IP address do not match each other, the user terminal determines that there are two levels of routers upstream with respect to the communication partner. In this case, the user terminal advances to step S1003. When there is only one level of router upstream with respect to the communication partner, the user terminal advances to step S1005. In the case where there is only one router from the user terminal as the communication partner to the Internet, the address information is of "type 5". In the case where there are two routers from the user terminal as the communication partner to the Internet, the address information is of "type 6".

In step S1003, the user terminal determines whether or not the WAN-side IP address included in its own address information and the WAN-side IP address included in the address information of the communication partner match each other. When the WAN-side IP addresses match each other, it means that the router directly connected to the user terminal is the same as the router directly connected to the communication partner. Accordingly, there are two levels of routers upstream with respect to the user terminal. In this case, the user terminal advances to step S1005. When the WAN-side IP addresses do not match each other, it means the router directly connected to the user terminal is not the same as the router directly connected to the communication partner. Accordingly, it is not known how many levels of routers there are upstream with respect to the user terminal. In this case, the user terminal advances to step S1004. In the case where the WAN-side IP addresses match each other, the address information is of "type 7". In the case where the WAN-side IP addresses do not match each other, the address information is of "type 8".

In step S1004, i.e., in the case where the address information is of types 2, 3, 6 and 8, the user terminal sends a communication path connection request message to the WAN-side address information (IP address and port number) of the communication partner. The communication path connection request message may be of a well-known type. The communication partner sends a response to the sender address information described in the message header of the received communication path connection request message.

Even if static NAT settings are not configured in the router directly connected to the user terminal, dynamic NAT is set by communication from the user terminal to the communication partner. Therefore, the communication path connection response message sent from the communication partner follows the communication route by the dynamic NAT in the opposite direction from the request message and reaches the user terminal. In this manner, P2P communication between the user terminal and the communication partner is realized.

P2P communication in step S1004 is performed when, for example, communication path connection is realized from the user terminal 1*a* shown in FIG. 14A to the user terminal 1*d* shown in FIG. 14B. P2P communication in step S1004 is also performed when communication path connection is realized from the user terminal 1*c* shown in FIG. 16B to the user terminal 1*a* shown in FIG. 16A, and when communication path connection is realized from the user terminal 1*c* shown in FIG. 1A to the user terminal 1*d* shown in FIG. 1A.

In step S1005, i.e., in the case where the address information is of types 2, 3 and 5, or in the case where the address information is of types 2, 3, 6 and 7, the user terminal sends a communication path connection request message to the local address information of the communication partner. The communication partner sends a response to the sender address information described in the message header of the received communication path connection request message. In this manner, P2P communication between the user terminal and the communication partner is realized. The communication partner is located in the same sub network as the user terminal or is connected to the router upstream (on the WAN side) with respect to the user terminal. Therefore, the response from the communication partner can be received by direct communication or by dynamic NAT settings. When there are more than two levels of routers in step S1005, the user terminal and the communication partner may possibly not located downstream with respect to the same router. In this case, P2P communication cannot be performed by the procedure of step S1005. Therefore, the P2P connection establishment method is switched to, for example, a P2P server connection establishment method so as to provide communication between the user terminal and the communication partner.

P2P communication in step S1005 is performed when, for example, communication path connection is realized from the user terminal 1*a* shown in FIG. 16A to the user terminal 1*c* shown in FIG. 16B. P2P communication in step S1005 is also performed when communication path connection is realized from the user terminal 1*b* shown in FIG. 1A to the user terminal 1*c* shown in FIG. 1A, and when communication path connection is realized from the user terminal 1*d* shown in FIG. 1A to the user terminal 1*c* shown in FIG. 1A.

In step S1006, the user terminal determines whether or not static NAT settings are configured in the router directly connected to the user terminal. Specifically, when the address information includes a WAN-side IP address, the user terminal determines that the router has static NAT settings configured therein. In the case where the router directly connected to the user terminal can have static NAT settings configured therein, the address information is of "type 9". In the case where the router directly connected to the user terminal cannot have static NAT settings configured therein, the address information is of "type 10".

When it is determined in step S1006 that the router has static NAT settings configured therein, the communication partner, i.e., a second user terminal (hereinafter, referred to simply as the "second user terminal") cannot receive a message sent from the user terminal (hereinafter, referred to as the "first user terminal"), but the first user terminal can receive a message from the second user terminal. Accordingly, the first user terminal advances to step S1007 and waits for a communication path connection request message from the second user terminal. The second user terminal determines that the router directly connected to the first user terminal has static NAT settings configured therein, and therefore, performs the operation in step S1004 or S1005. Namely, the second user terminal sends a communication path connection request message to the first user terminal. In this manner, P2P connection can be established. The operation in step S1007 is performed when the address information is of types 2, 4 and 9.

When it is determined in step S1006 that the router does not have static NAT settings configured therein, it is not known whether there is one router or two routers upstream with respect to the first user terminal, and it is not known whether there is one router or two routers upstream with respect to the second user terminal. There is also a possibility that the first user terminal and the second user terminal are in the same sub network. Accordingly, the first user terminal sends a communication path connection request message to the local address information of the second user terminal (step S1008). The operation in step S1008 is performed when the address information is of types 2, 4 and 10.

When the first and second user terminals are in the same sub network, or when the second user terminal is connected to a router which is upstream (on the WAN side) with respect to the router connected to the first user terminal (for example, the case of the user terminals 1a and 1c), the message from the first user terminal reaches the second user terminal by dynamic NAT settings.

Even in the above case, how the first and second user terminals are connected cannot be determined if each router does not have static NAT settings configured therein (if each router is not conformed to the UPnP•IGD protocol). Therefore, the first user terminal determines "NO" in step S1001 and performs the operation in step S1008, instead of the operation in step S1007.

When the connection cannot be established in step S1008, the second user terminal may request the local address information of the first user terminal for P2P connection. Such control realizes P2P communication if the first user terminal is connected to a router which is upstream (on the WAN side) with respect to the router connected to the second user terminal.

After step S1008, the first user terminal determines whether a communication path has been established or not (step S1009). When the communication path has been established, the first and second user terminals perform P2P communication using the established communication path. When the communication path has not been established, it means that the first and second terminals each have two upstream routers, like the user terminals 1a and 1d, and the routers directly connected thereto (the routers 2A and 2B) do not have static NAT settings configured therein. In this case, the first user terminal switches the P2P connection establishment method to a P2P server connection establishment method and/or a STUN connection establishment method and performs P2P communication with the second user terminal (step S1010).

Even when the router directly connected to the first user terminal has static NAT settings configured therein in step S1006, there is a possibility that there is only one router upstream with respect to the communication partner, like the user terminal 1c. Accordingly, the first user terminal may first attempt to request communication start like in steps S1008 and S1009, and when the communication path cannot be established, advances to step S1007.

In step S1100 in FIG. 19B, the first user terminal determines whether or not static NAT settings are configured in the router directly connected to the second user terminal. The criterion for the determination is substantially the same as in step S1001. When the router directly connected to the second user terminal has static NAT settings configured therein, the first user terminal advances to step S1101. When the router directly connected to the second user terminal does not have static NAT settings configured therein, the first user terminal advances to step S1108.

In step S1101, the first user terminal determines whether or not static NAT settings are configured in the router directly connected thereto. Specifically, the first user terminal refers to its own address information. When the address information includes WAN-side address information, the first user terminal determines that the router has static NAT settings configured therein. In this case, the first user terminal advances to step S1102. When the router does not have static NAT settings configured therein, the first user terminal advances to step S1103. In the case where the router directly connected to the first user terminal can have static NAT settings configured therein, the address information is of "type 9". In the case where the router directly connected to the first user terminal cannot have static NAT settings configured therein, the address information is of "type 10".

In step S1102, the first user terminal determines whether or not there are two levels of routers upstream with respect thereto. Specifically, the first user terminal refers to its own address information to compare the global IP address and the WAN-side IP address. When the global IP address and the WAN-side IP address match each other, the first user terminal determines that there is one level of router upstream with respect thereto. When the global IP address and the WAN-side IP address do not match each other, the first user terminal determines that there are two levels of routers upstream with respect thereto. In this case, the first user terminal advances to step S1103. When there are not two levels of routers, i.e., there is only one level of router, upstream with respect to the first user terminal, the first user terminal advances to step S1104. In the case where there is only one router from the first user terminal to the Internet, the address information is of "type 11". In the case where there are two routers from the first user terminal to the Internet, the address information is of "type 12".

In step S1104, the first user terminal determines whether or not there are two levels of routers upstream with respect to the second user terminal. When there are two levels of routers upstream with respect to the second user terminal, the first user terminal advances to step S1105. When there are not two levels of routers upstream with respect to the second user terminal, i.e., there is only one level of router with respect to the second user terminal, the first user terminal advances to step S1106.

In step S1103, the first user terminal determines whether or not there are two levels of routers upstream with respect to the second user terminal. When there are not two levels of routers upstream with respect to the second user terminal, the first user terminal advances to step S1106. When there are two levels of routers upstream with respect to the second user terminal, the first user terminal advances to step S1107.

The operation in step S1105 is performed when the routers directly connected to the first user terminal and the second user terminal both have static NAT settings configured therein (type 3 and type 9), there is one level of router upstream with respect to the first user terminal (type 11), and there are two levels of routers upstream with respect to the second user terminal (type 6). For example, this corresponds to the case where in FIG. 1A, the first user terminal is the user terminal 1*e* and the second user terminal is the user terminal 1*a*. When there are two levels of routers upstream with respect to the second user terminal, the second user terminal cannot configure static NAT settings in a router which is upstream with respect to the router directly connected to the second user terminal. Accordingly, a communication path connection request message from the first user terminal does not reach the second user terminal. On the other hand, there is one level of router upstream with respect to the first user terminal, and the router has static NAT settings configure therein. Therefore, a communication path connection request message from the second user terminal reaches the first user terminal. Accordingly, the first user terminal waits for the communication path connection request from the second user terminal (step S1105). In the above conditions, the second user terminal performs the operation in step S1106 described below. In step S1106, the second user terminal sends a communication path connection request message based on the WAN-side address information of the first user terminal. In step S1106, there is one level of router upstream with respect to the second user terminal. Thus, the WAN-side IP address and the global IP address match each other.

The operation in step S1106 is performed in one of the following three conditions. In condition 1, the routers directly connected to the first user terminal and the second user terminal both have static NAT settings configured therein (type 3 and type 9); there is only one level of router upstream with respect to the first user terminal (type 11); and there is only one level of router upstream with respect to the second user terminal (type 5). In condition 2, the router directly connected to the second user terminal has static NAT settings configured therein (type 3); the router directly connected to the first user terminal does not have static NAT settings configured therein (type 10); and there is only one level of router upstream with respect to the second user terminal (type 5). In condition 3, the routers directly connected to the first user terminal and the second user terminal both have static NAT settings configured therein (type 3 and type 9); there are two levels of routers upstream with respect to the first user terminal (type 12); and there is only one level of router upstream with respect to the second user terminal (type 5). If one of these conditions is fulfilled, the first user terminal sends a communication path connection request message to the second user terminal using the WAN-side address information of the second user terminal (step S1106). In step S1106, there is one level of router upstream with respect to the second user terminal. Thus, the WAN-side IP address and the global IP address match each other. The second user terminal can respond to the communication path connection request message based on the sender address information of the request. In this manner, a communication path for P2P communication is established between the first user terminal and the second user terminal.

In step S1108, the first user terminal determines whether or not static NAT settings are configured in the router directly connected thereto. When the router has static NAT settings configured therein, the first user terminal advances to step S1109. When the router does not have static NAT settings configured therein, the first user terminal advances to step S1107.

In step S1109, the first user terminal determines whether or not there are two levels of routers upstream with respect thereto. When there are two levels of routers, the first user terminal advances to step S1107. When there is only one level of router, the first user terminal advances to step S1110.

The operation in step S1107 is performed in one of the following four conditions.

In condition 1, the routers directly connected to the first user terminal and the second user terminal both have static NAT settings configured therein (type 3 and type 9); there are two levels of routers upstream with respect to the first user terminal (type 12); and there are two levels of routers upstream with respect to the second user terminal (type 6). In condition 1, there is one level of router which does not allow static NAT settings to be configured therein, both upstream with respect to the first user terminal and upstream with respect to the second user terminal. Therefore, a communication path connection request message from the first user terminal does not reach the second user terminal, and a communication path connection request message from the second user terminal does not reach the first user terminal. Thus, the first user terminal performs the operation in step S1107.

In condition 2, the router directly connected to the second user terminal has static NAT settings configured therein (type 3); the router directly connected to the first user terminal does not have static NAT settings configured therein (type 10); and there are two levels of routers upstream with respect to the second user terminal (type 6). In condition 2, there is a router which does not have static NAT settings configured therein upstream with respect to the second user terminal. Therefore, a communication path connection request message from the first user terminal does not reach the second user terminal. The router directly connected to the first user terminal does not have static NAT settings configured therein. Therefore, a communication path connection request message from the second user terminal does not reach the first user terminal. Thus, the first user terminal performs the operation in step S1107.

In condition 3, the router directly connected to the second user terminal does not have static NAT settings configured therein (type 4); and the router directly connected to the first user terminal does not have static NAT settings configured therein (type 10). In condition 3, neither the router directly connected to the first user terminal nor the router directly connected to the second user terminal has static NAT settings configured therein. Therefore, a communication path connection request message from the first user terminal does not reach the second user terminal, and a communication path connection request message from the second user terminal does not reach the first user terminal. Thus, the first user terminal performs the operation in step S1107. Condition 3 is occurs, for example, in the case of FIG. 12A and FIG. 12B.

In condition 4, the router directly connected to the second user terminal does not have static NAT settings configured therein (type 4); the router directly connected to the first user terminal has static NAT settings configured therein (type 9); and there are two levels of routers upstream with respect to the first user terminal (type 12). In condition 4, there is one level of router which does not allow static NAT settings to be configured therein upstream with respect to the first user terminal. Therefore, a communication path connection request message from the second user terminal does not reach the first user terminal. The router directly connected to the second user terminal does not have static NAT settings configured therein. Therefore, a communication path connection request message from the second user terminal does not reach the first user terminal. Thus, the first user terminal performs the operation in step S1107.

When there are routers which do not have static NAT settings configured therein as in conditions 1 through 4, the only possible way to establish a communication path is by using dynamic NAT settings. However, a communication path can be established by dynamic NAT settings only under the condition that a message from one user terminal can reach the other user terminal. In conditions 1 through 4, messages from neither user terminal reach the other user terminal. Thus, a communication path cannot be established even by dynamic NAT settings. Therefore, in step S1107, the first user terminal switches the connection establishment method to a P2P server connection establishment method and/or a STUN connection establishment method and thus performs P2P communication with the second user terminal.

The operation in step S1110 is performed when the router directly connected to the second user terminal does not have static NAT settings configured therein (type 4); the router directly connected to the first user terminal has static NAT settings configured therein (type 9); and there is only one level of router upstream with respect to the first user terminal (type 11). In this case, the router directly connected to the second user terminal does not have static NAT settings configured therein. Therefore, a communication path connection request message from the first user terminal does not reach the second user terminal. However, there is only one level of router upstream with respect to the first user terminal and the router has static NAT settings configured therein. Therefore, the second user terminal can cause a communication path connection request message to reach the first user terminal by performing the operation in step S1106. Thus, the first user terminal waits for the communication path connection request message from the second user terminal (step S1100). In this manner, P2P communication is realized.

In the above description, the first and second user terminals both have a procedure shown in FIG. 19A and FIG. 19B installed thereon. In the case where the second user terminal does not have the procedure shown in FIG. 19A and FIG. 19B installed thereon, the second user terminal may not be able to receive the communication path connection request message sent by the first user terminal. When this occurs, the second user terminal does not send a communication path connection response message. The second user terminal may not send a communication path connection request message. As a solution for such a case, another step may be provided immediately before the END of FIG. 19A and FIG. 19B. In this step, the first user terminal determines whether or not a communication path has been established between the first user terminal and the second user terminal like in, for example, step S1009. When a communication path has not been established, the first user terminal switches the connection establishment method to a P2P server connection establishment method and/or a STUN connection establishment method like in, for example, step S1010.

In steps S1005 and S1008 in FIG. 19A, the first user terminal attempts to send a communication path connection request to the local address information of the second user terminal. Local address information of user terminals is assigned by individual routers. Therefore, there is a possibility that a plurality of user terminals have the same value as the local address information in different sub networks. Therefore, when the local address information is the destination of a communication path connection request message, there is a possibility that the communication path connection request message is delivered to a user terminal other than the desired communication partner. However, the user terminal other than the desired communication partner has not exchanged address information in advance, and can recognize that the message has been delivered by mistake. Thus, the user terminal other than the desired communication partner does not return a communication path connection response message. As a result, a wrong communication path connection does not occur.

In the case where a user terminal is directly connected to the Internet, i.e., in the case where the global IP address of a user terminal matches the local IP address thereof, the local address information is described in the section of the WAN-side address information of the router upstream with respect to the user terminal. Accordingly, in step S1104 or S1103, the first user terminal determines that there is only one level of upstream router. In this case, the first user terminal advances to step S1106 and sends a communication path connection request message to the WAN-side address information of the communication partner. This operation in step S1106 is substantially the same as the operation of sending the message directly to the local address information of the communication partner as the destination.

As described above, according to the second embodiment, a user terminal determines to which type, among predefined types, the first and second global address information and the first and second WAN-side address information belong. The user terminal determines in advance whether the destination address information should be the second global address information, the second WAN-side address information or the second local address information, in correspondence with the type of the first and second global address information and the first and second WAN-side address information. The user terminal also determines in advance whether the user terminal should wait for a connection request from the communication partner or switch the connection establishment method, in correspondence with the type of the first and second global address information and the first and second WAN-side address information. Then, the user terminal starts P2P communication using the address information corresponding to the type of the first and second global address information and the first and second WAN-side address information. The combinations of types 1 through 12 shown in the second embodiment cover all the cases where there are two or less routers upstream with respect to the user terminal. Thus, according to the procedure shown in the second embodiment, the user terminal can expect a communication route with the communication partner to determine which address information should be used for starting P2P communication. Therefore, in the second embodiment, the number of times that the user terminal attempts to send a communication path connection request message can be decreased, and thus wasteful transmission of communication path connection request messages can be reduced. As a result, a communication path can be established in a shorter period of time.

In the second embodiment like in the first embodiment, a user terminal determines a method by which P2P connection can be established, based on the first and second global address information, WAN-side address information, and local address information. Usable methods include, for example, a method of starting P2P communication using local address information (see S1005 and S1008 in FIG. 19A), a method of starting P2P communication using WAN-side address information (see S1004 in FIG. 19A and S1106 in FIG. 19B), a method of starting P2P communication using sender address information (see S1007 in FIG. 19A, and S1105 and S1110 in FIG. 19B), a method of starting P2P communication using address information corresponding to the global IP address (see S1106 FIG. 19B), a method of starting P2P communication using a P2P server (see S1010 in FIG. 19A and S1107 in FIG. 19B), and a method of starting P2P communication using a STUN connection establishment method (see S1010 in FIG. 19A and S1107 in FIG. 19B).

The present invention is applicable to the cases where there are three or more routers from a user terminal to the Internet. Hereinafter, a case where there are three or more routers from one of the user terminals to the Internet will be discussed.

In the case where there are three or more routers from one of the user terminals to the Internet also, the first user terminal and the second user terminal operate in accordance with the procedure shown in FIG. 19A and FIG. 19B.

First, it is assumed that the first user terminal and the second user terminal are each directly connected to one of an arbitrary router in the network and routers downstream thereto by one or two levels. In this case, the two global IP addresses match each other. Therefore, the first and second user terminals attempt to perform P2P communication in accordance with the procedure shown in FIG. 19A. The arbitrary router corresponds to the uppermost router in the case where there are two or less routers from the user terminal and the Internet. Accordingly, the first and second user terminals can start P2P communication by operating in accordance with the procedure shown in FIG. 19A.

Next, a case where there are three or more routers from one of the first and second user terminals to the Internet, and there are two or less routers from the other user terminal to the Internet will be discussed. In this case, the two global IP addresses do not match each other. Therefore, the first and second user terminals attempt to perform P2P communication in accordance with the procedure shown in FIG. 19B. The other user terminal is assumed to be the second user terminal. When the router directly connected to the second user terminal has static NAT settings configured therein, the first user terminal advances to step S1103. When there is only one router upstream with respect to the second user terminal, the first user terminal advances to step S1106, and starts P2P communication using the global address information of the second user terminal. When there are two routers upstream with respect to the second user terminal, the first user terminal advances to step S1107 and switches the connection establishment method. In this manner, the first user terminal and the second user terminal can start P2P communication.

In the case where there are three or more routers from either the first user terminal or the second user terminal to the Internet, other forms of connections are conceivable. Thus, there may be cases where P2P connection cannot be established in accordance with the procedure shown in FIG. 19A and FIG. 19B. As a solution for such a case, another step may be provided immediately before the END of FIG. 19A and FIG. 19B. In this step, one of the user terminals determines whether or not a communication path has been established between the user terminal and the communication partner. When a communication path has not been established, the user terminal switches the P2P connection establishment method to a P2P server connection establishment method or a STUN connection establishment method. By such setting, P2P connection can be established even in the case where there are three or more routers from one of the user terminals to the Internet.

In the case where two user terminals are connected to each other via four or less routers, as long as a router directly connected to one of the user terminals is conformed to the UPnP•IGD protocol and allows static NAT settings to be configured therein, P2P communication can be started from the other user terminal.

In the case where two user terminals are connected to each other via five or more routers, the user terminals cannot receive a message from the communication partner or may receive a message addressed to a different destination. These cases occur for the reason that, for example, among the routers, there is a router which does not have static NAT settings configured therein originally or a router which cannot have static NAT settings configured therein even if the user terminal attempts static NAT settings. As a solution of such a case, in consideration of the possibility that the network to which the user terminal belongs is a large scale network, additional steps can be provided before the END of FIG. 19A and FIG. 19B; i.e., the step in which the user terminal determines whether or not the connection has been established within a predetermined period of time, and the step in which, when the connection has not been established within the predetermined period of time, the user terminal attempts using a P2P server connection establishment method and/or a STUN connection establishment method like in steps S1010 and S1107.

The procedure of determination shown in FIG. 19A and FIG. 19B is merely exemplary. The way of defining the types of the first and second global address information and the first and second WAN-side address information is also merely exemplary. The user terminal may determine which address information should be used to start P2P communication in any procedure other than that shown in FIG. 19A and FIG. 19B as long as the user terminal can learn the connection state of the user terminal itself and the communication partner. Any such procedure, by which the connection state of the network can be estimated completely or partially, is usable in this embodiment.

As described above, the first and second embodiments are directed to a P2P communication method comprising the step of acquiring global address information assigned to a user terminal using a server in the Internet, such as steps S501 and S602; the step of setting an address translation rule in a router directly connected to the user terminal, such as steps S503 and S604; the step of acquiring a WAN-side IP address of a router directly connected to the user terminal, such as steps S502 and S603; the step of notifying the communication partner of WAN-side address information based on the address translation rule which is set in the router directly connected to the user terminal, global address information acquired from the server, and local address information, such as steps S504, S505, S605 and S606; and the step of performing P2P communication using the notified information as described above with reference to FIG. 11A, FIG. 1B, FIG. 19A and FIG. 19B. By providing means for performing the operation of each step described in the first and second embodiments, a method for realizing direct P2P communication between user terminals can be structured.

A user terminal notifies another user terminal, which is a communication partner, of the global address information, WAN-side address information and local address information. When the two user terminals have the same global address information, P2P communication is started using the local address information or the WAN-side address information. A user terminal compares the notified address information of the communication partner and its own address information, and thus determines whether or not P2P connection can be established using the address information of the communication partner. When determining that P2P connection cannot be established, the user terminal switches the connection establishment method and performs communication.

Third Embodiment

FIG. 20 is a block diagram showing a detailed functional structure of a communication apparatus, which is a user terminal for performing P2P communication processing according to the present invention. As shown in FIG. 20, the communication apparatus includes an identification information recording section 201, a self and partner address information memory section 202, an address information comparison and determination section 203, a communication path establishment determination section 204, a control section 205, a connection establishment method switching section 206, an application processing section 207, an identification information registration sending section 208, an address information notification request sending and response receiving section 209, a static NAT setting requesting section 210, a communication start request sending and response receiving section 211, a communication path connection request sending and response receiving section 212, a P2P communication processing section 213, a P2P server connection establishment method processing section 214, a STUN connection establishment method processing section 215, and a network interface 216. The functional blocks are connected to each other as indicated by the arrows in FIG. 20.

The identification information recording section 201 is a memory storing identification information its own communication apparatus, which is a user terminal. The self and partner address information memory section 202 is a memory storing its own address information and address information of a communication partner as shown in FIG. 14A and FIG. 14B. The address information comparison and determination section 203, the communication path establishment determination section 204, the connection establishment method switching section 206, the application processing section 207, the identification information registration sending section 208, the address information notification request sending and response receiving section 209, the static NAT setting requesting section 210, the communication start request sending and response receiving section 211, the communication path connection request sending and response receiving section 212, the P2P communication processing section 213, the P2P server connection establishment method processing section 214, the STUN connection establishment method processing section 215 and the network interface 216 are functional blocks for performing the processing described in the first and second embodiments, and perform predetermined processing by an instruction of the control section 205. The network interface 216 processes a physical layer and a data link layer, and sends and receives data between an home network and the Internet.

The identification information registration sending section 208, for the processing in steps S301 and S302, establishes a communication path with the P2P server 3, sends the identification information of its own communication apparatus stored in the identification information recording section 202 to the P2P server 3, and registers the identification information in the P2P server 3.

The address information notification request sending and response receiving section 209, as described regarding step S501, creates and sends an address information notification request message, receives an address information notification response message, and describes the acquired address information in the section of global address information of the self and partner address information memory section 202.

The address information comparison and determination section 203, as described regarding step S502, compares the address information and passes the comparison result to the control section 205. Based on the comparison result, the control section 205 causes the static NAT setting requesting section 210 to configure static NAT settings in a router directly connected to the communication apparatus when necessary. The static NAT setting requesting section 210 describes the setting result in the section of WAN-side address information of the self and partner address information memory section 202. The processing of the static NAT setting requesting section 210 is described above regarding steps S502 and S503.

The communication start request sending and response receiving section 211, as described regarding step S504, sends a communication start request message to the P2P server 3. The communication start request sending and response receiving section 211 also waits for a communication start response message, which is a response to the communication start request message. Upon receipt of the communication start response message, the communication start request sending and response receiving section 211 stores the address information of the communication partner, which is described in the communication start response message, in the section of the communication partner of the self and partner address information memory section 202. These operations are monitored by the control section 205.

When the communication apparatus is a communication partner of another communication apparatus, the identification information registration sending section 208, the address information notification request sending and response receiving section 209, the address information comparison and determination section 203, the static NAT setting requesting section 210, and the communication start request sending and response receiving section 211 perform the processing described above regarding steps S601 through S605 by an instruction of the control section 205.

When its own address information and the address information of the communication partner as shown in FIG. 14A and FIG. 14B are obtained, the communication apparatus now performs the operation of P2P communication path connection described above with reference to FIG. 19A and FIG. 19B.

In accordance with an instruction of the control section 205, the address information comparison and determination section 203 compares the predetermined address information in the self and partner address information memory section 202 to determine whether the communication is communication performed via the Internet or communication inside the home network, and also whether P2P connection can be established or not. The address information comparison and determination section 203 then notifies the determination result to the control section 205.

The control section 205 instructs the communication path connection request sending and response receiving section 212 to send a communication path connection request message to the selected address information and wait for a communication path connection response message from the communication partner. In the case where the determination result indicates that there is no route for delivering a communication path connection request message from the communication apparatus to the communication partner, the control section 205 instructs the communication path connection request sending and response receiving section 212 to wait for a communication path connection request message from the communication partner.

In accordance with an instruction from the control section 205, the communication path establishment determination section 204 monitors the operation of the communication path connection request sending and response receiving section 212 of sending a communication path connection request message, receiving a corresponding communication path connection response message, receiving a communication path connection request message, and sending a corresponding communication path connection response message. The communication path establishment determination section 204 thus determines whether a communication path has been established or not, and notifies the determination result to the control section 205. When the communication path connection request message and the corresponding communication path connection response message are successfully sent and received, or when the communication path connection request message and the corresponding communication path connection response message are successfully received and sent, the communication path establishment determination section 204 notifies such a result to the control section 205. The control section 205 activates the P2P communication processing section 213. After this, the application processing section 207 performs P2P communication with the communication partner via the P2P communication processing section 213.

When a communication path connection request message cannot be sent and a communication path connection request message is not received, the connection establishment method switching section 206 determines that P2P connection cannot be established, and notifies the determination result to the control section 205.

Upon receipt of the determination result, the control section 205 instructs the connection establishment method switching section 206 to activate the P2P server connection establishment method processing section 214 or the STUN connection establishment method processing section 215 and thus to establish a communication path.

The processing in step S901 and address information search processing in step S910 in FIG. 11A and FIG. 11B are performed by the address information comparison and determination section 203. The processing in steps S902, S905, S909, a part of S910 and S913 is performed by the communication path connection request sending and response receiving section 212. The processing in steps in S903, S904, S907, S908, S911 and S912 is performed by the communication path establishment determination section 204.

The processing in steps S1000 through S1003, S1006, S1008 in FIG. 19A and in steps S1100 through S1004, S1108 and S1109 FIG. 19B is performed by the address information comparison and determination section 203. The processing in steps S1004, S1005, S1007 and S1108 in FIG. 19A and in steps S1105, S1106 and S1100 in FIG. 19B is performed by the communication path connection request sending and response receiving section 212. The processing in step S1009 in FIG. 19A is performed by the communication path establishment determination section 204. The processing in step S1010 in FIG. 19A and in step S1107 in FIG. 19B is performed by the connection establishment method switching section 206.

The function of each functional block described above can be summarized as follows.

The address information notification request sending and response receiving section 209 acquires global address information assigned to its own user terminal using the P2P server 3.

The static NAT setting requesting section 210 sets an address translation rule in an upstream router and thus acquires WAN-side address information of the upstream router.

The communication start request sending and response receiving section 211 sends the global address information acquired from the P2P server 3, the WAN-side address information by the address translation rule set in the upstream router, and the local address information to the communication partner via the P2P server 3.

The P2P communication processing section 213 performs P2P communication using the notified address information.

Among the notified global address information, WAN-side address information and local address information, the address information comparison and determination section 203 compares to determine whether or not the global address information of its own user terminal and the global address information of the communication partner match each other. Based on the comparison result, the communication path connection request sending and response receiving section 212 performs connection or communication using the local address information and/or the WAN-side address information. The address information comparison and determination section 203 performs at least one of (i) examination on whether or not the router directly connected to its own user terminal has NAT settings configured therein, (ii) examination on whether or not the router directly connected to the communication partner has NAT settings configured therein, (iii) examination on whether or not there are two levels of routers upstream with respect to the communication partner, and (iv) examination on whether or not the WAN-side IP address of the directly connected router to its own user terminal matches the WAN-side IP address of the directly connected router to the communication partner. Thus, the address information comparison and determination section 203 determines whether direct connection can be established or not.

The communication path connection request sending and response receiving section 212 attempts to perform connection or communication using the local address information, the WAN-side address information, and the global address information of the communication partner in this order. When no attempt is successful, the communication path connection request sending and response receiving section 212 waits for connection from the communication partner. When the global address information of its own user terminal and the global address information of the communication partner, among the exchanged global address information, WAN-side address information and local address information, are equal to each other, the address information comparison and determination section 203 determines whether the direct connection using the notified address information of the communication partner and the address information of its own user terminal can be established or not, based on such address information. When the direct connection can be established, the communication path connection request sending and response receiving section 212 performs connection or communication using the local address information and/or the WAN-side address information.

The communication start request sending and response receiving section 211 notifies the global address information, the WAN-side address information, and the local address information to the communication partner. When the address information comparison and determination section 203 determines that the global address information of its own user terminal is not equal to the global address information of the communication partner, the communication start request sending and response receiving section 211 performs connection or communication using the global address information.

The address information comparison and determination section 203 searches for the global IP address of the communication partner in the local address information, the WAN-side address information, and the global address information in this order. Based on the result, the communication path connection request sending and response receiving section 212 attempts to perform connection or communication to address information corresponding to the global IP address. When the attempt fails, the communication path connection request sending and response receiving section 212 waits for connection from the communication partner.

When the global address information of its own user terminal and the global address information of the communication partner, among the exchanged global address information, WAN-side address information and local address information, are not equal to each other, the address information comparison and determination section 203 determines whether the direct connection using the notified address information of the communication partner and the address information of its own user terminal can be established or not, based on such address information. When it is determined that the direct connection can be established, the communication path connection request sending and response receiving section 212 performs connection or communication using the global address information.

The address information comparison and determination section 203 performs at least one of (i) examination on whether or not the router directly connected to its own user terminal has NAT settings configured therein, (ii) examination on whether or not the router directly connected to the communication partner has NAT settings configured therein, (iii) examination on whether or not there are two levels of routers upstream with respect to the communication partner, and (iv) examination on whether or not the WAN-side IP address of the directly connected router to its own user terminal matches the WAN-side IP address of the directly connected router to the communication partner.

The connection establishment method switching section 206 determines whether or not the direct connection using the notified address information of the communication partner and the address information of its own user terminal can be established or not, based on such address information. When it is determined that direct connection cannot be established, the connection establishment method switching section 206 switches the connection establishment method and thus performs communication.

A static NAT setting change requesting section 217 deletes an unnecessary address translation rule which is set in the directly connected router based on the exchanged address information. For example, the static NAT setting change requesting section 217 can delete static NAT settings when P2P connection using the static NAT settings can be established.

In the case where the address translation rule set in the upstream router is non full-cone NAT, which does not restrict the communication partner, the static NAT setting change requesting section 217 changes the rule to full-cone NAT, which restricts the communication partner, after P2P communication is started. The "non full-cone NAT" is NAT other than full-cone NAT.

Referring to FIG. 20, the address information comparison and determination section 203, the communication path establishment determination section 204, the control section 205, the connection establishment method switching section 206, the application processing section 207, the identification information registration sending section 208, the address information notification request sending and response receiving section 209, the static NAT setting requesting section 210, the communication start request sending and response receiving section 211, the communication path connection request sending and response receiving section 212, the P2P communication processing section 213, the P2P server connection establishment method processing section 214, the STUN connection establishment method processing section 215 may be structured by individual hardware. In general, these functional blocks can be implemented by executing a program (P2P communication program) on a computer apparatus as described in the first and second embodiments. Accordingly, each functional block is implemented in a CPU, a memory such as a RAM, a ROM or the like, or a HDD of a well-known computer system. Namely, each functional block may physically share hardware. Alternatively, each functional block may be implemented by an individual program which is completely independent or by a program partially shared.

Fourth Embodiment

In the above-described embodiments, dynamic NAT settings are automatically performed by a router when a user terminal sends data.

Dynamic NAT settings are classified into dynamic NAT settings by which address information translation is performed only when a response is returned from the communication partner, and dynamic NAT settings by which address information translation is performed in accordance with a NAT translation table based on the address translation rule regardless of the sender of the data.

The former is full-cone NAT settings which restrict the sender of the data. In the case where the dynamic NAT settings which are performed when the user terminal sends data to the P2P server 3 are full-cone NAT settings, the data does not reach the user terminal unless the sender is the P2P server 3. Accordingly, the full-cone dynamic NAT settings which are performed when the user terminal sends data to the P2P server 3 cannot be used for communication between user terminals. Therefore, in the above embodiments, static NAT settings are configured by the directly connected router. However, when static NAT settings are configured before communication is performed between user terminals as in step S503 in FIG. 5, the response from the user terminal as the communication terminal cannot be specified. Accordingly, in the above embodiments, static NAT settings need to be performed in the mode of performing NAT translation regardless of the sender; i.e., need to be non full-cone static NAT settings.

In a fourth embodiment, a user terminal capable of switching the non full-cone static NAT settings to full-cone NAT settings is proposed.

As shown in FIG. 14A and FIG. 14B, a user terminal learns the local IP address and the port number of the communication partner when exchanging the address information. Therefore, the user terminal switches the setting in the router such that NAT translation is performed based on static NAT settings only when the sender is the address information of the communication partner. Namely, the user terminal switches the settings in the router to full-cone static NAT settings when learning the address information of the communication partner.

For example, the user terminal sends an AddPortMapping action message, having the address information of the communication partner additionally described therein, to the directly connected router and instructs the router to restrict the partner for which address information is translated. The WAN-side IP address and the port number of the static NAT settings are already notified to the communication partner. Therefore, when instructing to restrict the partner for which address information is translated, the user terminal only needs to restrict the destination address information without changing the WAN-side IP address and the port number.

As described above, after P2P communication is started and address information of the communication partner is acquired, the user terminal changes the static NAT settings so as to restrict the communication partner. By this, the user terminal can avoid untrusted, malicious communication from an apparatus other than the user terminal wishing to perform communication. As a result, the security level is improved.

In the case where the communication partner cannot be restricted using the currently known AddPortMapping action message, the user terminal may define and use a new AddPortMapping action message having an added area in which the address information of the communication partner can be described.

In step S604 in FIG. 10, the user terminal already knows the address information of the communication partner. Therefore, the user terminal may configure full-cone static NAT settings in the router from the start.

Fifth Embodiment

As described above, full-cone or non full-cone dynamic NAT settings are configured when a user terminal performs communication.

In the above embodiments, the user terminal configures static NAT settings in the router in step S503 in FIG. 7.

In a fifth embodiment, in step S503 in FIG. 7, the user terminal configures non full-cone dynamic NAT settings in the router, instead of static NAT settings. In step S503, the user terminal acquires the WAN-side IP address and the port number by the non full-cone dynamic NAT settings from an upstream router, stores the WAN-side IP address and the port number as the WAN-side address information of the upstream router, and sends the WAN-side address information to the user terminal as the communication partner via the P2P server 3. In step S604 in FIG. 10, the user terminal as the communication partner may also configure non full-cone dynamic NAT settings in the router.

In order to realize the fifth embodiment, the user terminal needs to have a function of instructing the router of a non full-cone NAT translation mode. The router needs to have a function of setting the non full-cone NAT translation mode in accordance with the instruction. The user terminal and the router need to have a function of communicating a message and a return message for sending and receiving a WAN-side IP address and a port number as the address information which is set in the router. By this, it is not necessary to configure static NAT settings in the router.

For example, a communication apparatus as the user terminal includes the control section 205 and a NAT setting change requesting section 217 (FIG. 20). The control section 205 inquires an upstream router whether the address translation rule of the dynamic NAT settings in the upstream router is of full-cone dynamic NAT settings or of non full-cone dynamic NAT settings. When the address translation rule is a full-cone address translation rule, the NAT setting change requesting section 217 requests the upstream router to change the address translation rule of the dynamic NAT settings already configured to a non full-cone address translation rule. As the request message, a format obtained by modifying the message described above regarding the static NAT settings can be used. The NAT setting change requesting section 217 may be provided in parallel with the static NAT setting requesting section 210. The control section 205 manages the NAT setting state and the WAN-side address information of the upstream router, manages the operation of the NAT setting change requesting section 217, and issues operation instructions to the NAT setting change requesting section 217.

Sixth Embodiment

In the fourth and fifth embodiments, control of restricting the communication partner in dynamic NAT settings and static NAT settings in the processing up to the address information exchange performed via the P2P server 3 is described. In a sixth embodiment, the sender which is to be subjected to NAT translation is restricted when communication between user terminals is started.

When a starting-side user terminal sends data to the user terminal as the communication terminal, dynamic NAT settings are automatically configured. The user terminal may set the dynamic NAT settings to full-cone NAT dynamic NAT settings, by which NAT translation is performed only to a response from the communication partner. In order to realize this, after the communication is started using static NAT settings, the starting-side user terminal acquires the WAN-side IP address and the port number by the dynamic NAT settings in a router upstream with respect thereto, and notifies the WAN-side IP address and the port number to the communication partner. After this, the user terminal as the communication partner can use the WAN-side IP address and the port number of the new dynamic NAT settings as the destination of the response. The static NAT settings configured before in the upstream router of the starting-side user terminal is not necessary. Therefore, the upstream router can delete the unnecessary NAT settings as described below in an eighth embodiment.

In order to set the dynamic NAT settings to full-cone dynamic NAT settings, the communication apparatus as the user terminal may include the control section 205 and the NAT setting change requesting section 217. The control section 205 inquires an upstream router whether the address translation rule of the dynamic NAT settings in the upstream router is of full-cone dynamic NAT settings or of non full-cone dynamic NAT settings. When the address translation rule is a non full-cone address translation rule, the NAT setting change requesting section 217 requests the upstream router to change the address translation rule to a full-cone address translation rule. As the request message, a format obtained by modifying the message described above regarding the static NAT settings can be used. The NAT setting change requesting section 217 may be provided in parallel with the static NAT setting requesting section 210. The control section 205 manages the NAT setting state and the WAN-side address information of the upstream router, manages the operation of the NAT setting change requesting section 217, and issues operation instructions to the NAT setting change requesting section 217.

Seventh Embodiment

In the sixth embodiment, after non full-cone static NAT settings are configured in the upstream router of the starting-side user terminal, the NAT settings are switched to full-cone dynamic NAT settings. In the case where the static NAT settings are to be continuously used, the user terminal may first perform non full-cone static NAT settings and then switch the settings to full-cone static NAT settings. The user terminal as the communication partner may first perform non full-cone static NAT settings and then switch the settings to full-cone dynamic NAT settings. Alternatively, the user terminal as the communication partner may first configure non full-cone static NAT settings and then switch the settings to full-cone static NAT settings.

In order to realize this function, the user terminal may include the control section 205 and the NAT setting change requesting section 217. The control section 205 inquires an upstream router whether the address translation rule in the upstream router is of full-cone NAT settings or of non full-cone NAT settings. The NAT setting change requesting section 217 requests the upstream router to change the address translation rule to an address translation rule which is preferable for the desired NAT settings. As the request message, a format obtained by modifying the message described above regarding the static NAT settings can be used. The NAT setting change requesting section 217 may be provided in parallel with the static NAT setting requesting section 210. The control section 205 manages the NAT setting state and the WAN-side address information of the upstream router, manages the operation of the NAT setting change requesting section 217, and issues operation instructions to the NAT setting change requesting section 217.

Eighth Embodiment

In the eighth embodiment, a modification of the above-mentioned embodiments will be described. In the modification, a user terminal capable of deleting NAT settings when communication fails or NAT settings configured in advance are determined to be unnecessary will be described. Such a user terminal can prevent an overflow of NAT translation tables and also improve the security level.

For example, when it is determined that P2P connection from the user terminal 1a to the user terminal 1e can be established as in the example of FIG. 17A and FIG. 17B, the static NAT settings configured in the router 2A by the user terminal 1a are not necessary. The reason is that the access to the router 2A becomes an access from the LAN side to the WAN side, a NAT translation table is set by dynamic NAT, and this dynamic NAT is used thereafter in P2P communication. When a user terminal determines that NAT settings configured by the user terminal become unnecessary as in this case, the NAT setting change requesting section 217 of the user terminal may delete the NAT settings.

When the UPnP•IGD protocol is used, the user terminal can delete the NAT settings in the upstream router by sending a DelPortMapping action message to the upstream router. The upstream router possibly has a plurality of sets of dynamic NAT or static NAT settings. The user terminal requests deletion of the NAT settings while specifying the port number used when the user terminal configured the NAT settings.

In the fourth through seventh embodiments, the security level is improved by switching the non full-cone NAT settings to full-cone NAT settings. The user terminal may delete the NAT settings which become unnecessary by the switching.

When both dynamic NAT settings and static NAT settings are configured, the user terminal may delete the NAT settings which can be determined to be unnecessary.

Usually in the case of TCP communication, when a session is disrupted, the dynamic NAT settings are cancelled. Namely, the corresponding section in the NAT translation table is generally deleted. However, the present invention is not limited to this. In the case of UDP communication, when no packet is sent for a certain period of time (usually, for several tens of seconds to several minutes), the dynamic NAT settings are cancelled. As can be seen from this, dynamic NAT settings are generally automatically deleted when the communication is terminated without being positively deleted. However, the present invention is not limited to this.

One feature of the present invention is to notify address information of the upstream router acquired using the UPnP•IGD protocol or the like, global address information acquired using the server, and local address information set in the user terminal itself to the communication partner, determine appropriate address information of connection destination based on the information on the user terminal itself and the information on the communication partner, and thus perform P2P communication. Another feature of the present invention is to determine which static NAT is necessary for P2P communication. Still another feature of the present invention is to, when it is determined that P2P connection cannot be established by static NAT settings, switch the P2P connection establishment method so as to perform P2P communication using a STUN connection establishment method or a P2P server connection establishment method.

In FIG. 7, the order of step S502 of acquiring WAN-side address information of the upstream router from the user terminal and step S503 of setting an address information translation rule in the upstream router by the operation of the user terminal may be opposite. Similarly, the order of steps S603 and S604 may be opposite. In the above embodiments, the user terminal exchanges address information after configuring NAT settings in the upstream router. Alternatively, the user terminal may acquire the WAN-side address information of the upstream router without configuring NAT settings at this stage, and after exchanging the address information, configure NAT settings in a router which is determined to need to have NAT settings.

According to the present invention, the networks between the P2P server 3, the router 2C and the router 2D need to be communicated with each other directly or indirectly. The present invention is applicable to communication between a user terminal downstream with respect to the router 2C and a user terminal downstream with respect to the router 2D, communication between user terminals in the same sub network, and communication without routers, such as the communication between the user terminal 1a and the user terminal 1b. The present invention substantially realizes P2P communication between user terminals even when the address information of the communication partner is not known, as long as there is a known method for finding the address information of the communication partner. The present invention realizes P2P communication between user terminals, even in the case of having a problem that a user terminal can communicate to a router located midway and the router receives data from the user terminal but the data cannot traverse the router. The present invention realizes P2P communication even where two user terminals are physically connected or coupled to each other but cannot logically perform P2P communication.

When at least one of two user terminals which are to perform P2P communication does not have a router upstream thereto, i.e., when at least one of the routers is directly connected to the Internet, the other user terminal wishing to perform P2P communication acquires the global address information of the user terminal directly connected to the Internet from the P2P server 3. The user terminal wishing to perform P2P communication sends a communication path connection request to the communication partner using the acquired global address information as the destination. By this, dynamic NAT settings are performed, a return communication path is set, and thus P2P connection can be established. The present invention is applicable to P2P communication in such a network structure. When one of the user terminals is downstream with respect to a router, this user terminal configures static NAT settings in the router. As a result, a communication path connection request from either one of the user terminals reaches the other user terminal. Thus, P2P connection can be established.

It is now assumed that in the network shown in FIG. 1A, a user terminal 1f is directly connected to the router 2C. In order to allow the user terminal 1f to perform P2P communication with the user terminal 1c, both of the user terminals need to recognize that the user terminal 1f and the user terminal 1c are both directly connected to the router 2C. This is possible according to the present invention.

In the above embodiments, a network including routers of a two-level structure, such as the routers 2C and 2A, is assumed. The present invention is applicable to a network including three or more levels of routers. Especially in a network including three or more levels of routers, P2P communication can be well expected between user terminals located within a two-level structure. Needless to say, user terminals located within a three-level structure can perform P2P communication with each other as long as certain conditions are fulfilled.

In the address information exchanged between the user terminal 1a and the user terminal 1d as shown in FIG. 14 and FIG. 14B, the port number in the local address information of each user terminal may be a port number which is to be actually used for P2P communication.

In a network environment using DHCP (Dynamic Host Configuration Protocol), such as an home network, the address information may be possibly changed. However, it is sufficient that the identification information is known. As long as the identification information is known, the user terminal can register the identification information in the P2P server 3 even though the address information is changed. Accordingly, the user terminal can perform P2P communication.

The user terminal may notify only the WAN-side address information, only the global address information acquired from the server, or both of the information. Notification of only the WAN-side address information, or only the global address information, is sufficient when the global IP address and the WAN-side IP address match each other, i.e., when the router directly connected to the user terminal is directly connected to the Internet. Notification of only the global address information is sufficient when the upstream router is not conformed to the UPnP•IGD protocol. Notification of the local address information is unnecessary when the user terminal is directly connected to the Internet via no router. In this case, the user terminal only needs to exchange the global address information.

The assignment and management of the identification information may be performed in substantially the same manner as in the conventional DNS or dynamic DNS. According to the dynamic DNS, unique identification information (domain name) is assigned to the user terminal. The user terminal informs the server of desired identification information. The server determines whether or not the identification information has been assigned to another user terminal. When the identification information has not been assigned to another user terminal, the server assigns the identification information to the user terminal. The server registers address information corresponding to the identification information each time the identification information is changed.

In the above embodiments, the address information or network structure is examined when P2P communication is started. Alternatively, the address information or network structure may be examined in advance when the user terminal is started. In addition, the user terminal may register its own network structure information, which was found by the examination performed when the user terminal was started, in the P2P server. When wishing to perform P2P communication, the user terminal can acquire the network information of its own and of the communication partner from the P2P server. Namely, each user terminal registers its own address information (network structure information) in the P2P server 3, and acquires the network structure information of the communication partner from the P2P server.

The user terminal may examine the network structure periodically. When the network structure is changed, the user terminal may update the contents of registration in the P2P server.

In the above embodiments, the user terminal configures static NAT settings to acquire the WAN-side address information and sends a communication start request message to the communication partner. Alternatively, the user terminal may exchange address information with the communication partner without configuring static NAT settings. FIG. 21A and FIG. 21B show a sequence of operation of a user terminal for exchanging address information without configuring static NAT settings.

First, the user terminal 1a establishes a communication path with the P2P server 3 (P20). Next, the user terminal 1d establishes a communication path with the P2P server 3 (P21). Then, the user terminal 1a acquires global address information from the P2P server 3 (P23). The user terminal 1a acquires a WAN-side IP address as WAN-side address information assigned to the router 2A to which the user terminal 1a is directly connected (P24). For example, the user terminal 1a acquires the WAN-side IP address of the directly connected router 2A using a GetExternalAddress action of the UPnP•IGD protocol.

Next, the user terminal 1a sends an address information exchange request message to the user terminal 1d via the P2P server 3 (P25). The address information exchange request message includes only the global IP address, WAN-side IP address and local IP address assigned to the user terminal 1a. The global IP address is information on the address of a user terminal in the Internet and thus can be considered as global address information. The WAN-side IP address is information on the WAN-side address assigned to the directly connected router, and thus can be considered as WAN-side address information. The local IP address is information on the address assigned to the user terminal 1a in the local area network and thus can be considered as local address information.

The user terminal 1d, which has received the address information exchange request message, acquires the global address information from the P2P server 3 (P26). Next, the user terminal 1d attempts to acquire a WAN-side IP address as the WAN-side address information assigned to the directly connected router 2B (P27). Here, the router 2B is not conformed to the UPnP•IGD protocol. Therefore, the user terminal 1d cannot acquire the WAN-side address information.

Then, the user terminal 1d sends an address information exchange response message to the user terminal 1a via the P2P server 3 (P28). The address information exchange response message includes only the global IP address, the WAN-side IP address and the local IP address assigned to the user terminal 1d. When the directly connected router is not conformed to the UPnP•IGD protocol as shown in FIG. 21A, the address information exchange response message does not include the WAN-side IP address.

The user terminal 1a, which has received the address information exchange response message, determines whether or not to configure static NAT settings (P29). The user terminal 1d, which has sent the address information exchange response message, determines whether or not to configure static NAT settings (P30).

Here, it is assumed that the user terminal 1a determines to configure static NAT settings. The user terminal 1a configures static NAPT settings in the directly connected router 2A using the UPnP•IGD protocol (P31). Next, the user terminal 1a sends a communication start request message to the user terminal 1d via the P2P server 3 (P32). The communication start request message includes the global address information, the WAN-side address information, and the local address information each including an IP address and a port number.

The user terminal 1*d*, which has received the communication start request message, sends a communication start response message to the user terminal 1*a* via the P2P server 3 (P33). The communication start response message includes the global address information, the WAN-side address information, and the local address information each including an IP address and a port number.

Since the address information is now exchanged, the user terminal 1*a* and the user terminal 1*d* start P2P communication by substantially the same processing as in the first and second embodiments. For example, the user terminal 1*a* and the user terminal 1*d* start P2P communication by substantially the same processing as in P9 et seq. in FIG. 18B.

Figure 22:
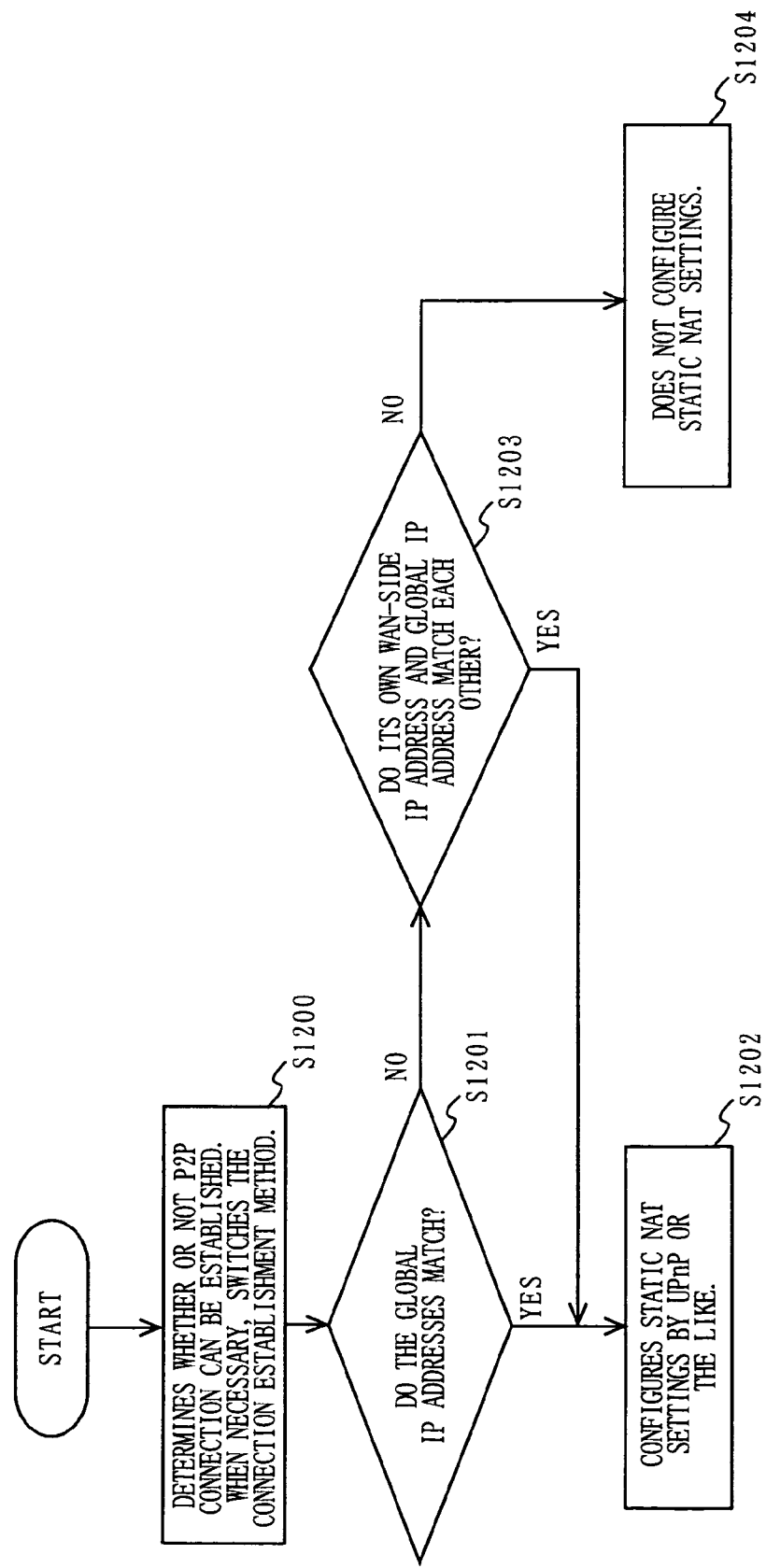
FIG. 22 is a flowchart showing an operation of a user terminal for determining whether or not to configure static NAT settings.

FIG. 22 is a flowchart showing an operation of a user terminal for determining whether or not to configure static NAT settings. Hereinafter, with reference to FIG. 22, the operation of a user terminal for determining whether or not to configure static NAT settings will be described. The operation in FIG. 22 is performed in, for example, P29 and P32 in FIG. 21B.

First, the user terminal determines whether P2P connection can be established or not based on the address information acquired from the user terminal as the communication partner. When P2P connection cannot be established, the user terminal switches the connection establishment method (step S1200) The user terminal performs the determination in step S1200 only when its own global IP address is different from the global IP address of the communication partner.

Next, the user terminal determines whether or not the global IP address assigned to the user terminal and the global IP address assigned to the communication partner match each other (step S1201). When the global IP addresses match each other, the communication between the user terminal and the communication partner is communication inside the home network. Therefore, the user terminal configures static NAT settings in the directly connected router using the UPnP•IGD protocol (P1202). The user terminal may configure static NAT settings in the directly connected router using a protocol other than the UPnP•IGD protocol.

When the global IP addresses do not match each other, the communication between the user terminal and the communication partner is communication via the Internet. In this case, the user terminal determines whether or not the WAN-side IP address and the global IP address assigned to the user terminal match each other (step S1203).

When the WAN-side IP address and the global IP address match each other in step S1203, the user terminal advances to step S1202. When the WAN-side IP address and the global IP address do not match each other in step S1203, static NAT settings cannot be configured in the uppermost router. Thus, the user terminal determines not to configure static NAT settings (step S1204). The user terminal, which has determined not to configure static NAT settings, starts P2P communication via the P2P server 3 or using a STUN connection establishment method.

As described above, the user terminal determines whether or not to configure static NAT settings based on its own global address information, the global address information of the communication partner, and its own WAN-side address information. Such a determination is possible by alternatively providing the user terminal with a NAT setting determination section (not shown). When the user terminal determines not to configure static NAT settings, the user terminal switches the connection establishment method. Thus, the unnecessary static NAT settings are not performed, which improves the security level and increases the processing speed.

A program according to the present invention may be provided in the state of being stored in a computer readable recording medium or provided to a computer apparatus via a network.

The functional blocks required for realizing a communication apparatus according to the present invention may be implemented as an LSI as an integrated circuit. These functional blocks may be incorporated into one chip; or a part of, or the entirety of, the functional blocks may be incorporated into one chip. The LSI mentioned above may also be referred to as an IC, a system LSI, a super LSI, or an ultra LSI in accordance with the degree of integration. The integrated circuit may be provided as a specialized circuit or a multipurpose processor instead of an LSI. Alternatively, an FPGA (Field Programmable Gate Array) which is programmable after LSI production, or a reconfigurable processor in which the connection or setting of circuit cells in the LSI is reconfigurable may be used. When the development of the semiconductor technology and generation of other technologies derived therefrom produce integration techniques replacing the LSI, the functional blocks may be integrated using such techniques. Application of biotechnology is possible as an example.

While the invention has been described in detail, the foregoing description is in all aspects illustrative and not restrictive. It is understood that numerous other modifications and variations can be devised without departing from the scope of the invention.

What is claimed is:

1. A communication apparatus connectable to a network including the Internet, the communication apparatus comprising:

a global address information acquiring section for communicating with a server in the network and acquiring information on an address in the Internet assigned to the communication apparatus as first global address information;

a WAN-side address information acquiring section for acquiring information on a WAN-side address assigned to a router directly connected to the communication apparatus as first WAN-side address information;

a local address information acquiring section for acquiring information on an address in a local area network assigned to the communication apparatus as first local address information;

an address information notification section for notifying the first global address information, the first WAN-side address information, and the first local address information to a communication partner apparatus desiring to perform peer-to-peer (P2P) communication via the server in the network; and an address information acquiring section for acquiring, via the server in the network, second global address information which is information on an address in the Internet assigned to the communication partner apparatus, second WAN-side address information which is information on a WAN-side address assigned to a router directly connected to the communication partner apparatus, and second local address information which is information on an address in a local area network assigned to the communication partner apparatus, wherein the communication apparatus determines a method by which P2P connection can be established based on the first and second global address information, the first and second WAN-side address information, and the first and second local address information.

2. A communication apparatus according to claim 1, further comprising a Network Address Translation (NAT) setting requesting section for setting an address translation rule in the router directly connected to the communication apparatus, wherein the WAN-side address information acquiring section acquires the first WAN-side address information based on an address translation rule which is set in the router.

3. A communication apparatus according to claim 2, further comprising a NAT setting determination section for determining whether or not the NAT setting requesting section is to set the address translation rule, wherein when the NAT setting determination section determines that the address translation rule is not to be set, the communication apparatus determines a method by which P2P connection can be established without causing the NAT setting requesting section to set the address translation rule.

4. A communication apparatus according to claim 2, further comprising a NAT setting change requesting section for deleting an unnecessary address translation rule set in the router.

5. A communication apparatus according to claim 2, further comprising a NAT setting change requesting section for changing the address translation rule set in the router to a full-cone type address translation rule which restricts a communication partner, after P2P communication is started.

6. A communication apparatus according to claim 1, further comprising:
- a destination address information determination section for determining whether or not to start P2P communication with the communication partner apparatus using one address information among the second global address information, the second WAN-side address information and the second local address information; and
- a P2P communication processing section for, when the destination address information determination section determines to start P2P communication with the communication partner apparatus using the one address information, starting P2P communication with the communication partner apparatus using the one address information.

7. A communication apparatus according to claim 6, wherein the destination address information determination section:
- sends a P2P connection request, using one address information among the second global address information, the second WAN-side address information and the second local address information as a destination; and
- determines to start P2P communication using the address information used as the destination, when receiving a response from the communication partner apparatus.

8. A communication apparatus according to claim 7, wherein:
- when receiving a P2P connection request from the communication partner apparatus, the destination address information determination section determines to start P2P communication using sender address information of the P2P connection request; and
- when the destination address information determination section determines to start P2P communication using the sender address information, the P2P communication processing section starts P2P communication with the communication partner apparatus using the sender address information.

9. A communication apparatus according to claim 8, wherein when the destination address information determination section determines not to start P2P communication using the one address information and determines not to start P2P communication using the sender address information, the P2P communication processing section determines to start P2P communication using a P2P server connection establishment method or a STUN connection establishment method.

10. A communication apparatus according to claim 7, wherein:
- the destination address information determination section determines whether or not a first global IP address included in the first global address information is equal to a second global IP address included in the second global address information;
- when the first global IP address is not equal to the second global IP address, the destination address information determination section sends a P2P connection request, using address information corresponding to the second global IP address as a destination, and when receiving a response from the communication partner apparatus, the destination address information determination section determines to start P2P communication using the address information used as the destination; and
- when the first global IP address is equal to the second global IP address, the destination address information determination section sends a P2P connection request, using one address information among the second WAN-side address information and the second local address information as a destination, and when receiving a response from the communication partner apparatus, the destination address information determination section determines to start P2P communication using the address information used as the destination.

11. A communication apparatus according to claim 6, wherein:
- the destination address information determination section determines a predetermined address information type of the first and second global address information and the first and second WAN-side address information;
- the destination address information determination section predetermines the address information to be used as the destination, among the second global address information, the second WAN-side address information and the second local address information in accordance with the predetermined address information type of the first and second global address information and the first and second WAN-side address information; and
- the destination address information determination section determines to start P2P communication using the address information corresponding to the predetermined address information type of the first and second global address information and the first and second WAN-side address information.

12. A communication apparatus according to claim 11, wherein the predetermined address information type is one of the following predetermined address information types:
- type 1 indicating that the communication apparatus is connected to the communication partner apparatus via the Internet;
- type 2 indicating that the communication apparatus is not connected to the communication partner apparatus via the Internet;
- type 3 indicating that the router directly connected to the communication partner apparatus has static NAT settings configured therein;

type 4 indicating that the router directly connected to the communication partner apparatus does not have static NAT settings configured therein;

type 5 indicating that there is only one router from the communication partner apparatus to the Internet;

type 6 indicating that there are at least two routers from the communication partner apparatus to the Internet;

type 7 indicating that a first WAN-side IP address included in the first WAN-side address information matches a second WAN-side IP address included in the second WAN-side address information;

type 8 indicating that the first WAN-side IP address included in the first WAN-side address information does not match the second WAN-side IP address included in the second WAN-side address information;

type 9 indicating that the router directly connected to the communication apparatus has static NAT settings configured therein;

type 10 indicating that the router directly connected to the communication apparatus does not have static NAT settings configured therein;

type 11 indicating that there is only one router from the communication apparatus to the Internet; and type 12 indicating that there are at least two routers from the communication apparatus to the Internet, wherein the destination address information determination section determines whether to start P2P communication using one address information among the second WAN-side address information, the second local address information, and sender address information included in a communication path connection request sent from the communication partner apparatus, in accordance with the predetermined address information type of the first and second global address information and the first and second WAN-side address information, or to start P2P communication by switching a P2P connection establishment method.

13. A communication apparatus according to claim 12, wherein when a communication path with the communication partner apparatus has not been established, the P2P communication processing section determines to start P2P communication using a P2P server connection establishment method or a STUN connection establishment method.

14. A communication apparatus according to claim 6, wherein:
based on the first and second global address information, the first and second WAN-side address information and the first and second local address information, the destination address information determination section determines whether or not P2P connection with the communication partner apparatus using one of the address information can be established; and
when the destination address information determination section determines that P2P connection with the communication partner apparatus cannot be established, the P2P communication processing section determines to start P2P communication using a P2P server connection establishment method or a STUN connection establishment method.

15. A method for a communication apparatus connectable to a network including the Internet to perform P2P communication with another communication apparatus, the method comprising:
communicating with a server in the network and acquiring information on an address in the Internet assigned to the communication apparatus as first global address information;
acquiring information on a WAN-side address assigned to a router directly connected to the communication apparatus as first WAN-side address information;
acquiring information on an address in a local area network assigned to the communication apparatus as first local address information;
notifying the first global address information, the first WAN-side address information, and the first local address information to another communication apparatus desiring to perform P2P communication via the server in the network; and
acquiring, via the server in the network, second global address information which is information on an address in the Internet assigned to the other communication apparatus, second WAN-side address information which is information on a WAN-side address assigned to a router directly connected to the other communication apparatus, and second local address information which is information on an address in a local area network assigned to the other communication apparatus; and
determining a method by which P2P connection can be established based on the first and second global address information, the first and second WAN-side address information, and the first and second local address information.

16. A computer-readable recording medium for storing a program for operating a computer apparatus connected to a network including the Internet, such that the computer apparatus performs P2P communication with another computer apparatus, the program causing the computer apparatus to execute at least:
communicating with a server in the network and acquiring information on an address in the Internet assigned to the communication apparatus as first global address information;
acquiring information on a WAN-side address assigned to a router directly connected to the communication apparatus as first WAN-side address information;
acquiring information on an address in a local area network assigned to the communication apparatus as first local address information;
notifying the first global address information, the first WAN-side address information, and the first local address information to another computer apparatus desiring to perform P2P communication, via the server in the network; and
acquiring, via the server in the network, second global address information which is information on an address in the Internet assigned to the other computer apparatus, second WAN-side address information which is information on a WAN-side address assigned to a router directly connected to the other computer apparatus, and second local address information which is information on an address in a local area network assigned to the other computer apparatus; and
determining a method by which P2P connection can be established based on the first and second global address information, the first and second WAN-side address information, and the first and second local address information.

17. A communication apparatus connectable to a network, the communication apparatus comprising:
a global address information acquiring section for communicating with a server in the network and acquiring information on an address, in a sub-network including the server, assigned to the communication apparatus as first global address information;

a WAN-side address information acquiring section for acquiring information on a WAN-side address assigned to a router directly connected to the communication apparatus as first WAN-side address information;

a local address information acquiring section for acquiring information on an address in a local area network assigned to the communication apparatus as first local address information;

an address information notification section for notifying the first global address information, the first WAN-side address information, and the first local address information to a communication partner apparatus desiring to perform P2P communication via the server in the network; and an address information acquiring section for acquiring, via the server in the network, second global address information which is information on an address in the sub-network assigned to the communication partner apparatus, second WAN-side address information which is information on a WAN-side address assigned to a router directly connected to the communication partner apparatus, and second local address information which is information on an address in a local area network assigned to the communication partner apparatus, wherein the communication apparatus determines a method by which P2P connection can be established based on the first and second global address information, the first and second WAN-side address information, and the first and second local address information.

* * * * *